United States Patent
Sinclair

(10) Patent No.: US 9,912,915 B2
(45) Date of Patent: Mar. 6, 2018

(54) VERIFICATION AND ADJUSTMENT SYSTEMS AND METHODS FOR ADDITIVE MANUFACTURING

(71) Applicant: Solid Innovations, LLC, East Stroudsburg, PA (US)

(72) Inventor: Joseph Matthew Sinclair, Reading, PA (US)

(73) Assignee: Solid Innovation, Inc., East Stroudsburg, PA (US)

( * ) Notice: Subject to any disclaimer, the term of this patent is extended or adjusted under 35 U.S.C. 154(b) by 0 days.

(21) Appl. No.: 14/910,926

(22) PCT Filed: Jan. 12, 2016

(86) PCT No.: PCT/US2016/012992
§ 371 (c)(1),
(2) Date: Feb. 8, 2016

(87) PCT Pub. No.: WO2016/115095
PCT Pub. Date: Jul. 21, 2016

(65) Prior Publication Data
US 2017/0310935 A1     Oct. 26, 2017

Related U.S. Application Data

(60) Provisional application No. 62/102,839, filed on Jan. 13, 2015, provisional application No. 62/153,729, (Continued)

(51) Int. Cl.
*H04N 7/18* (2006.01)
*G06T 7/00* (2017.01)
(Continued)

(52) U.S. Cl.
CPC ............ *H04N 7/181* (2013.01); *B33Y 10/00* (2014.12); *B33Y 30/00* (2014.12); *B33Y 50/02* (2014.12);
(Continued)

(58) Field of Classification Search
CPC ........ H04N 7/181; B33Y 10/00; B33Y 30/00; B33Y 50/02; G06T 7/001;
(Continued)

(56) References Cited

U.S. PATENT DOCUMENTS 7,551,272 B2    1/2009   Vodanovic
9,724,876 B2 *  8/2017   Cheverton ............ B29C 64/386
(Continued)

FOREIGN PATENT DOCUMENTS

CA     2 915 600 A1    12/2014
WO     2013-167528 A1  11/2013

OTHER PUBLICATIONS

International Search Report from corresponding International Application No. PCT/US16/12992 dated Jun. 6, 2016.
(Continued)

*Primary Examiner* — Sath V Perungavoor
*Assistant Examiner* — Howard D Brown, Jr.
(74) *Attorney, Agent, or Firm* — James R. McDaniel

(57) ABSTRACT

Verification and adjustment systems and methods correct at least one build error that is detected in a component built by additive manufacturing (hereinafter "AM"). The systems and methods comprise an AM device, a first imaging device, a second imaging device and computer-implement steps for correcting the build error present in the component. The first imaging device collects first digital images or data of the component and is positioned at a first orientation with respect to a build platform of the AM device. The second imaging device collects second digital images or data of the (Continued)

component and is positioned at a second orientation with respect to the build platform.

21 Claims, 56 Drawing Sheets

Related U.S. Application Data filed on Apr. 28, 2015, provisional application No. 62/153,752, filed on Apr. 28, 2015.

(51) Int. Cl.
*B33Y 30/00* (2015.01)
*B33Y 10/00* (2015.01)
*B33Y 50/02* (2015.01)

(52) U.S. Cl.
CPC .... *G06T 7/001* (2013.01); *G06T 2207/10004* (2013.01); *G06T 2207/30144* (2013.01); *G06T 2207/30164* (2013.01)

(58) Field of Classification Search
CPC . G06T 2207/30164; G06T 2207/30144; G06T 2207/10004
See application file for complete search history.

(56) References Cited

U.S. PATENT DOCUMENTS

| | | |
|---|---|---|
| 2009/0152771 A1 | 6/2009 | Philippi et al. |
| 2012/0327200 A1 | 12/2012 | Takashi et al. |
| 2014/0223583 A1 | 8/2014 | Wegner et al. |
| 2014/0308153 A1 | 10/2014 | Ljungblad |
| 2015/0165683 A1* | 6/2015 | Cheverton .......... B29C 67/0088 382/141 |
| 2015/0177158 A1* | 6/2015 | Cheverton ......... G01N 15/0227 700/119 |

OTHER PUBLICATIONS

Pitchaya Sitthi-Amorn et al., "MultiFab: A Machine Vision Assisted Platform for Multi-material 3D Printing", MIT CSAIL, Chulongkorn University and Tsinghua University, May 12, 2015.

\* cited by examiner

VERIFICATION AND ADJUSTMENT SYSTEMS AND METHODS FOR ADDITIVE MANUFACTURING

CROSS REFERENCE TO RELATED APPLICATION

This application is a 371 application of PCT/US2016/012992 filed Jan. 12, 2016, which claims the benefit under 35 U.S.C. 119(e) of U.S. Provisional Patent Application No. 62/102,839, filed on Jan. 13, 2015 and U.S. Provisional Patent Application Nos. 62/153,729 and 62/153,752, both filed on Apr. 28, 2015, which are incorporated herein by reference in their entirety.

FIELD OF THE DISCLOSURE

The present verification and adjustment systems and/or methods (collectively known hereinafter as "systems and/or methods") comprise, provide and/or utilize at least one additive manufacturing machine or device (hereinafter "AM device") and a plurality of computer-implemented instructions or computer software (hereinafter "software") to effectively calibrate the AM device such that at least one three-dimensional object or component (hereinafter "component") may be built, synthesized, produced and/or fabricated consistently and/or accurately from at least one three-dimensional (hereinafter "3D") computer model. The present systems and/or methods may comprise, provide and/or utilize a plurality of imaging sensors or devices along with the software to verify tolerances and/or automatically identify and/or correct any geometric anomalies of the built component that may not adhere to the given tolerances set forth by the at least one 3D computer model (hereinafter "3D computer model"). The plurality of imaging sensors or devices may be integrated into, and/or located at, near or adjacent to, the AM device and/or may comprise at least one first imaging device and at least one second imaging device. The at least one first imaging device may be located, or positioned at a first orientation with respect to a build platform of the AM device, and the at least one second imaging device may be located, or positioned, at a second orientation with respect to the build platform of the AM device. The present systems and/or methods may utilize the software and image data collected by the at least one first imaging device and/or the at least one second imaging device to effectively verify, calibrate and/or adjust the AM device. As a result, the AM device may be a self-correcting AM device that first compares the actual built or first component to and/or against the 3D computer model to identify any geometric anomalies of the actual built component and subsequently adjusts and/or calibrates the AM device to build at least one subsequent or at least one second component which does not have, exhibit or contain the geometric anomalies. Moreover, the present systems and/or methods may analyze the collected image data of the actual built or first component to identify any geometric anomalies of the actual built or first component and subsequently adjust and/or calibrate the AM device based on the analysis of the collected image data to avoid any identified geometric anomalies from being present in one or more subsequent built or one or more second components built by the AM device.

BACKGROUND OF THE DISCLOSURE

Current AM devices do not incorporate any type of feedback loop that allows for the verification of build geometry of a component or the adjustment thereof for subsequently built components. The present systems and/or methods effectively allow for the adjustment and/or calibration of the AM device disclosed hereinafter so that one or more components may be built consistently, in various applicable materials, with the appropriate geometric parameters already built in, without the need of manual adjustments of the initial computer aided design (hereinafter "CAD") file by a highly skilled operator.

SUMMARY OF THE DISCLOSURE

In embodiments, the present systems and/or method may utilize at least one primary feedback loop and/or at least one secondary feedback loop to avoid any identified geometric anomalies from being present in the remainder of components being built or one or more subsequent second built components based on image data collected by at least one first imaging device and at least one second imaging device and/or analyzed by software executed and/or computer-implemented steps performed by the present systems and/or methods.

In embodiments, a verification and adjustment system for correcting at least one build error present in a component built by additive manufacturing is provided. The system may comprise an additive manufacturing device having a top end and a bottom end connected by perimeter sides, wherein the additive manufacturing device has an interior space defined between the top end, the bottom end and the perimeter sides of the additive manufacturing device, wherein the interior space is configured to house a build platform for building the component thereon. Further, the system may comprise a first imaging device for collecting first digital images of, or data associated with, the component, wherein the first imaging device is located adjacent to a portion of the interior space of the additive manufacturing device, positioned at a first orientation with respect to the build platform and directed at the build platform. Moreover, the system may comprise a second imaging device for collecting second digital images of, or data associated with, the component, wherein the second imaging device is located adjacent to one perimeter side of the additive manufacturing device and at an elevation between the bottom end and the top end of the additive manufacturing device, positioned at a second orientation with respect to the build platform, and directed at the build platform.

In an embodiment, the first digital images may be collected by the first imaging device and may comprise digital 2D images, and the second digital images may be collected by the second imaging device and may comprise digital 3D images.

In an embodiment, the second imaging device may be located outside, or inside, the interior space of the additive manufacturing device.

In an embodiment, the second imaging device may be stationary, or movable, with respect to the build platform of the additive manufacturing device.

In an embodiment, the second imaging device may be located adjacent to a portion of the interior space of the additive manufacturing device.

In an embodiment, the first imaging device may be located at a position with respect to a top surface of the build platform that forms a first angle, wherein the first angle may be greater than about forty-five degrees and no more than ninety degrees.

In an embodiment, the first orientation of the first imaging device may be perpendicular with respect to the build platform.

In an embodiment, the second imaging device may be located at a position with respect to a top surface of the build platform that forms a second angle, wherein the second angle may be about ±10°.

In an embodiment, the second orientation of the second imaging device may be parallel or nonparallel with respect to the build platform.

In an embodiment, at least one imaging device, selected from the first imaging device and the second imaging device, may be mounted on at least one print head of the additive manufacturing device.

In embodiments, a verification and adjustment method for correcting at least one build error present in a component built by additive manufacturing is provided. The method may comprise extracting digital 3D geometric data of the component from collected digital data, wherein the collected digital data is based on the component built on a build platform of an additive manufacturing device, wherein the collected digital data comprises digital 2D images collected from a first imaging device associated with the additive manufacturing device and digital 3D images collected from a second imaging device associated with the additive manufacturing device. Further, the method may comprise detecting at least one build error present in the component built on the build platform by comparing the extracted digital 3D geometric data with a first digital 3D model of the component, wherein a first digital 3D printable file of the component comprises the first digital 3D model of the component. Still further the method may comprise generating a second digital 3D model of the component based on the detected at least one build error present in the component, wherein the second digital 3D model accounts for, or corrects, the detected at least one build error present in the component. Moreover, the method may comprise providing a second digital 3D printable file that accounts for, or corrects, the detected at least one build error by changing the line-by-line code of the first digital 3D printable file to incorporate the generated second digital 3D model of the component.

In an embodiment, the method may comprise building one or more corrected components based on the second digital 3D printable file.

In an embodiment, the first imaging device may be located above the build platform and the second imaging device may be located at a side of the additive manufacturing device.

In an embodiment, the second imaging device may be stationary, or movable, with respect to the build platform of the additive manufacturing device, and may be parallel, or nonparallel, with respect to the build platform of the additive manufacturing device.

In an embodiment, the collected digital 2D data may comprise digital 2D images of a plurality of build layers of the component built on the build platform and the collected digital 3D data may comprise digital 3D images of the plurality of build layers of the component built on the build platform.

In an embodiment, the plurality of build layers may comprise each build layer added by the additive manufacturing device to build the component on the build platform.

In an embodiment, the first imaging device and the second imaging devices may both be directed at a build layer immediately added to the component by the additive manufacturing device.

In an embodiment, at least one imaging device, selected from the first imaging device and the second imaging device, may be mounted on at least one print head of the additive manufacturing device.

In an embodiment, the method may comprise changing firmware associated with the additive manufacturing device based on the extracted digital 3D geometric data.

In an embodiment, the method may comprise introducing corrections into subsequent building of the component, when the component is only a partially built component, wherein the corrections are based on, or determined from, the extracted digital 3D geometric data.

In an embodiment, the method may comprise acquiring the collected digital data from (i) at least two different angle with respect to the build platform and (ii) inside or outside an interior space of the additive manufacturing device, wherein the interior space is configured to house the component and the build platform during the additive manufacturing.

BRIEF DESCRIPTION OF THE DRAWINGS

So that the above recited features and advantages of the present systems and/or methods can be understood in detail, a more particular description of the present systems and/or methods, briefly summarized above, may be had by reference to the embodiments thereof that are illustrated in the appended drawings. It is to be noted, however, that the appended drawing illustrates only typical embodiments of the present systems and/or methods and are therefore not to be considered limiting of its scope, for the present systems and/or methods may admit to other equally effective embodiments.

DETAILED DESCRIPTION OF THE DISCLOSURE

Figure 1:
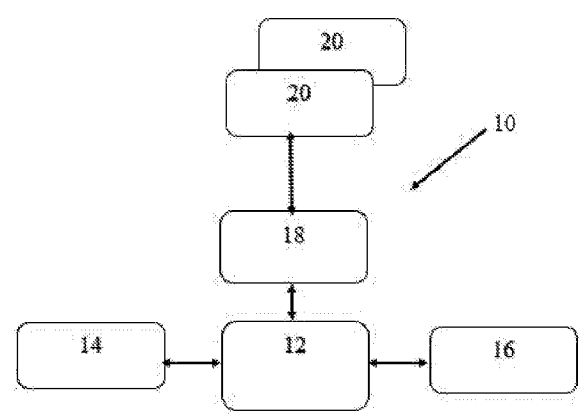
FIG. 1 illustrates a block diagram of a verification and adjustment system (hereinafter "system") for effectively adjusting and/or calibrating an AM device and/or building at least one component in an embodiment.
Figure 2:
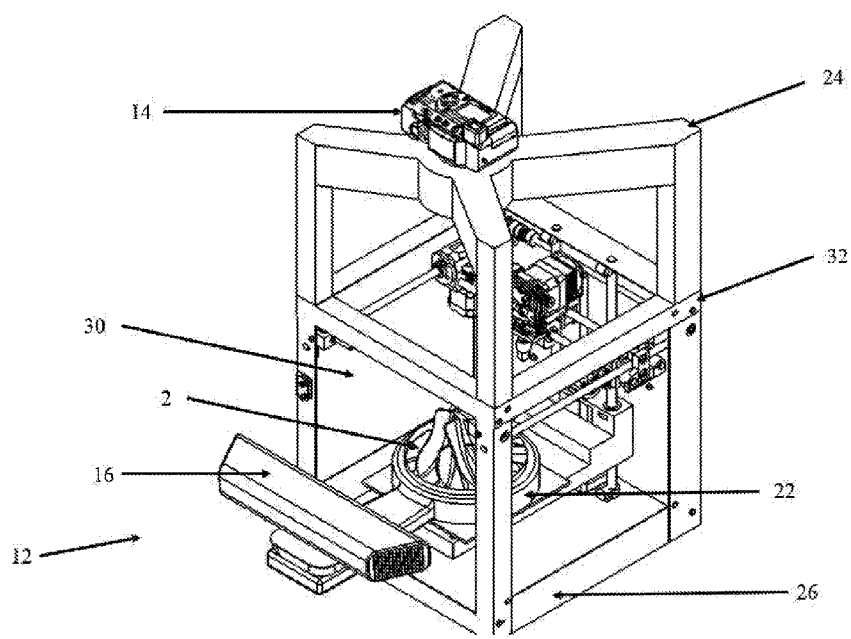
FIG. 2 illustrates a perspective view of an AM device for building a component in an embodiment.

Referring now to the drawings wherein like numerals refer to like parts, FIG. 1 shows a verification and adjustment system 10 (hereinafter "system 10") that may comprise, provide and/or utilize one or more of the following components: at least one AM device 12 (hereinafter "AM device 12"), at least one first imaging device 14 (hereinafter "first imaging device 14"), at least one second imaging device 16 (hereinafter "second imaging device 16"), at least one computer terminal 18 (hereinafter "terminal 18"), one or more digital monitors or displays 20 (hereinafter "displays 20"), a calibration block (not shown in the drawings), movable lighting (not shown in the drawings), a program splash screen and/or user interface displayable via the displays 20 and/or the above-mentioned verification, adjustment and/or calibration software. One or more of the above-mentioned components may be utilized by the system 10 to effectively calibrate the AM device 12 such that at least one component 2 (hereinafter "component 2") may be built, synthesized, produced and/or fabricated consistently and/or accurately from at least one 3D computer model (not shown in the drawings). The present system 10 and/or methods 100, 200, 300, shown in FIGS. 40-42, respectively, may comprise, provide and/or utilize the first imaging device 14 and/or the second imaging device 16 (collectively known hereinafter as "imaging devices 14, 16"), along with collected image data, the software and the terminal 18, to verify tolerances and/or automatically indicate and/or correct any geometric anomalies of the component 2 that may not adhere to the given tolerances set forth by the at least one 3D computer model. As a result, the present systems 10 and/or methods 100, 200, 300 may accurately calibrate the AM device 12 based on collected image data of a first component 2 such that subsequently built components (not shown in the drawings) may not contain and/or exhibit any geometric anomalies that were or are exhibited by an earlier built component, such as, for example, the component 2.

The imaging devices 14, 16 may be integrated into, or located adjacent with respect to, the AM device 12 such that the first imaging device 14 may be located, or positioned, at a first orientation with respect to a build platform 22 (hereinafter "platform 22") of the AM device 12, and the second imaging device 16 may be located, or positioned, at a second orientation with respect to the platform 22 of the AM device 12. The present system 10 and/or methods 100, 200, 300 may utilize the software and/or image data collected by the imaging devices 14, 16 to effectively calibrate the AM device 12 such that any subsequently built components may not contain and/or exhibit any geometric anomalies that were or are exhibited by an earlier built component, such as, the component 2.

The software, which may be stored within a memory storage unit (not shown in the drawings) of, or associated with, the terminal 18, may comprise one or more computer-implemented steps, techniques, algorithms, tools and/or instructions adapted or configured to verify the tolerances, to automatically indicate and/or to automatically correct any geometric anomalies exhibited by an earlier built component that may not adhere to the given tolerances set forth by the at least one 3D computer model and/or CAD file of the component 2. As a result, the software, the terminal 18 and/or at least one of the methods 100, 200, 300 may accurately calibrate the AM device 12 such that one or more subsequently built components may adhere to the said given tolerances set forth by the at least one 3D computer model or CAD file of the component 2. The software may be executed by one or more microprocessors associated with the system 10 and/or the terminal 18 to perform, execute and/or implement at least one or more of the methods 100, 200, 300 shown in FIGS. 40-42, respectively, at least one or more of the sub-method and/or sub-steps of one or more sub-methods shown in FIGS. 43-56.

The system 10, the AM device 12 and/or the methods 100, 200, 300 may utilize at least one additive manufacturing process (hereinafter "AM process") as a primary means and/or technique by which to produce, build, print and/or fabricate the component 2 and/or one or more subsequently built components based on at least one 3D printable model for the component 2 and/or at least one 3D printable file format comprising the component 2. In embodiments, the AM process may be an extrusion AM process, a light-polymerized AM process, a powder bed AM process, a laminated AM process, a wire AM process, a laser powder forming AM process, an inkjet 3D printing process, semiconductor epitaxial-thin film deposition process, circuit printing process, fused filament fabrication (hereinafter "FFF") AM process and/or any combination(s) thereof. The extrusion AM process may comprise fused deposition modeling (hereinafter "FDM"), FFF, plastic jet printing and/or robocasting or direct ink writing; the light polymerized AM process may comprise stereolithography (hereinafter "SLA") and/or digital light processing; the laminated AM process may comprise laminated object manufacturing; and the wire AM process may comprise electron beam free form fabrication and/or laser metal deposition-wire AM process. In embodiments, the powder bed AM process may comprise powder bed and inkjet head 3D printing, electron-beam melting (hereinafter "EBM"), selective laser melting, selective heat sintering, selective laser sintering and/or direct metal laser sintering (hereinafter "DMLS"); and the laser powder forming may comprise laser engineered net shaping (hereinafter "LENS"), direct metal deposition and laser consolidation.

In embodiments, the materials utilized during the AM process may be, but are not limited to, metal alloy(s), photopolymer, thermoplastics, eutectic metals, edible materials, rubbers, modeling and/or metal clay, ceramic materials, powdered polymers, thermoplastic powder, ceramic powders, paper, metal foil, plastic film. The AM process may build the component 2 and/or one or more subsequent components based on one or more 3D computer models set forth in one or more printable file formats selected from, but not limited to, STL file format, WRL file format, VRML file format, 3MF file format, AMF file format, ZPR file format, FORM file format and Gcode file format. The AM process may be utilized to build the component 2 for one or more of the following type applications: manufacturing applications; industrial applications; sociocultural applications; and/or any combination(s) thereof. In embodiments, the manufacturing applications may be associated with, related to or directed to distributed manufacturing, mass customization, rapid manufacturing, rapid prototyping, research, food, medical application, custom fit medical casts and/or any combination(s) thereof. In an embodiment, the industrial application may be associated with, related to or directed to apparel, vehicles, construction, firearms, space, computer, robots and/or medical, such as, for example, medical devices, bio-printing and/or pills. In an embodiment, the sociocultural applications may be associated with, related to or directed to art, communication, domestic or household uses, education, research and development, environmental uses and/or any combinations thereof. It should be understood that the present disclosure is not limited to a specific embodiment of the materials, the 3D printable file formats and/or the application types.

In embodiments, the terminal 18 may be computer workstation with a plurality of central processing units and/or virtual cores, at least one graphics card and a sufficient amount of RAM to execute the present methods 100, 200, 300 and to calibrate the AM device 12 based on analysis of image data collected by the first imaging device 14 and/or the second imaging device 16. The displays 20 may comprise at least two computer monitors to provide improved and/or easier multitasking for an operator (not shown in the drawings) of the system 10 and/or methods 100, 200, 300. In an embodiment, one of the displays 20 may render and/or display the fabricated component to being built, or that was built, by the AM device 12 during the AM process and/or another of the displays 20 may render and/or display a re-fabricated component which may contain one or more corrections therein which may account for any geometric anomalies which were, or are, exhibited by the fabricated component. In an embodiment, the program splash screen and/or user interface may provide or create an improved and easier utilization of the system 10 and/or the methods 100, 200, 300 by providing at least one desktop based shortcut to digital folders and/or computer programs housing one or more functions and/or operations associated with the present system 10 and/or one or more of the methods 100, 200, 300. The calibration block may be geometrically shaped block having a multiple sections exhibiting at least two colors which may be utilized by the operator of the system 10 to calibrate at least one imaging device selected from the imaging devices 14, 16. The movable lighting may be positioned and/or located near, adjacent to, below and/or above the component 2, the platform 22, the AM device 12 and/or the imaging devices 14, 16 such that improved image data may be gather and/or collected by the imaging devices 14, 16 to account for different surrounding conditions and/or when the buildable filament or material may exhibit at least one single color and/or multiple colors.

In embodiments, the software utilized and/or executed by the system 10 and/or the methods 100, 200, 300 may provide automated image or picture capture after one or more layers is built or added during the AM process executed by the AM device 12 which may allow, facilitate and/or provide for consistent, continuous and/or uninterrupted image capturing of the component 2 by at least one of the imaging devices 14, 16 without any additional input from the operator during the execution of the AM process. Further, the software and/or AM device 12 may provide automated vertical movement of the platform 22 to a scan height during the AM process via at least one of the imaging devices 14, 16. In an embodiment, digital two dimensional (hereinafter "2D") images, digital 3D images, digital 2D image data and/or digital 3D image data may be collected, recorded and/or captured by at least one the imaging devices 14, 16 after each and every single build layer is built or added during the AM process and/or the platform 22 may be moved vertically downward by a distance equal to, or substantially equal to, a height of each build layer during the AM process executed by the AM device 12. In embodiments, the software may automatically open one or more 3D and/or 2D imaging programs when terminal 18 is activated, may provide one or more folders which may house all, or at least some, of the operational programs, 3D and/or 2D imaging programs and/or data collection software. Moreover, the program splash screen and/or user interface may automatically open a printer control program or the operator may activate a launch button or link which may immediately open and/or activate the printer control program and/or the one or more 3D and/or 2D imaging programs.

In embodiments, the terminal 18 of the system 10 may be a completely, or partially, isolated computer terminal having a sole, or at least one, function of operating the AM device 12 and/or at least a 64-bit operating system may have been installed on the terminal 18. Additionally, the operating system may have been configured and, if necessary, reconfigured until the AM device 12 functions appropriately and/or accurately to build the component 2 and/or any subsequently built components. As a result, specific methods for installing the operating system on similar systems were developed based on user problems, configuration issues, reconfiguration issues and/or other necessary requirements. Moreover, the terminal 18 may be mobile with respect to the AM device such that the terminal 18 may be movable with respect to another AM device and/or additional AM development locations.

As shown in FIG. 1, the system 10 may comprise the displays 20 which may be configured and/or adapted to display digital information provided by or from the terminal 18 regarding operations of the AM device 12 and/or the AM process being performed, executed by and/or implemented by the AM device 12 to layerwise build the component 2 via a plurality of build layers. Further, the displays 20 may be electrically connected to, and/or in digital communication with the terminal 18 for displaying or rendering said digital information. In an embodiment, the displays 20 may be, or may comprise, touch activated digital screens that allow, facilitate or provide for the operator to control and/or utilize the terminal 18 via the displays 20 and/or operate the AM device 12 or perform the AM process. It should be understood that the present disclosure is not limited to a specific embodiment of the displays 20.

In embodiments, the terminal 18 is electrically connected to, and/or in digital communication with, the AM device 12 and/or the imaging devices 14, 16. Further, the AM device 12 and/or the imaging devices 14, 16 may receive one or more digital communications and/or instructions from the terminal 18, and the terminal 18 may receive digital information from the AM device 12 and/or imaging data from the imaging devices 14, 16. As a result, AM device 12 may be controlled by the terminal 18 such that the AM process building the component 2 may be controlled by and/or operated via the terminal 18. Moreover, the imaging devices 14, 16 may be controlled by and/or operated by the terminal 18 and/or the AM process may be calibrated and/or corrected by the image data and/or information received by the terminal 18 from the imaging devices 14, 16.

As shown in FIGS. 2, 4, 7, 9, 12, 14, 15, 19, 21, 26, 31, 32 and 34, the AM device 12 may comprise a top end 24 and a bottom end 26 which may be located opposite with respect to the top end 24 of the AM device 12. The AM device 12 may comprise a plurality of perimeter sides 28 (hereinafter "perimeter sides 28") extending from the top end 24 to the bottom end 26 and/or connecting the top end 24 and bottom end 26 (collectively known hereinafter as "ends 24, 26"), as shown in FIGS. 3, 8, 19, 28 and 34. The ends 24, 26 and/or the perimeter sides 28 may define an interior space 30 (hereinafter "interior 30") of the AM device 12 wherein the operations and/or actions of the AM process may build and/or fabricate the component 2 and/or one or more subsequently built components within the interior 30 of the AM device 12 as shown in FIGS. 2, 5, 9, 15, 27 and 38. In embodiments, the component 2 and/or the platform 22 may be entirely, or at least partially, enclosed or surrounded by the ends 24, 26 and/or the perimeter sides 28 of the AM device 12. Further, the component 2 being built during the AM process and/or the platform 22 may be entirely, or at least partially, located within the interior 30 of the AM device 12. Still further, the interior 30 of the AM device 12 may be located or positioned at, near or adjacent to the bottom end 26 of AM device 12 and/or the interior 30 may be located or positioned between the ends 24, 26 of the AM device 12. Yet still further, the interior 30 of the AM device 12 may be defined as, or refer to, the area or location within or inside the AM device 12 wherein the component 2 is built or fabricated by the AM device 12 during the AM process. Any area or location within or inside the AM device 12 where the building or fabricating of the component 2 does not occur is known as or referred to outer or non-interior space (not shown in the drawings) of the AM device 12.

Moreover, one side of the perimeter sides 28 may be considered to be, and/or subsequently referred to as, a front side of the AM device 12.

In an embodiment, the AM device 12 may utilize FDM as a means by with to produce, fabricate and/or build one or more of the components 2 with a plurality of build layers as shown in FIGS. 2-6. The AM device 12 shown in FIGS. 2-6 may comprise one or more of the following FDM components: the first imaging device 14; the second imaging device 16; the component 2 being built by the AM device 12; a first imaging device holder 32 (hereinafter "first device holder 32"); the platform 22; a circuit board controller 34 (hereinafter "controller 34"); a second imaging device connector extension 36 (hereinafter "second device connector 36"); an extruder head 38; a X/Y-axis rod for extruder mobility 40 (hereinafter "extruder mobility 40"); a Z-axis rod for platform mobility 42 (hereinafter "platform mobility 42"); a Z-stage/platform carrier 44 (hereinafter "platform carrier 44"); a device frame 46 (hereinafter "frame 46"); a Y-axis motor 48, an extruder motor 50; an extruder filament 52 (hereinafter "filament 52"); a X-axis motor 54; and/or an extruder carrier 56.

In embodiments, the first imaging device 14 may be a high resolution optical instrument, such as, a high resolution optical camera which may be located at, near and/or adjacent with respect to the top end 24 of the AM device 12. As a result, the first imaging device 14 may be located and/or positioned at a first orientation with respect to the build platform 22 within the interior 30 of the AM device 12. In other embodiments, the first imaging device 14 may be mounted to one or more portions and/or parts of the AM device 12. For example, when the AM device 12 comprises one or more print heads, the first imaging device 14 may be mounted on the one or more print heads. Further, types of imaging capturing performed and/or executed by the first imaging device 14 may include, but is not limited to, analog imaging, digital imaging, print imaging, thermal imaging, infrared imaging, radiation imaging, acoustic based imaging and/or any combination(s) thereof. Moreover, the first imaging device 14 is capable of utilizing types of resolution which may include, but are not limited to, vary pixel resolution, spatial resolution, spectral resolution, temporal resolution (in reference to possible videography capabilities), radio resolution and/or any combination(s) thereof.

In an embodiment, the longitudinal axis of the first imaging device 14 may be located and/or positioned at the first orientation with respect to a top surface of the platform 22 configured and/or adapted for building the component 2 thereon. For example, the first orientation may be perpendicular or substantially perpendicular and the top surface of the build platform 22 may be a planar or substantially planar surface. In an embodiment, the longitudinal axis of the first imaging device 14 may be located and/or positioned at a first angle with respect to the top surface of the platform 22, wherein the first angle is greater than about forty-five degree, about sixty degrees or about eighty degrees and/or the first angle is no more than about ninety degrees, about ninety-five degrees or about one-hundred degrees. Further, the first imaging device 14, or at least a portion of the first imaging device 14, may be positioned or located directly above the component 2. As a result, first end of the first imaging device 14 may extend into, or be positioned within, the AM device 12 such that the first image device 14 may collect, gather and/or record image data associated with the interior 30 of the AM device 12, the component 2 and/or the topmost build layer of the component 2 being built by the AM device 12. In an embodiment, the first end of the first imaging device may comprise a digital camera lens and/or the like. The first imaging device 14 may comprise adequate and/or sufficient resolution which may allow for appropriate and/or accurate measurements of the component 2 and/or subsequent components being generated or built via the AM process within the interior 30 of the AM device 12. The first imaging device 14 may collect, obtain, gather, record and/or take at least one digital image or digital image data of one or more layers of the component 2 being built during the AM process within the interior 30 of the AM device 12. In an embodiment, at least one digital image or digital image data may be collected, gathered and/or recorded by the first imaging device 14 for each and every layer of the component being built by the AM device 12. Further, the at least one digital image or digital image data collected, gathered and/or recorded by the first image device may be at least one digital 2D image, at least one digital 3D image, digital 2D image data and/or digital 3D image data. In embodiments, one or more portions of the first imaging device 14 may be located or positioned within the interior 30 of the AM device 12 or at or in the outer or non-interior space within or inside the AM device 12. In other embodiments, one or more portions of the first imaging device 14 may be located or positioned at, near or adjacent to the bottom end 26 of the AM device.

In embodiments, the system 10 may comprise a plurality (not shown in the drawings) of first imaging devices 14 which may be located, at, near or adjacent to the top end 24 of the AM device 12. Each of the plurality of first imaging devices 14 may be orientated at one or more different angles, the same angle or one or more substantially similar angles with respect to the top surface of the platform 22 or the component 2 being built by the AM device 12. The plurality of first imaging devices 14 may collect, obtain, gather, record and/or take a plurality of digital images or digital image data of one or more layers of the component 2 being built or added during the AM process occurring within the interior 30 of the AM device 12. In an embodiment, the plurality of digital images or digital image data may be collected, gathered and/or recorded by the plurality of first imaging devices 14 for each and every build layer of the component being built or added by the AM device 12. Further, the plurality of digital image or digital image data may comprise one or more digital 2D images, one or more digital 3D images, digital 2D image data and/or digital 3D image data.

In embodiments, the second imaging device 16 may be at least one 3D imaging device, such as, at least one 3D scanning device, and/or at least one computerized tomography scanning device, which may be mounted, located and/or positioned in the second orientation with respect to the platform 22. In some embodiments, the second imaging device 16 may be mounted, located and/or positioned in a third orientation, which is different than the second orientation, with respect to the platform 22 and/or one or more portions/parts of the AM device 12. With respect to the perimeter sides 30 of the AM device 12, the second imaging device 16 may be located and/or positioned at the front side of the AM device such that the second imaging device 16 is directed to, or pointed at, the interior 30 of the AM device 12 where the component 2 may be built or fabricated by the AM device 12 during the AM process. Further, one or more portions of the second imaging device 16 may be located or positioned at, near or adjacent to the bottom end 26 of the AM device 12 as shown in FIGS. 2, 4, 5, 7 and 10. In other embodiments, one or more portions of the second imaging device 16 may be located or positioned outside the interior 30 of the AM device 12 and/or at a height that is between the ends 24, 26 of the AM device 12 as shown in FIGS. 12-14 and 17. In yet other embodiments, one or more portions of the second imaging device 16 may be located or positioned at the height between the ends 24, 26 of the AM device and/or at or in the outer or non-interior space within the AM device 12 as shown in FIGS. 20, 21, 23-25, 30-32 and 35. In yet still other embodiments, the second imaging device 16 may be located and/or positioned within the interior 30 of the AM device 12 and/or may be stationary or movable with respect to the platform 22 and/or one or more portions/parts of the AM device 12.

In embodiments, the second imaging device 16 may be an active 3D scanning device that emits a kind of radiation or light and detect its reflection or radiation passing through object in order to probe the component 2 being built by the AM device 12 via the plurality of build layers of material. In other embodiments, the second imaging device 16 may utilize laser triangulation, time of flight laser scanning, phase shift laser scanning, photogrammetry based 3D model rendering technology and/or photo-tomography based 3D model rendering technology to produce one or more digital 3D images and/or digital 3D image data of the component 2 at one or more pre-determined stages of the AM process being utilized by the AM device 12 to build the component 2. In yet other embodiments, the second imaging device 16 may gather, record and/or take X-ray images of the component 2 at different angles, which may be utilized with computer-processed combinations to produce cross-sectional and/or tomographic images or virtual slices of specific areas of the component 2 at the pre-determined stages of the AM process. As a result, an inside of the component 2 may be seen or observed without cutting or removing the component 2 from the platform 22 and/or the AM device 12. In yet still other embodiments, the second imaging device 16 is capable of utilizing photogrammetry 3D scanning or 3D mapping of environments which may be based on sonar, radar, acoustics, and robotic mapping via simultaneous localization and mapping (hereinafter "SLAM"). In an embodiment, when the AM device 12 comprises one or more print heads, the second imaging device 16 may be a 3D scanning device mountable on the one or more print heads for one or more surface roughness and analyses processes.

In embodiments, the pre-determined stages may occur after one or more build layers of material have been added to and/or built onto the component 2 by the AM process executed by the AM device 12. As a result, the second imaging device 16 may collect, gather and/or record one or more digital 3D images, digital 3D image data and/or one or more X-ray images of one or more build layers of the component 2 being built or added during the AM process occurring within the interior 30 of the AM device 12. In an embodiment, the pre-determined stages may occur after each and every build layer of material has been added to and/or built onto the component 2 by the AM process performed by the AM device 12. As a result, the second imaging device 16 may collect, gather and/or record one or more digital 3D images, digital 3D image data and/or one or more X-ray images of each and every build layer of the component 2 being built or added by the AM device 12.

In embodiments, the system 10 may comprise a plurality (not shown in the drawings) of second imaging devices 16 which may be positioned or located at one or more of the perimeter sides 28 of the AM device 12. For example, the system 10 may comprise more than one second imaging devices 16 located at, near or adjacent to at more than one of the perimeter sides 28 of the AM device 12. As a result, the plurality of second imaging devices 16 may collect, gather and/or record one or more digital 3D images and/or digital 3D imaging data of one or more build layers of material being built onto or added to the component 2 in the interior 30 during the AM process executed by the AM device 12. Thus, the digital 3D images and/or digital 3D imaging data collected, gathered and/or recorded by the plurality of second imaging devices 16 may comprise digital 3D images, digital 3D imaging data and/or X-ray images related to and/or associate with two or more different side views of the component 2 being built by the AM device 12. In an embodiment, the plurality of second imaging devices 16 may be located outside of the AM device 12, outside the interior 30 of the AM device 12 and/or at or in the outer or non-interior space inside the AM device 12.

In an embodiment, the second imaging device 16 may be located and/or positioned outside the interior 30 of the AM device, perimeter sides 28 and/or the frame 46, may be stationary with respect to the platform 22 and/or the component(s) 2 being built thereon, may be located and/or positioned in the outer or non-interior space inside the AM device 12 and/or may be located and/or positioned in the second orientation with respect to the top surface of the platform 22. In embodiments, the second imaging device 16 may be connected, attached and/or fastened to the platform 22 and/or the component 2 being built thereon. The second orientation may be parallel or substantially parallel with respect to the top surface of the platform 22 and/or the top surface of the platform 22 may be a planar, or a substantially planar, surface. In an embodiment, the second imaging device 16 may be located and/or positioned at a second angle with respect to the top surface of the platform 22, whereby the second angle may be about ±10°, about ±5°, about ±1° or less than about ±1°.

The second imaging device 16 collects, obtains and/or gathers one or more digital 3D images, digital 3D imaging data and/or X-ray images of the component 2 as the component 2 is being generated or built on the platform 22 of AM device 12 during the AM process. The second imaging device 16 may be positioned such that the digital 3D images, digital 3D imaging data and/or the X-ray images collected, obtained and/or gathered by the second imaging device 16 may be one or more digital 3D images, digital 3D imaging data and/or X-ray images associated the last build layer of material that was immediately built, added, produced and/or fabricated during the AM process executed by the AM device 12. In embodiments, the second imaging device 16, which is stationary with respect to the platform 22, may move vertically and/or downwardly with the movement of the platform 22 during the AM process performed by the AM device 12; therefore, the digital 3D images, digital 3D image data and/or X-ray images collected, recorded and/or gathered by the second imaging device 16 may be directly related to and/or indicative of the most recently added, and/or present, build layer of material being produced, fabricated, added and/or built by the AM device 12.

Figure 3:
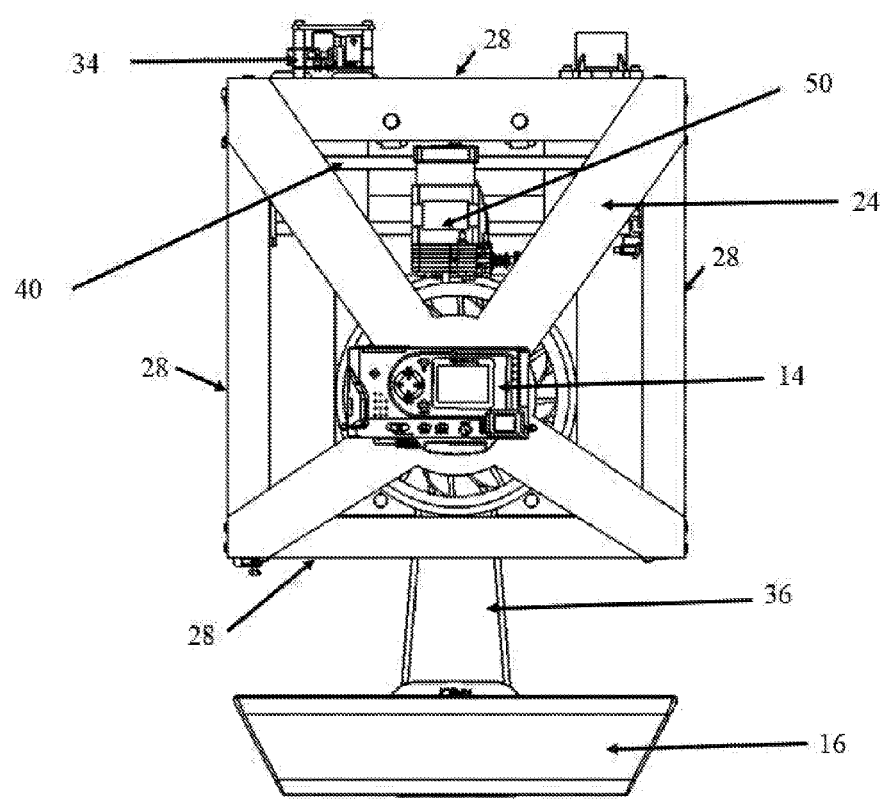
FIG. 3 illustrates a top plan view of the AM device shown in FIG. 2 in an embodiment.
Figure 4:
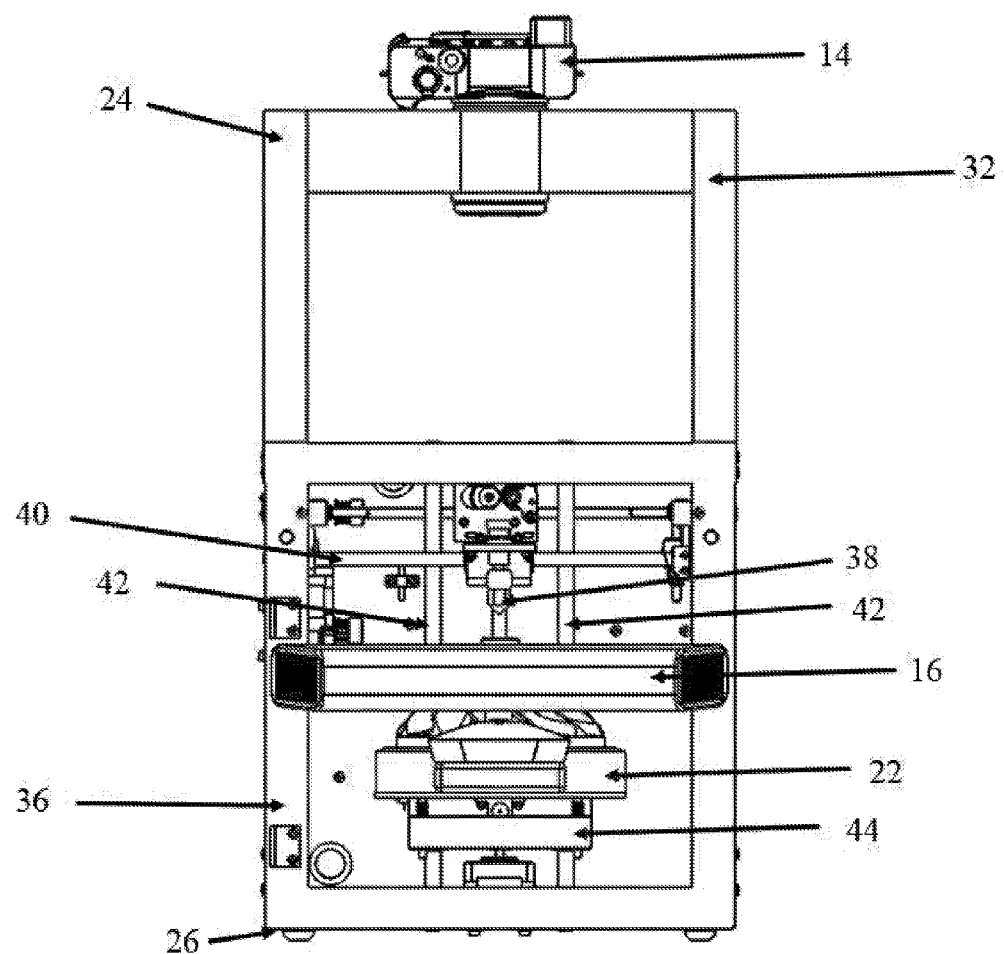
FIG. 4 illustrates a front plan view of the AM device shown in FIG. 2 in an embodiment.
Figure 5:
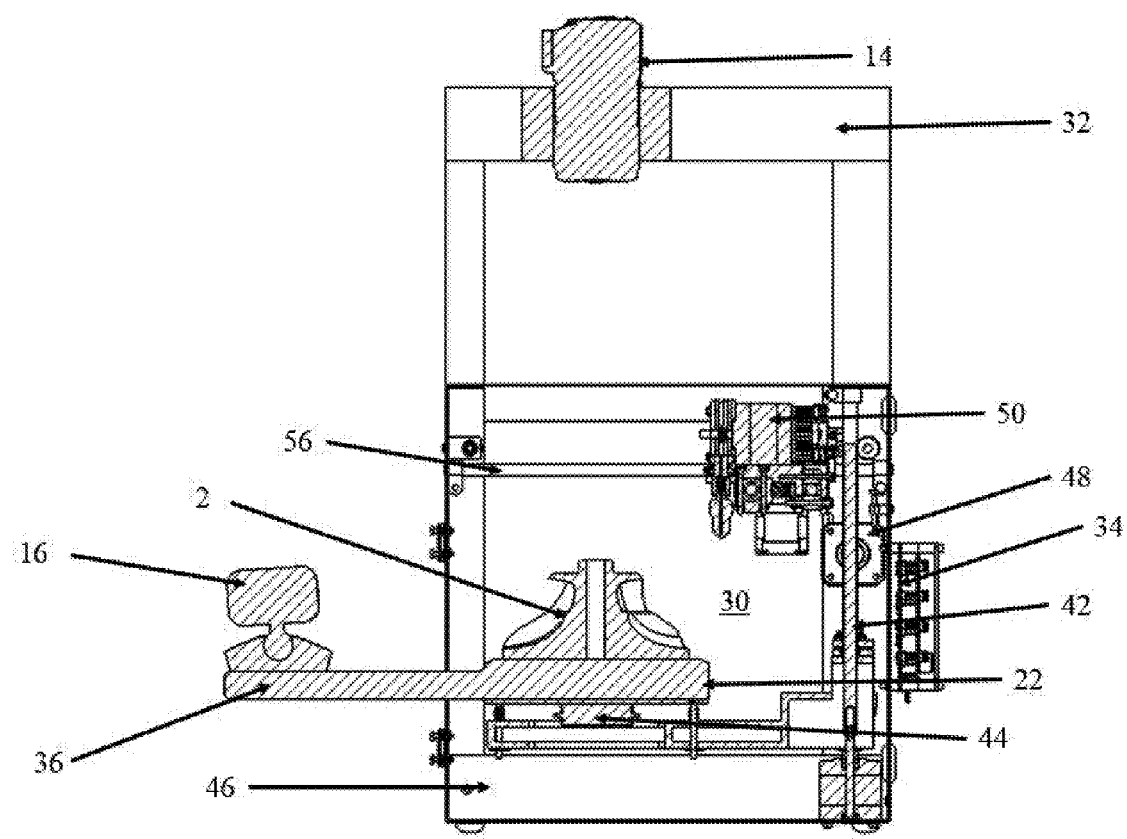
FIG. 5 illustrates a cross-section view of the AM device shown in FIG. 2 in an embodiment.
Figure 6:
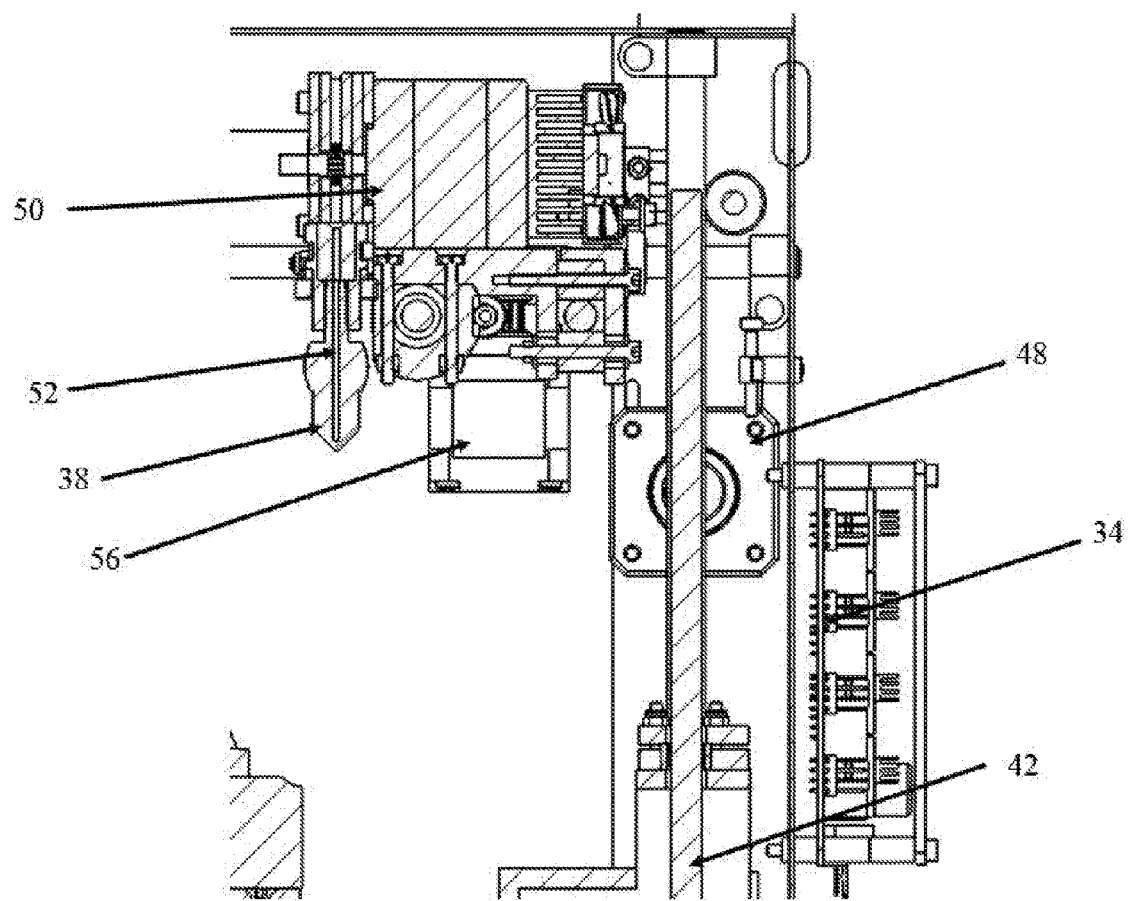
FIG. 6 illustrates a partial cross-section view of the AM device shown in FIG. 2 in an embodiment.

As shown in FIGS. 3-6, the first imaging device holder 32 may be located or positioned at, near or adjacent to the top end 26 of the AM device 12 and/or may have an opening or window formed therein which may be sized and/or configured to receive and/or hold the first imaging device 14 and/or at least a portion of the first imaging device 14. As a result, at least the first portion of the first imaging device 14 may be positioned within and/or may extend into the AM device 12 such that the at least first portion of the first imaging device 14 may be directed to, or pointed at, the interior 30 of the AM device 12. In an embodiment, the top end 26 may be comprised of the first imaging device holder 32 or at least a portion of the first imaging device holder 32. The first imaging device holder 32 may be a structure that may hold the first imaging device 14, or at least a portion thereof, in an appropriate position for acquiring, collecting, gathering and/or recording the one or more digital images and/or digital imaging data of the component 2 or subsequent components being built within the interior 30 of the AM device 12 during the AM process. In embodiments, one or more portions of the first imaging device holder 32 may extend downwardly away from the top end 24 of the AM device 12 towards the bottom end 26 of the AM device 12. In an embodiment, one or more of the perimeter sides 28, and/or portions thereof, of the AM device 12 may be formed by and/or may comprise one or more portions of the first imaging device holder 32 as shown in FIGS. 3, 5 and 6.

In embodiments, the platform 22 may be rotatable which may allow for an easier, improved and/or more effective collecting, recording and/or imaging of the one or more digital images and/or digital imaging data of the component 2 and/or the build layer being built by the AM device 12 by at least one of the imaging devices 14, 16. Alternatively, the second imaging device 16 may rotate around the component 2 during the AM process to collect, record and/or gather the one or more digital 3D images, digital 3D imaging data and/or X-ray images of the component 2 and/or the build layer being built by the AM device 12. In embodiments, the platform 22 and/or the top side or bed of the platform 22 may be heated to increase and/or improve the ability of the AM device 12 to build component 2 and/or subsequent components via the AM process. In some embodiments, the AM device 12 may comprise one or more heated build volumes in conjunction with one or more heated build platforms.

In embodiments, the controller 34 may be an interface between the terminal 18 and heating elements (not shown in the drawings), the Y-axis motor 48, the extruder motor 50 and/or the X-axis motor 54. The second imaging device connector 36 may extend outwardly away from the interior 30 of the AM device 12 and/or from the front side of the AM device 12 and/or may act as the physical connector between a bottom of the platform 22 and the second imaging device 16. As a result, the second imaging device 12 may be stationary and/or non-movable with respect to the platform 22 and/or directly connected and/or attached to the platform 22 via the second imaging device connector 36. The extruder head 38 may feed and/or extrude the material onto the platform 22 and/or the component 2 via a heated nozzle (not shown in the drawings) of the extruder head 38 to build and/or add one or more build layers of material onto the component 2 or subsequent components during the AM processes. In embodiments, the extruder head 38 may comprise a plurality of heated nozzles (not shown in the drawings) such that a plurality of same or different materials may be extruded onto the platform 22 and/or the component 2. In some embodiments, the AM device 12 may comprise a plurality of extruder heads (not shown in the drawings) and/or each extruder head 38 of the plurality of extruder heads may comprise a plurality of heated nozzles (not shown in the drawings). The extruder mobility 40 may act as a gantry for the X-axis and Y-axis of a build volume of the AM device 12, the platform mobility 42 may act as a gantry for the Z-axis of the build volume of the AM device 12, and/or the platform carrier 44 may house and/or contain the platform 22 which may sit, or be positioned, on top of the platform carrier 44.

Figure 7:
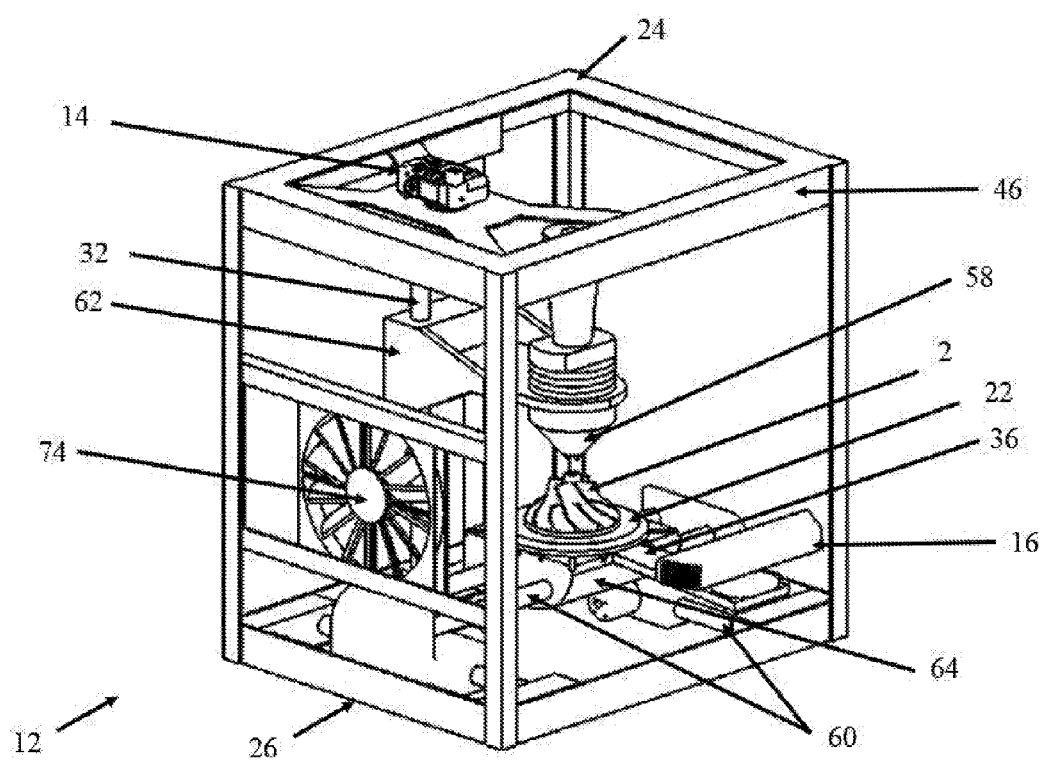
FIG. 7 illustrates a first perspective view of an AM device for building a component in another embodiment.
Figure 8:
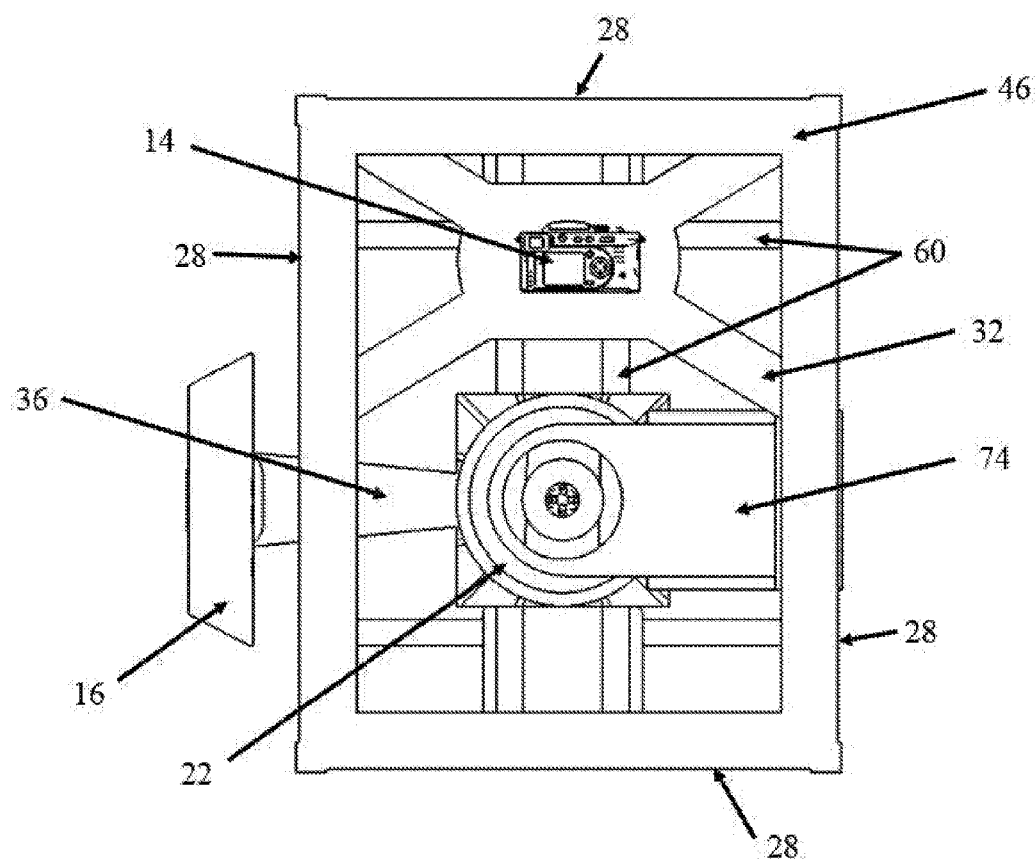
FIG. 8 illustrates a top plan view of the AM device shown in FIG. 7 in an embodiment.
Figure 9:
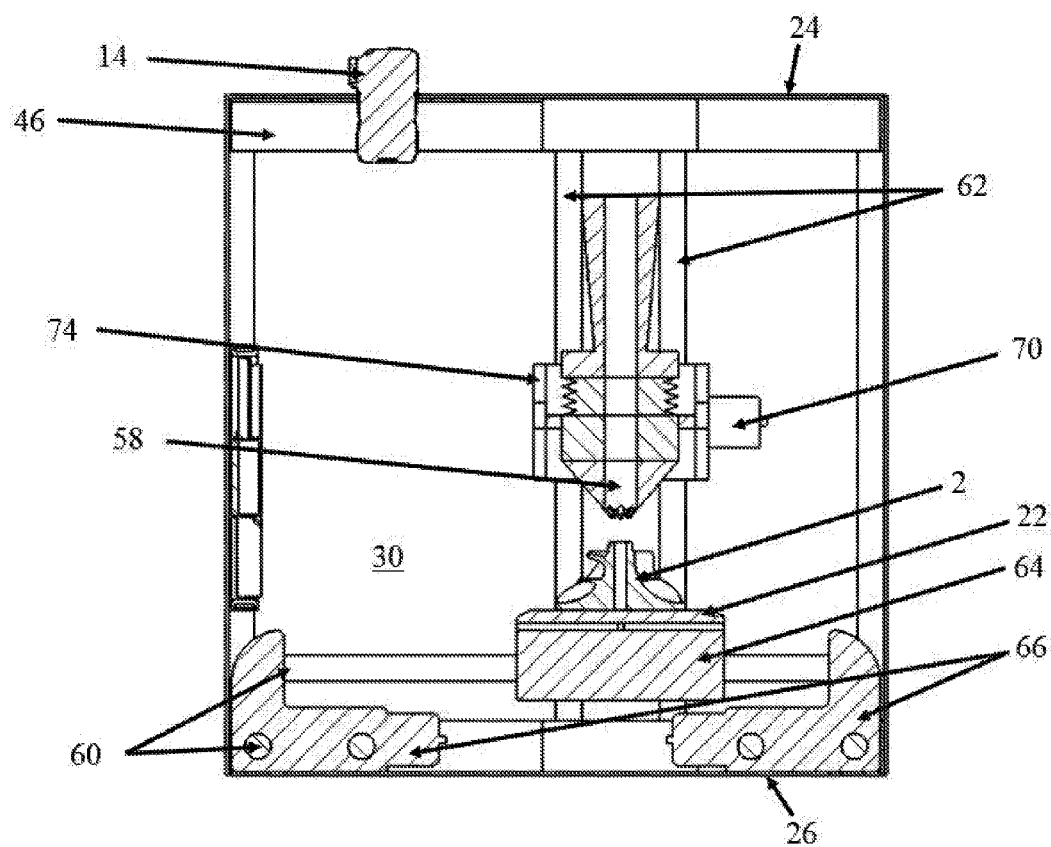
FIG. 9 illustrates a front cross-sectional view of the AM device shown in FIG. 7 in an embodiment.
Figure 10:
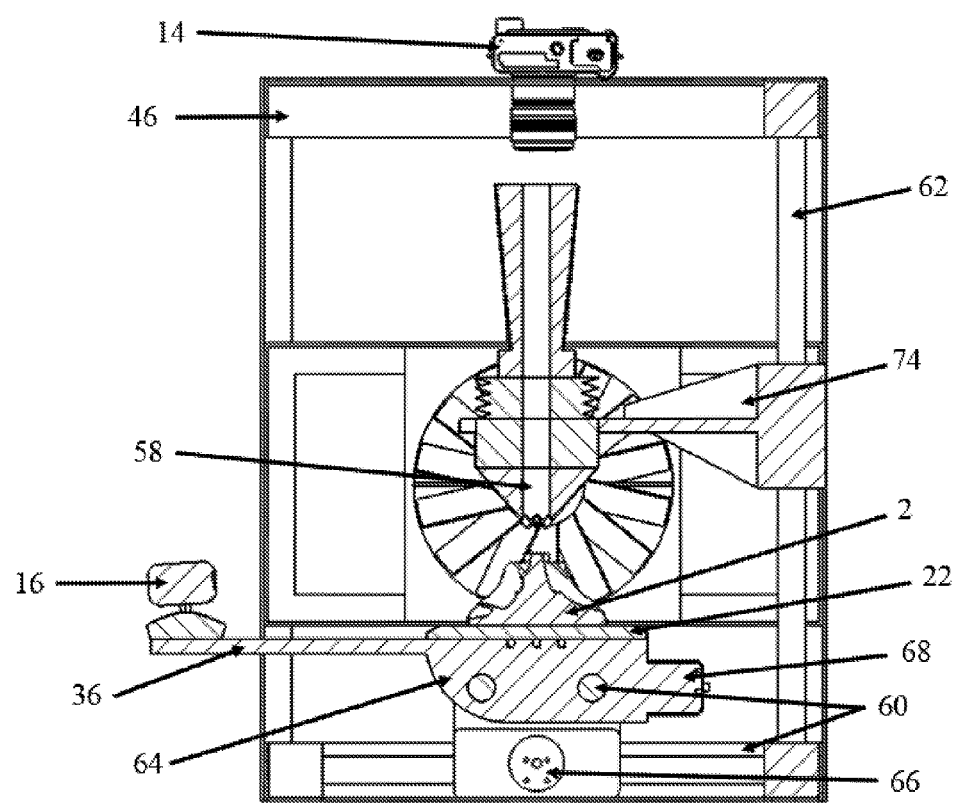
FIG. 10 illustrates a side cross-sectional view of the AM device shown in FIG. 7 in an embodiment.
Figure 11:
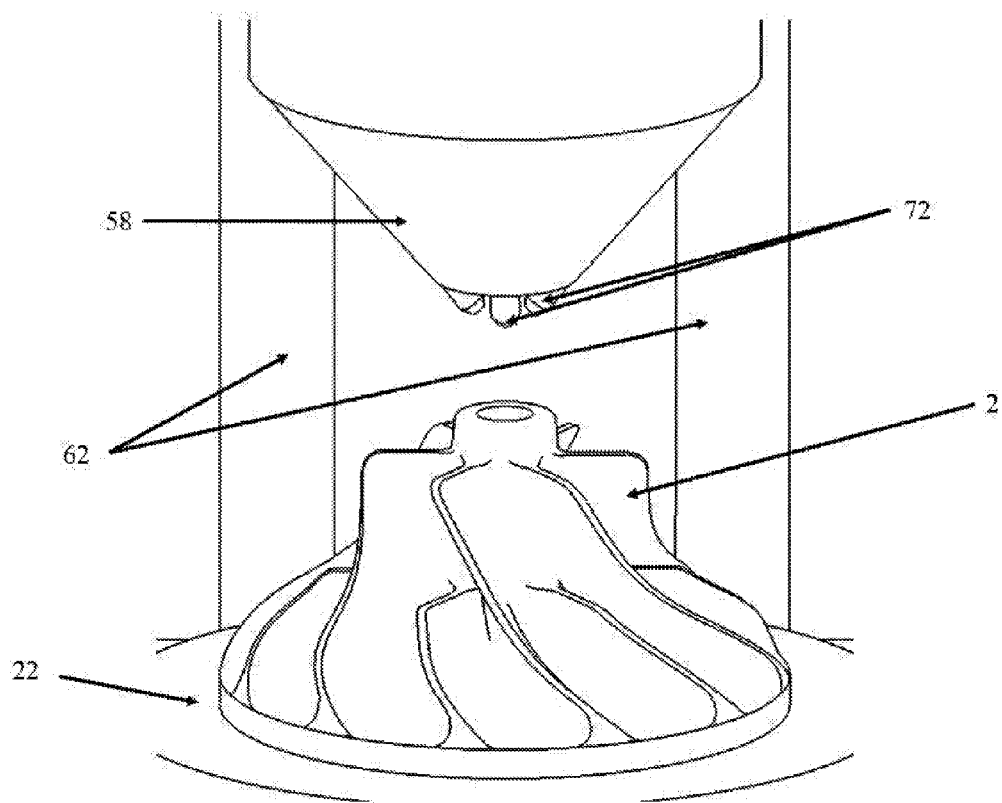
FIG. 11 illustrates a partial perspective view of the AM device shown in FIG. 7 in an embodiment.
Figure 12:
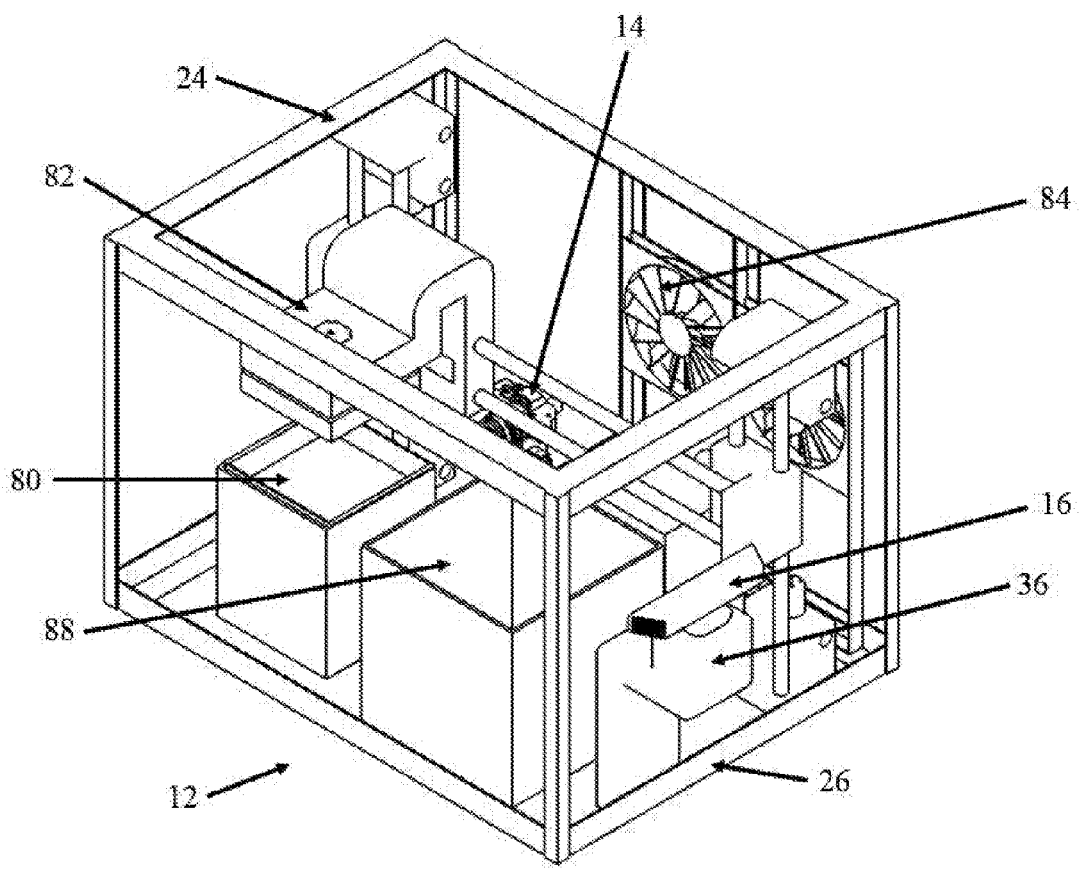
FIG. 12 illustrates a first perspective view of an AM device for building a component in yet another embodiment.
Figure 13:
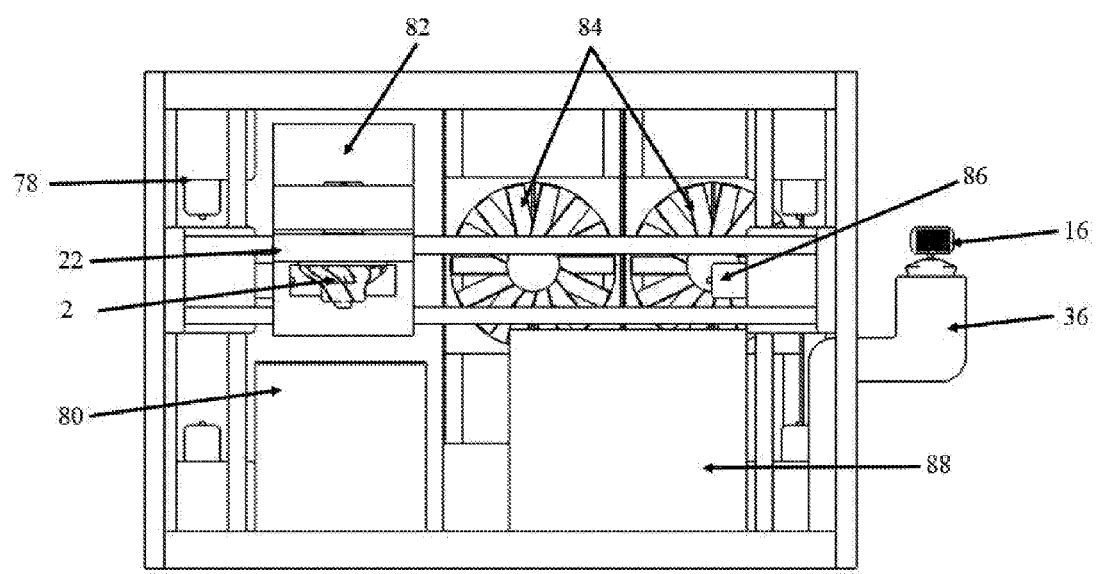
FIG. 13 illustrates a front plan view of the AM device shown in FIG. 12 in an embodiment.
Figure 14:
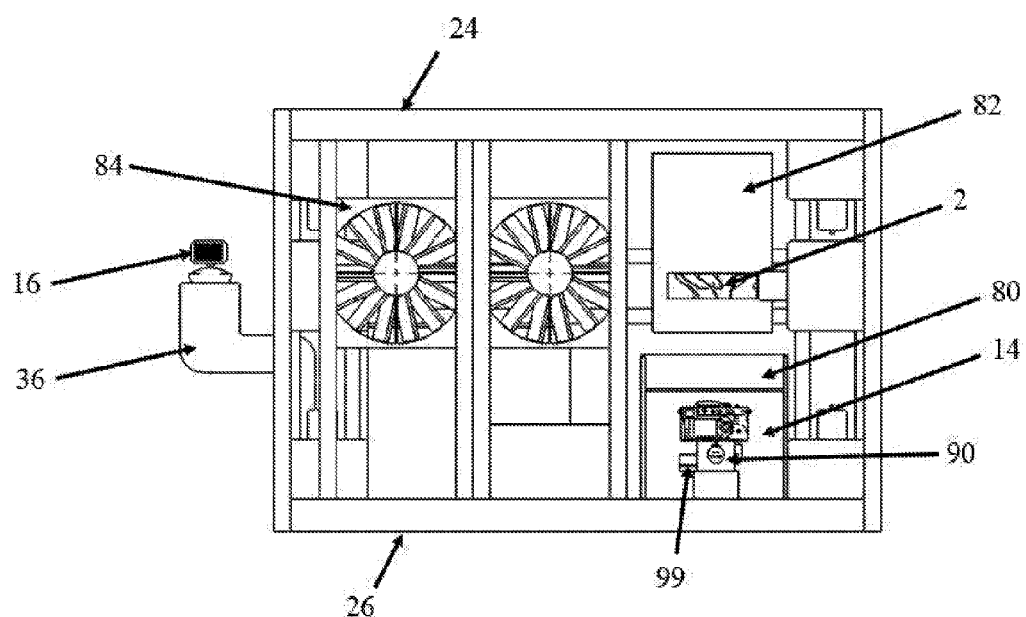
FIG. 14 illustrates a rear plan view of the AM device shown in FIG. 12 in an embodiment.
Figure 15:
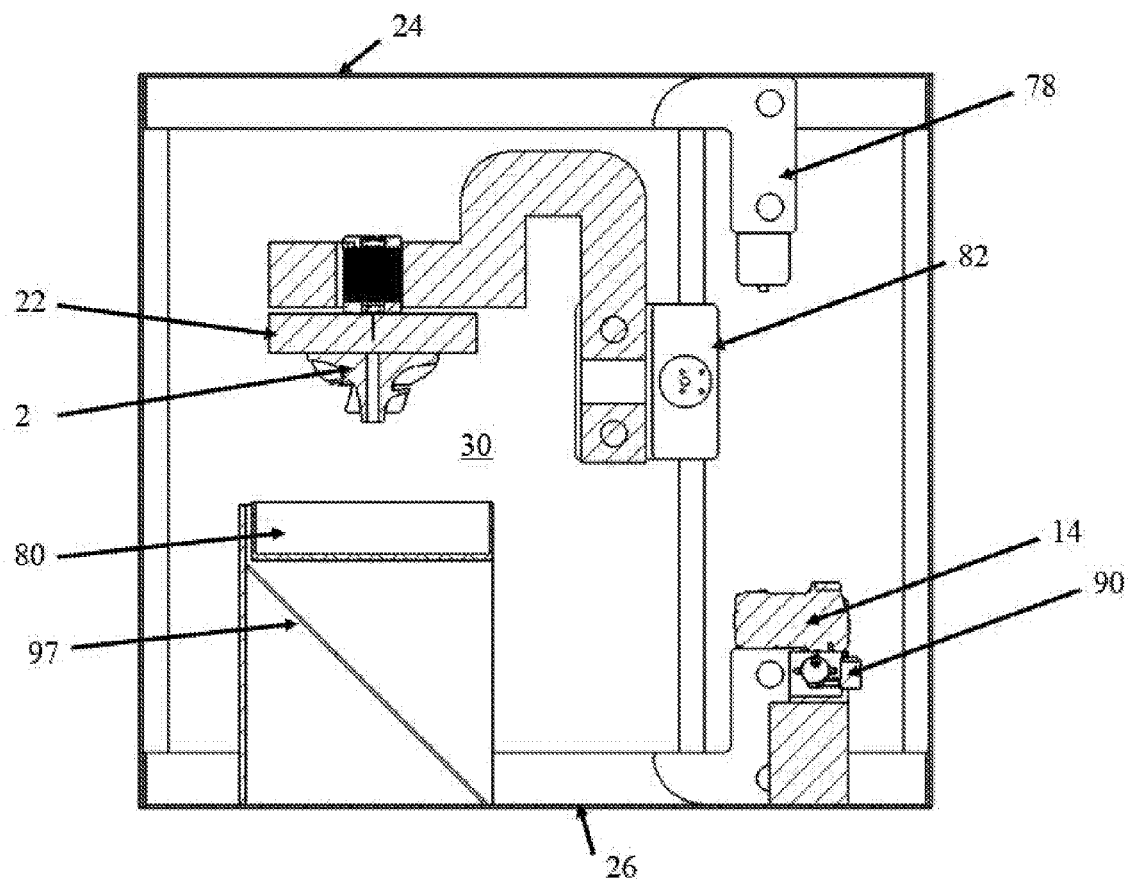
FIG. 15 illustrates a side cross-sectional view of the AM device shown in FIG. 12 in an embodiment.
Figure 16:
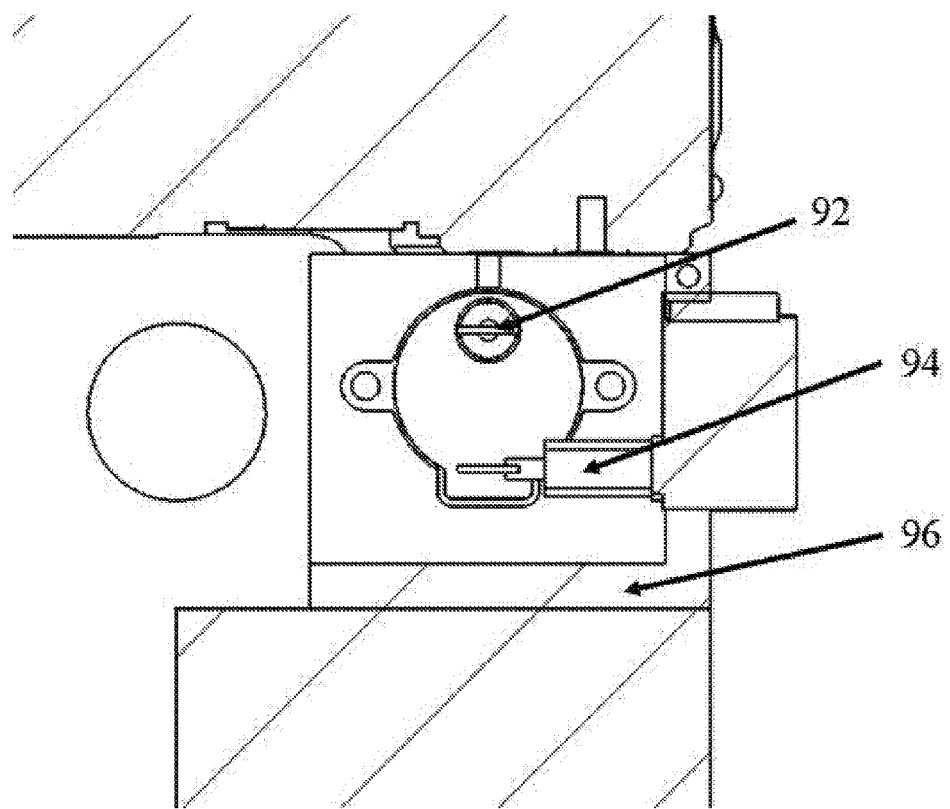
FIG. 16 illustrates a partial side cross-section view of the AM device shown in FIG. 12 and/or a galvanometer housing in an embodiment.
Figure 17:
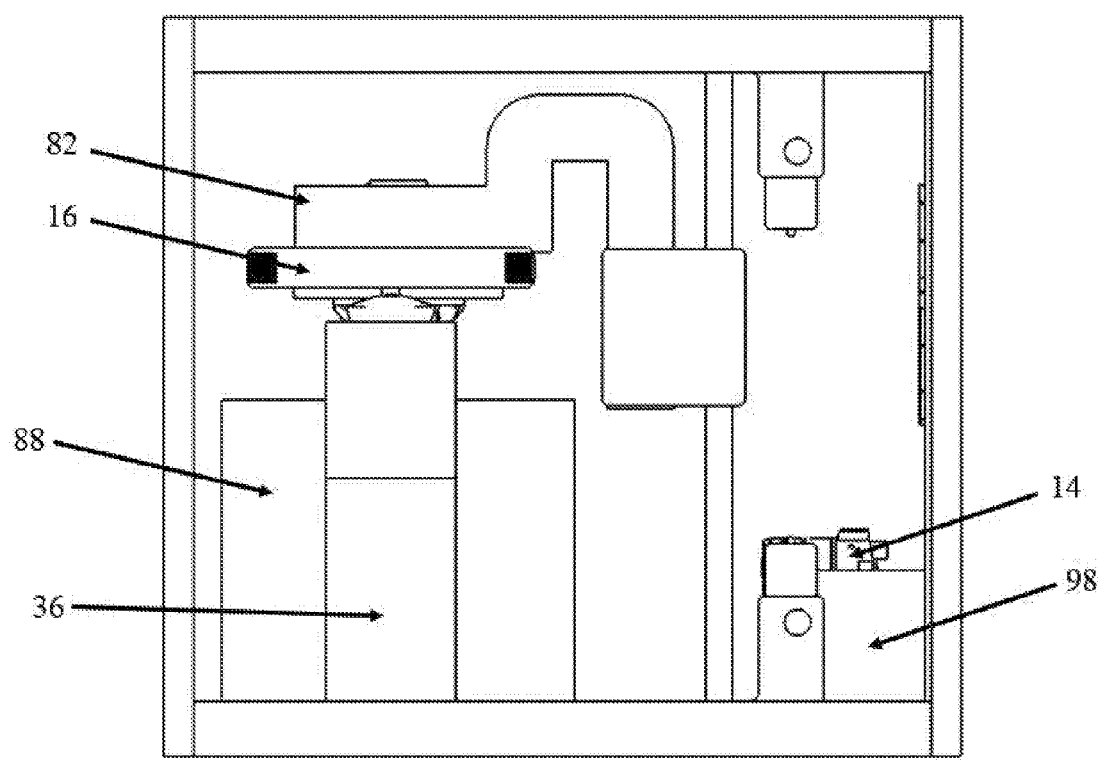
FIG. 17 illustrates a first side plan view of the AM device shown in FIG. 12 in an embodiment.
Figure 18:
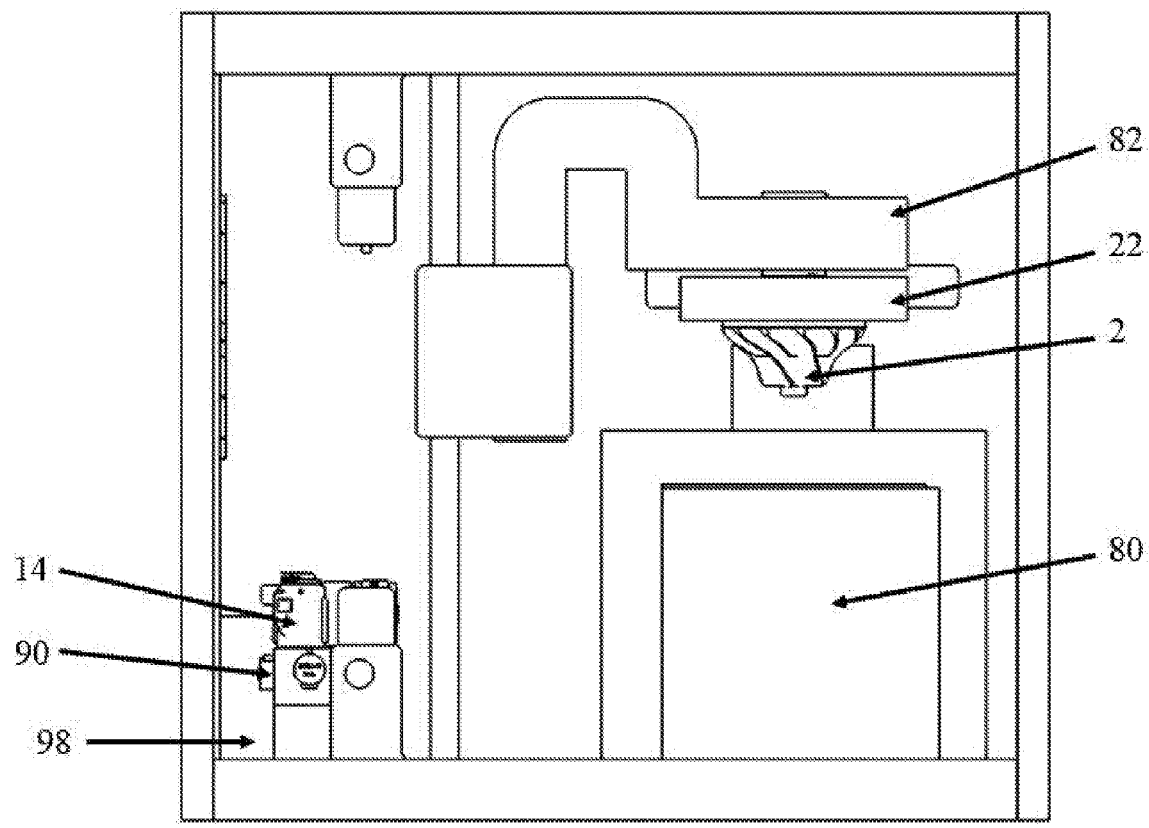
FIG. 18 illustrates a second side plan view of the AM device shown in FIG. 12 in an embodiment.
Figure 19:
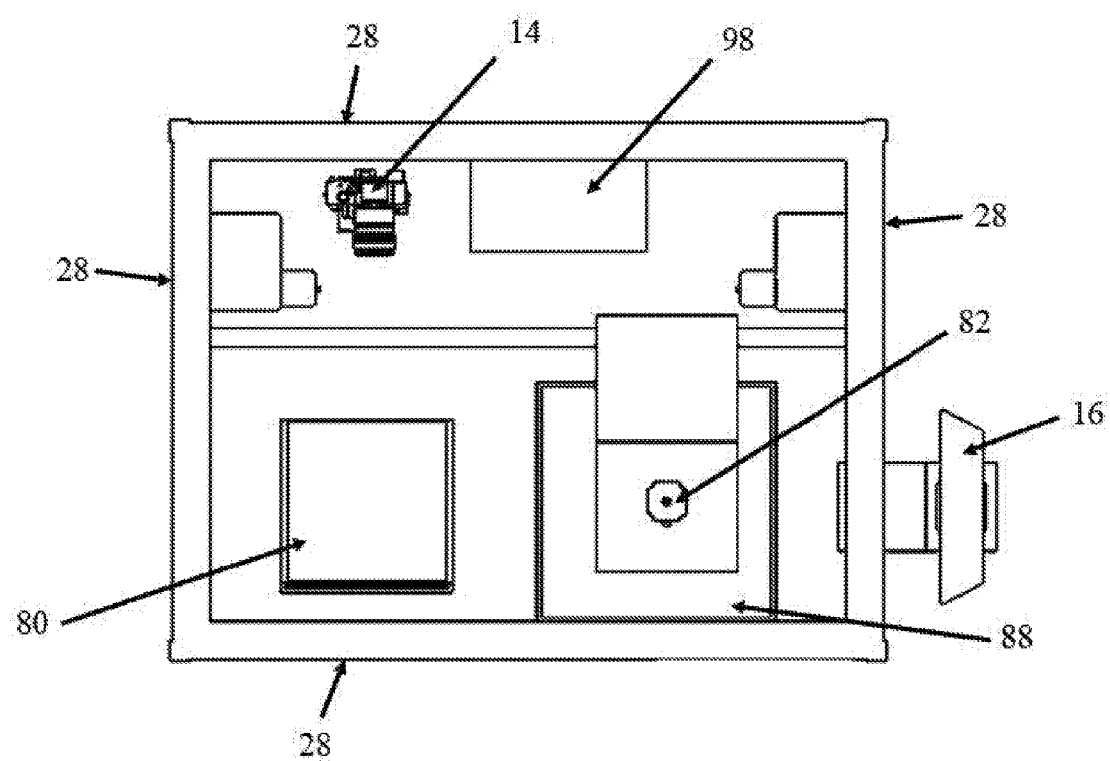
FIG. 19 illustrates a top plan view of the AM device shown in FIG. 12 in an embodiment.
Figure 20:
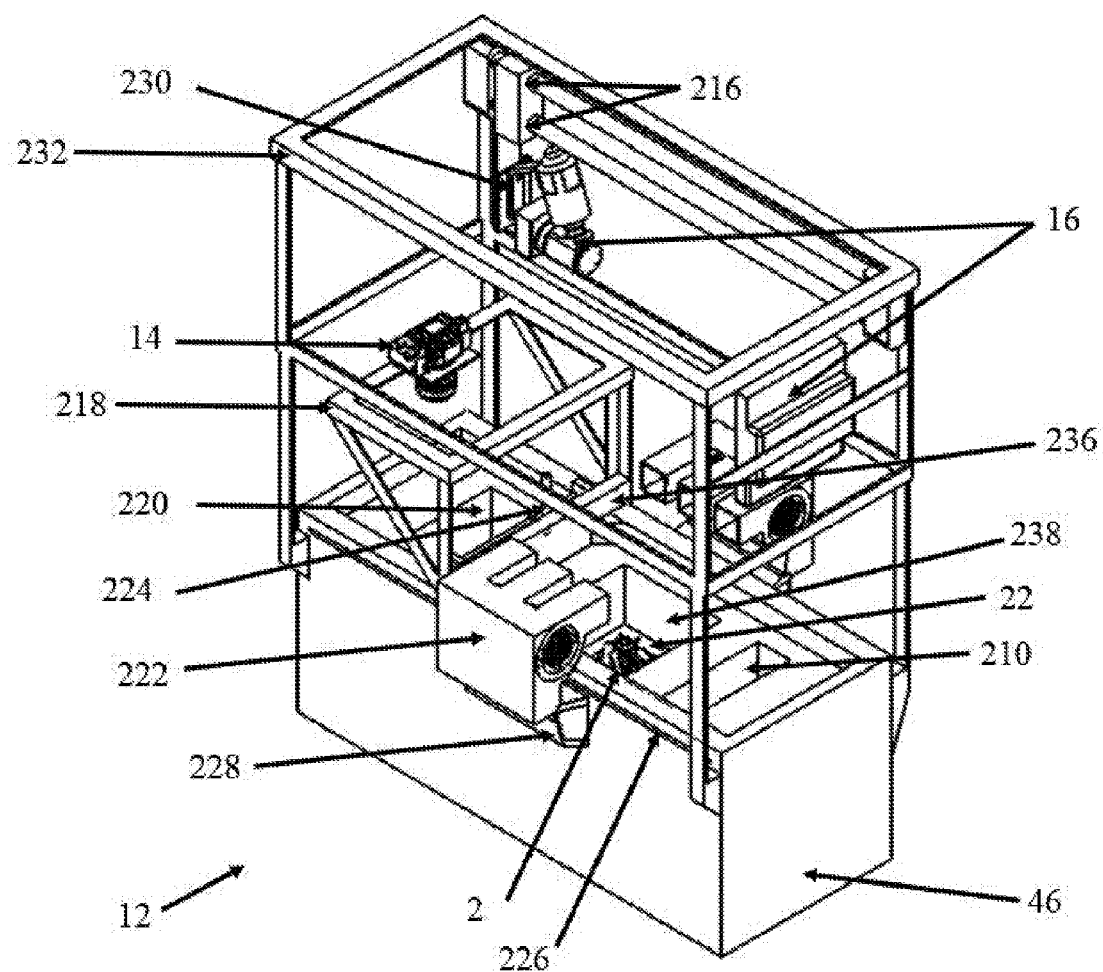
FIG. 20 illustrates a first perspective view of an AM device for building a component having a lowered build platform in yet another embodiment.
Figure 21:
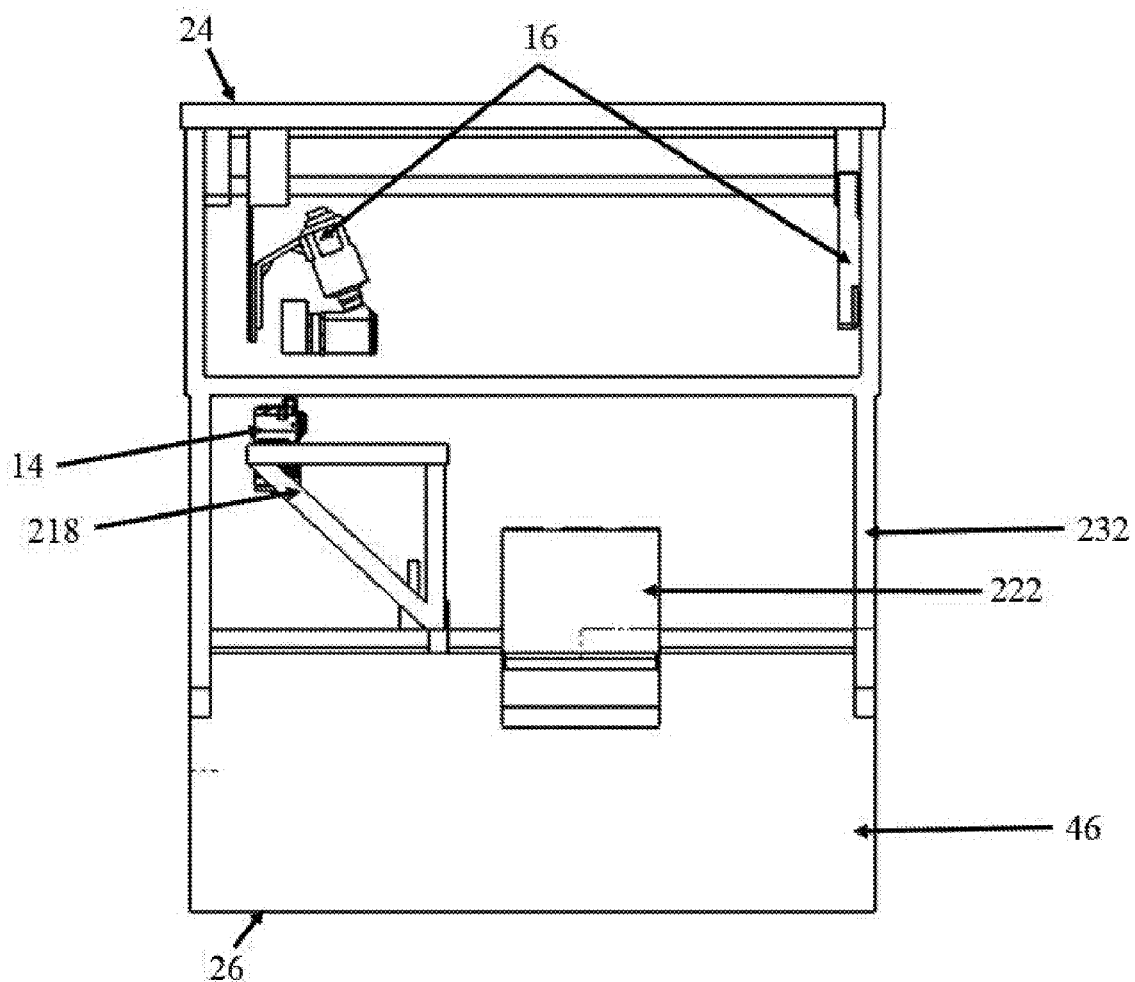
FIG. 21 illustrates a side plan view of the AM device shown in FIG. 20 having the lowered build platform in an embodiment.
Figure 22:
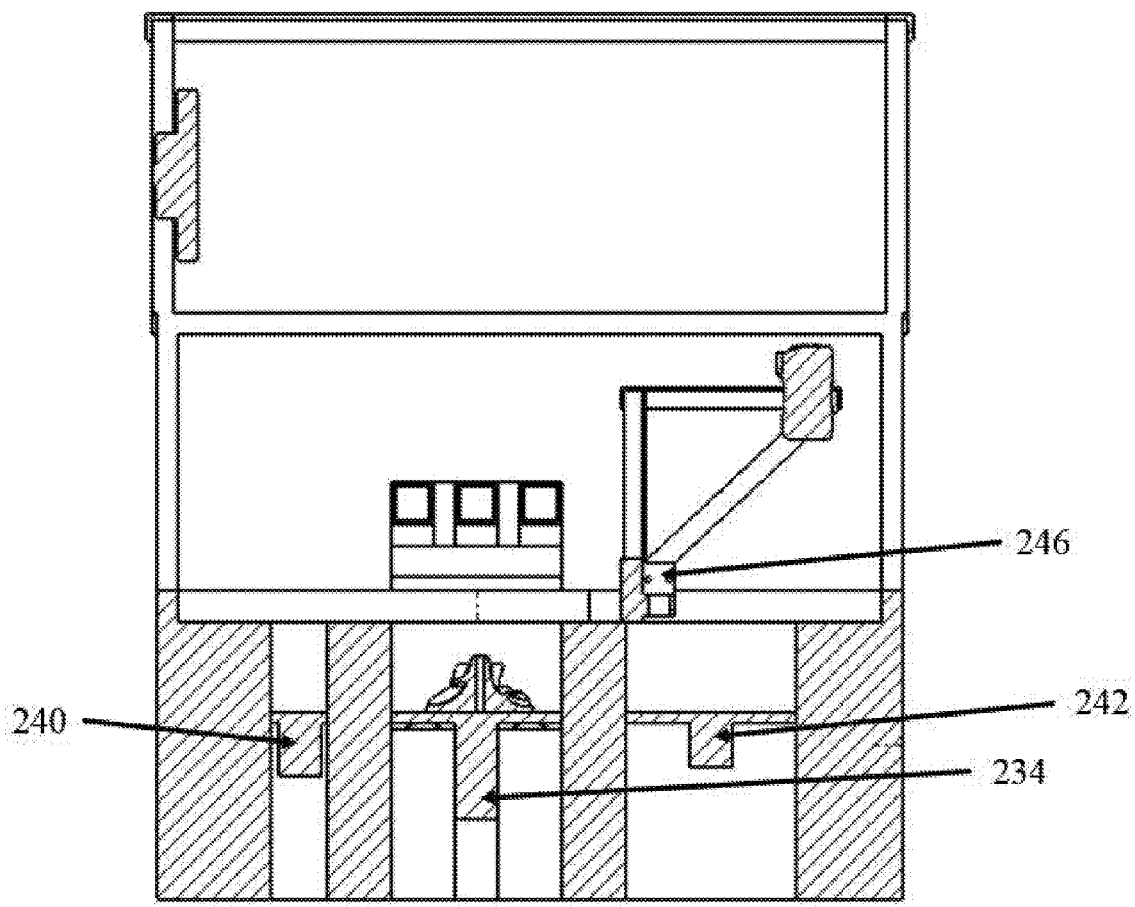
FIG. 22 illustrates a side cross-sectional view of the AM device shown in FIG. 20 having the lowered build platform in an embodiment.

As shown in FIGS. 5, 7 and 10, the frame 46 may house one or more of the components of the AM device 12 and/or may be located or positioned at, near and/or adjacent to the bottom end 26 of the AM device 12. In an embodiment, the bottom end 26 may comprise the frame 46 or at least a portion of the frame 46. In embodiments, one or more portions of the frame 46 may extend upwardly and away from the bottom end 26. In an embodiment, one or more of the perimeter sides 28, or at least portions of one or more of the perimeter sides 28 may be formed by and/or may comprise at least one or more portions of the frame 46. Moreover, the interior 30 of the AM device 12 may be defined within, or formed inside, the frame 46 and the first imaging device holder 32. Furthermore, the Y-axis motor 48 may control and/or facilitate the movement of an extruder carrier 56 along the Y-axis, the extruder motor 50 may feed extruder filament 52 through the heated extruder nozzle of the extruder head 58, the extruder filament 52 may comprise the material to be extruded by the extruder head 58 onto the platform 22 and/or the previously built component 2 which is already present on the platform 22, the X-axis motor 54 may control and/or facilitate movement of the extruder carrier 56 along the X-axis, and/or the extruder carrier 56 may house and/or surround the extruder motor 50 and/or the heated extruder nozzle of the extruder head 38. In an embodiment, the extruder motor 58 may feed a plurality of extruder filaments (not shown in the drawings) through a plurality of heated extruder nozzles (not shown in the drawings) of the extruder head 58. In some embodiments, extruder motor 58 may feed the plurality of extruder filaments through heated extruder nozzles of a plurality of extruder heads (not shown in the drawings) and/or through a plurality of heated extruder nozzles of each extruder head of the plurality of extruder heads (not shown in the drawings).

In an embodiment, the AM device 12 may utilize LENS as a means by with to produce, fabricate and/or build one or more of the components 2 as shown in FIGS. 7-11. The AM device 12 shown in FIGS. 7-11 may comprise one or more of the following LENS components: the first imaging device 14; the second imaging device 16; the component 2 being built by the AM device 12; the first device holder 32; the platform 22; the second device connector 36; a metal additive laser head (hereinafter "laser head 58"); a X/Y-axis rod for platform mobility 60 (hereinafter "platform mobility 60"); Z-axis rods for laser head mobility 62 (hereinafter "head mobility 62"); a X/Y-stage/platform carrier 64 (hereinafter "platform carrier 64"); the frame 46; a X-axis motor 66; a Y-axis motor 68, a Z-axis motor 70; metal additive injection nozzles 72 (hereinafter "injection nozzles 72"); a Z-stage laser mount/bracket 74 (hereinafter "laser mount 74"); and/or an excess additive removal fan 76 (hereinafter "removal fan 76").

As shown in FIGS. 7 and 9-11, the laser head 58 may be connected, attached and/or fastened to at least one of the top end 24, one perimeter side 28 and/or the first imaging device holder 32 and/or may emit a high intensity beam while injecting metal additive into the focal point of the beam. As a result, the metal additive may be cured to form and/or to add one or more layers of material to the platform 22 and/or the previously built component 2. The platform mobility 60 may act as the gantry for the X-axis and Y-axis of the build volume of the AM device 12; the head mobility 62 may act as the gantry for the Z-axis of the build volume of the AM device 12; the platform carrier 64 may house and/or contain the platform 22 which may sit on top of the platform carrier 64; and the frame 46 may house or contain one or more of the LENS components of the AM device 12 shown in FIGS. 7-11. In embodiments, the X-axis motor 66 may control the movement of the laser head 58 along the X-axis; the Y-axis motor 68 may control the movement of the laser head 58 along the Y-axis; and the Z-axis motor 70 may control the movement of the laser head 58 along the Z-axis. Moreover, the injection nozzles 72 may spray or dispense metal additive evenly, or at least substantially or partially evenly, into the focal of the laser beam provided from the laser head 58 such that the metal additive may be cured, sintered welded and/or laser welded; the laser bracket 74 may hold or maintain the laser head 58 in one or more positions, wherein the laser head 58 may be mountable through at least one hole or opening at a top of the laser bracket 74; and the removal fan 76 may remove any, or at least some, excess metal additive which may be left over from, or remain after, the AM process performed by the AM device 10. As a result of the excess metal additive removal, the imaging devices 14, 16 may collect, gather, record and/or produce clear high resolution digital images and/or X-rays images for the software to utilize and/or analyze to determine if the component 2 being built by the AM device 12 contains and/or exhibits any geometric anomalies that may not adhere to the given and/or predetermined tolerances set forth by, for example, the CAD file.

In an embodiment, the AM device 12 may utilize SLA as a means by with to produce, fabricate and/or build one or more of the components 2 as shown in FIGS. 12-19. The AM device 12 shown in FIGS. 12-19 may comprise one or more of the following SLA components: the first imaging device 14; the second imaging device 16; the component 2 being built by the AM device 12; the platform 22; the second device connector 36; the frame 46; a Z-axis rod and motor for platform mobility 78 (hereinafter "platform mobility 78")' a resin bin 80; a Z-stage/platform carrier 82 (hereinafter "platform carrier 82"); one or more drying fans 84; a X-axis rod and motor for platform mobility 86 (hereinafter "x-axis platform mobility 86"); an ultrasonic basin 88; a galvanometer 90; a Y-axis galvanometer 92; a X-axis galvanometer 94; a galvanometer and optical instrument frame 96 (hereinafter instrument frame 96"); a mirror 97; a circuit board and/or computer controller 98 (hereinafter "controller 98"); and/or a laser 99. In an embodiment, the ultrasonic basin 88 may be, for example, an automated isopropyl ultrasonic basin.

The platform mobility 78 may act as a gantry for the Z-Axis for raising and lowering the platform 22; the resin bin 80 may be a bin where with resin or build material may be poured and/or where the platform 22 may be lowered into during the AM process performed by the AM device 12; the platform carrier 82 may be a component that houses the platform 22, wherein the platform 22 may be connected to the platform carrier 82; and/or the one or more drying fans 84 may act as dryers for the component 2 when the component 2 may exit the ultrasonic basin 88 by blowing off any excess solvent or liquid from the component 2. Further, the X-axis platform mobility 86 may control the movement of the platform carrier 82 along the X-Axis; the ultrasonic basin 88 may be a basin to wash the component 2 in during the AM process to rid any excess resin or built material so as to not interfere with the imaging by the imaging devices 14, 16, and, then again, when the AM process is completed to clean the component 2 prior to removal from the platform 22; the galvanometer 90 may comprise one or more limited-rotation direct current motors that may drive one or more mirrors for laser-beam steering, which is achievable with at least one internal position detector that may enable a closed loop servo control of the motor by providing a position signal proportional to the rotation of the motor; the Y-axis galvanometer 92 may steer the laser-beam in the y-axis; and/or the X-axis galvanometer 94 may steer the laser-beam in the x-axis. Moreover, the instrument frame 96 may be a structure that may hold the galvanometers 92, 94, the laser 99 and/or the first imaging device 14 in the appropriate position for acquiring, capturing and/or recording the one or more digital images and/or digital imaging data; the mirror 97 may be positioned at a third angle to reflect the laser-beam up towards the platform 22, and may also allow the first imaging device 14 to capture a top view digital image(s) of the component 2; the controller 98 may be a circuit board controller that may be the interface between the terminal 18 and the AM device 12 and/or the imaging devices 14, 16; and the laser 99 may comprise a laser diode that may be utilized to set, or to solidify, the resin or build material during the AM process performed by the AM device 12. In an embodiment, the third angle may be greater than about forty-five degrees, less than about forty-five degrees or about forty-five degrees.

In an embodiment, the AM device 12 may utilize EBM as a means by which to produce, fabricate and/or build one or more of the components 2 as shown in FIGS. 20-29. The AM device 12 shown in FIGS. 20-29 may comprise one or more of the following EBM components: the first imaging device 14; the second imaging device 16; the component 2 being built by the AM device 12; the platform 22; the frame 46; a powder overflow bin 210; a CT scanner X-axis travel stage 216; an optics bracket for recoater blade 218; a feed powder bin 220; a powder removal vacuum system 222; an electron beam source 224; a recoater X-axis travel path 226; a powder removal vacuum pivot assembly 228; a CT scanner pivot assembly 230; a device frame 232; a recoater blade 236; a build powder bin 238; an overflow powder platform 240; a build powder platform 234; a feed powder platform 242; build platform hydraulics 244; a Y-axis motor and carriage 246; and/or Y-axis travel rails 248.

The powder overflow bin 210 may be configured and/or adapted such that any excess powder that is leftover or remaining after the recoater blade 236 has placed powder in the feed powder bin 220 may be pushed into the powder overflow bin 210 and recycled for later use via a manual and/or automatic sieve; the CT scanner X-axis travel stage 216 may able to move different distances from the component 2 on the platform 22 and thus may utilize said travel stage to do so; the optics bracket for recoater blade 218 may affix the first imaging device 14 to the recoater blade 236; and the feed powder bin 220 may feed material to the recoater blade 236 such that the fed material may be pushed over to the build powder bin 238. Additionally, the powder removal vacuum system 222 may remove any excess powder from the build powder bin 238 prior to moving the platform 22 up to where the platform 22 and/or built component 2 may be imaged and/or scanned by the second imaging device 16; an electron beam source 224 may provide thermal energy necessary and/or required to melt the powder material into the component 2 being built by the AM process performed by the AM device 12; a recoater X-axis travel path 226 may depict and/or provide the path the recoater blade 236 may utilize to bring powder material from one bin to another bin; and/or the powder removal vacuum pivot assembly 228 may allow for the powder removal vacuum system 222 to move such that the platform 22 may be raised and/or lowered.

Further, the CT scanner pivot assembly 230 may allow for the collection of data and/or X-ray images via the second imaging device 16 at one or more different angles; the device frame 232 may sit on top of the frame 46 and/or may house the second imaging device 16; the recoater blade 236 may push or more build material from one bin to another bin; the build powder bin 238 may hold or store build material that may be subsequently melted to the platform 22 and/or the built component 2; and/or the overflow powder platform 240 may lower and/or raise as powder fills the powder overflow bin 210 via the recoater blade 236. Still further, the build powder platform 234 may lower and/or raise as powder fills the build powder bin 238; the feed powder platform 242 may lower and/or raise as the recoater blade 236 may push powder into the build powder bin 238; the build platform hydraulics 244 may lower and/or raise the build powder platform 234 with respect to the second imaging device 16; the Y-axis motor and carriage may carry and/or move the electron beam source 224 and/or may sit or rest on the Y-axis travel rails 248; and/or the Y-axis travel rails may depict, provide and/or control the travel path for the electron beam source 224 during the AM process executed and/or performed by the AM device 12.

In an embodiment, the AM device 12 may utilize DMLS as a means by which to produce, fabricate and/or build one or more of the components 2 as shown in FIGS. 30-39. The AM device 12 shown in FIGS. 30-39 may comprise one or more of the following DMLS components: the first imaging device 14; the second imaging device 16; the component 2 being built by the AM device 12; the platform 22; the frame 46; a powder overflow bin 252; a build powder bin 256; a laser source 258; a galvanometer housing 260; a recoater blade 262; a device frame 264; an optics bracket for recoater blade 266; a feed powder bin 268; a powder removal vacuum system 270; a powder removal vacuum pivot assembly 274; a recoater blade X-axis 276; a feed powder platform 278; a build powder platform 254; an overflow powder platform 280; pivot for CT scanner 282; a CT scanner X-axis travel stage 284; a X-axis galvanometer 286; a Y-axis galvanometer 288; a galvanometer housing frame 290; and/or a substrate platform lift 292

The powder overflow bin 252 may be configured and/or adapted such that any excess powder material that is leftover and/or remains after the recoater blade 262 has placed powder in the feed powder bin 268 may be pushed into said bin 252 and/or recycled for later use via a manual and/or automatic sieve; the build powder bin 256 may hold and/or store build material that may be melted to the platform 22 and/or the built component 2; the laser source 258 may provide laser power and/or correct wavelength require to melt the powdered material during the AM process; the galvanometer housing 260 may house the X-axis galvanometers 286 and/or the Y-axis galvanometers 288; and the recoater blade 262 may push and/or move the build material from one bin to another bin. Additionally, the device frame 264 may sit on top of the frame 22 and/or may house the second imaging device 16; the optics bracket for recoater blade 266 may affix the first imaging device 14 to the recoater blade 262; the feed powder bin 268 may feed build material to the recoater blade 262 such that the build material may be pushed or move over to the build powder bin 254; and/or the powder removal vacuum system 270 may remove any excess build powder from the build powder bin 254 prior to moving the platform 22 up to where it may be imaged by the second imaging device 16.

Further, the powder removal vacuum pivot assembly 274 may allow for the powder removal vacuum system 270 to move with respect to the platform 22 when the platform 22 may be raised and lowered; the recoater blade X-axis 276 may control the direction of travel for the recoater blade 262; the feed powder platform 278 may lower and/or raise as the recoater blade 262 and/or may push build powder into the build powder bin 252; and the build powder platform 254 may lower and/or raise as build powder fills the build powder bin 252. Still further, the overflow powder platform 280 may lower and/or raise as build powder fills the powder overflow bin 252 via the recoater blade 262; the pivot for CT scanner 282 may allow for the collection of data via the second imaging device at different angles; and/or the CT scanner X-axis travel stage 284 may be able to move different distances from the component 2 on the platform 22 and/or may utilize said travel stage and/or rails to facilitate said movement. Moreover, the X-axis galvanometer 286 may direct the laser-beam in the x-axis; the Y-axis galvanometer 288 may direct the laser-beam in the y-axis; the galvanometer housing frame 290 may include holes and fixtures required to mount the galvanometers 286, 288 in the correct and/or accurate position or location; and/or the substrate platform lift 292 may lower and/or raise the build powder platform 254 up to the second imaging device 16 for imaging and/or collection of one or more digital 3D images, digital 3D data and/or one or more X-rays.

In embodiments, the imaging devices 14, 16 may be integrated into and/or associated with the AM device 12 to act as the primary feedback loop, wherein the second imaging device 16 may sit in parallel with the platform 22 or the top surface of the platform 22 to produce, generate and/or collect the one or more digital 3D images, digital 3D imaging data and/or one or more X-ray images of the component 2 at pre-determined stages of the AM process. The first imaging device 14, that may collect, gather and/or record the one or more digital 2D images and/or digital 2D imaging data, may simultaneously or subsequently collect the one or more digital images and/or digital imaging data perpendicular to the platform 22.

In an embodiment, the system 10 comprises the terminal 18 in digital communication with the AM device 12 and the imaging devices 14, 16, wherein the first imaging device 14 collects digital 2D images or data of the component 2 during the AM process performed or executed by the AM device 12 that is based on a virtual or digital model or image of the component 2. The second imaging device 16 collects digital 3D images or data and/or X-ray images of the component 2 during the AM process performed or executed by the AM device 12 that is based on the virtual or digital model or image of the component 2. The collected digital 2D and 3D images or data and/or X-ray images may be analyzed by the terminal 18 and/or software executed by the terminal 18 to create a revised virtual or digital model or image so that the AM device 12 may account for, and/or may correct, any build inconsistencies, build discrepancies and/or tolerancing errors (hereinafter collectively known as "build errors") detected, determined and/or recognized during the analysis of the collected digital 2D and 3D images or data and/or X-ray images. As a result, the AM device 12 may build subsequent components that exclude previously discovered build errors based on the revised virtual or digital model or image created by the terminal 18 and/or the software executed by the terminal 18. The one or more subsequently built components may be based on a corrected 3D printable file whereby the revised virtual or digital model or image has been incorporated into the line by line code of the corrected 3D printable.

The collected 2D and 3D digital images or data and/or X-ray images (hereinafter "collected data") collected by the imaging devices 14, 16 at various elevations with respect to the component 2 may be relayed or transmitted to the terminal 18, which feeds and/or controls the AM device 12.

In an embodiment, the terminal 18 feeds line by line code to the AM device 12 which is utilized by the AM device 12 to build the component 2 and/or the one or more subsequent components. The collected data may comprises one or more digital 2D images, one or more digital 3D images, digital 2D imaging data, digital 3D imaging data and/or one or more X-ray images collected by the imaging devices 14, 16 at various elevations with respect to the component 2 during the AM process performed or executed by the AM device 12. Geometric data may be pulled and/or extracted from the collected data and/or analyzed by the terminal 18 and/or the software executed by the terminal 18. Said geometric data, after extraction, may be cross-referenced and/or compared with the virtual or digital model or image of the component 2 as set forth in the CAD file and/or 3D printable file associated with the component 2.

Any build errors between the extracted geometric data and the virtual or digital model or image of the component 2 may be detected, determined and/or recognized by a secondary loop which comprises the software executable by the terminal 18. In an embodiment, the software may be the same software, similar software or different software that may feed the line by line code to the AM device 12. Based on the detected, determined and/or recognized build errors, the software may create geometric offsets throughout the virtual or digital model or image and/or may create a revised or corrected virtual or digital model or image of the component 2. As a result, the tool build path of the AM device 12 may account for any detected, determined and/or recognized build errors when the AM device builds one or more subsequent components.

The revised or corrected virtual or digital model or image may account for and/or correct any detected build errors that may have led to previously detected build errors caused by the AM device 12. The software may change the line by line code of CAD file and/or 3D printable file associated with the component 2 to incorporate the revised or corrected virtual or digital model or image for the component 2. The software may prompt a user of the AM device 12 to clear the platform 22 of the component 2 with the build errors or may allow the AM device 12 to continue building the component 2 to completion.

In embodiments, the software and/or the terminal 18 may deliver a revised or corrected virtual or digital model or image which may allow for the production and/or fabrication of a revised or corrected CAD and/or 3D printable file containing the correct geometric parameters that account for the detected build errors without the need of a highly trained CAD operator and AM device operator. The present system 10 and/or the methods 100, 200, 300 may provide the revised or corrected CAD and/or 3d printable file to the AM device 12 for building one or more subsequent components that exclude any and all detected build errors. As a result, the present system 10 and/or methods 100, 200, 300 may allow for the consistent fabrication of the component 2 and/or subsequent components with geometric parameters that match the original CAD or 3D printable file or the revised or corrected CAD or 3D printable file.

In embodiments, the collected digital 2D images and/or data, the collected digital 3D images and/or data, the collected X-ray images, the CAD file of the component 2, the 3D printable file of the component 2, the revised or corrected CAD file, the revised or corrected 3D printable file, any results from comparing and/or analyzing the collected images and/or data and the CAD file and/or the 3D printable file, from determining and/or detecting the one or more build errors, and/or from any of the present methods may be stored in any memory storage unit associated with the terminal and/or may be stored in any digital computer format as known to one of ordinary skill in the art.

The present systems and methods for detecting or determining one or more build errors and/or subsequently correcting or accounting for those build errors may utilize, perform and/or execute, but are not limited to, at least one of the methods 100, 200, 300 and/or one or more of the sub-methods 400, 500, 600, 700, 800, 900, 1000, 1100, 1200, 1300, 1400, 1500, 1600, 1700 illustrated by the flowcharts set forth in FIGS. 40-56. The methods and/or sub-methods set forth in FIGS. 40-56 are non-limiting examples that may effectively calibrate the AM device 12 and built at least one subsequent component that accounts for, and/or corrects, at least one build error detected in a previously built component, such as, component 2.

Figure 23:
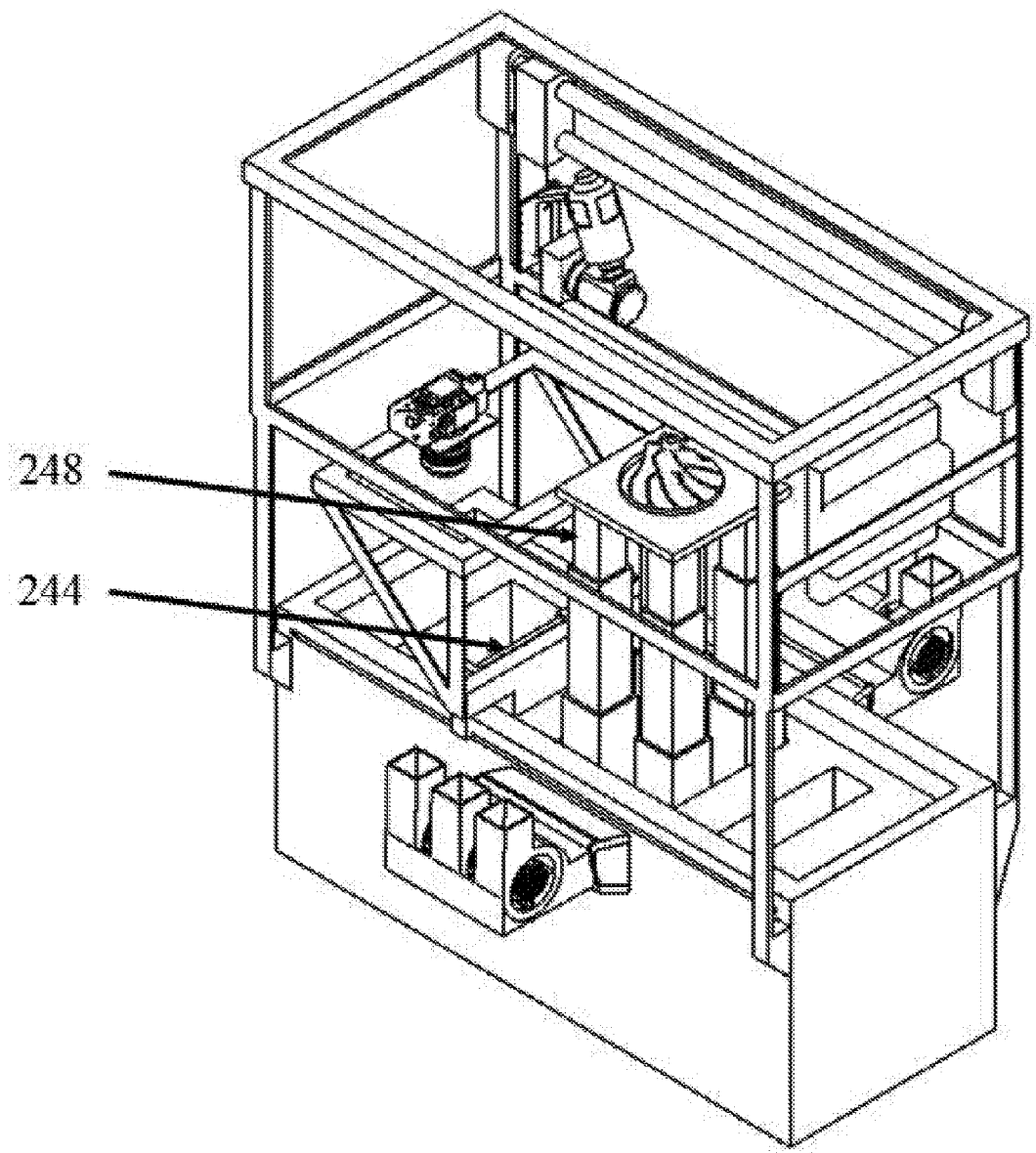
FIG. 23 illustrates a second perspective view of the AM device shown in FIG. 20 having a raised build platform in an embodiment.
Figure 24:
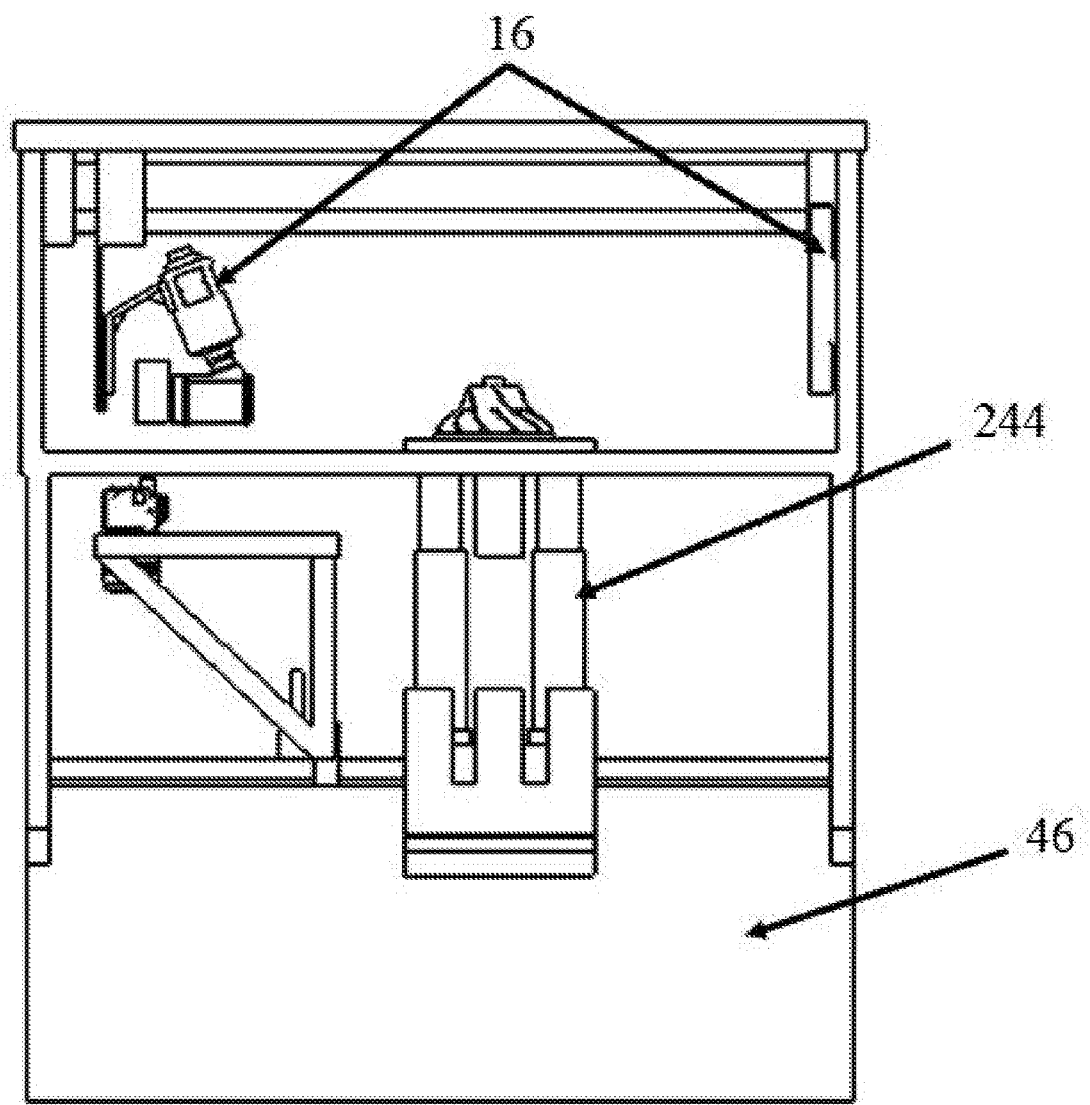
FIG. 24 illustrates a side plan view of the AM device shown in FIG. 20 having the raised build platform in an embodiment.
Figure 25:
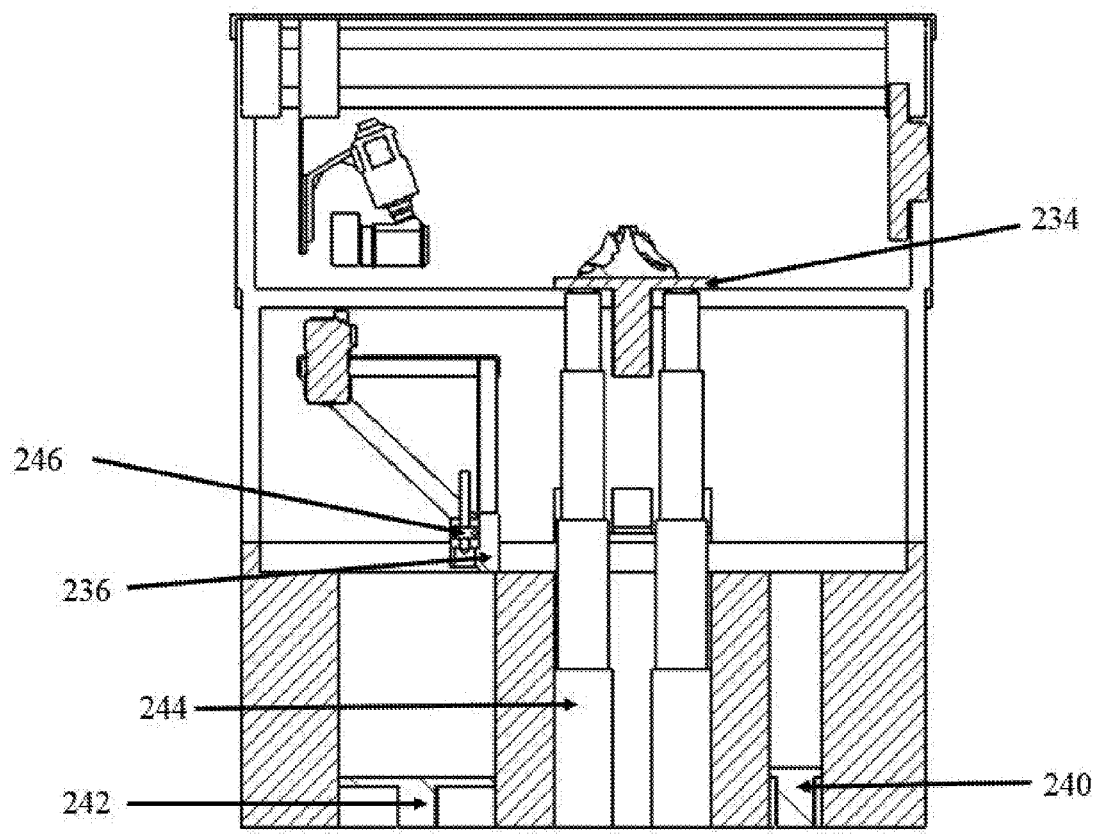
FIG. 25 illustrates a cross-sectional view of the AM device shown in FIG. 20 having the raised build platform in an embodiment.
Figure 26:
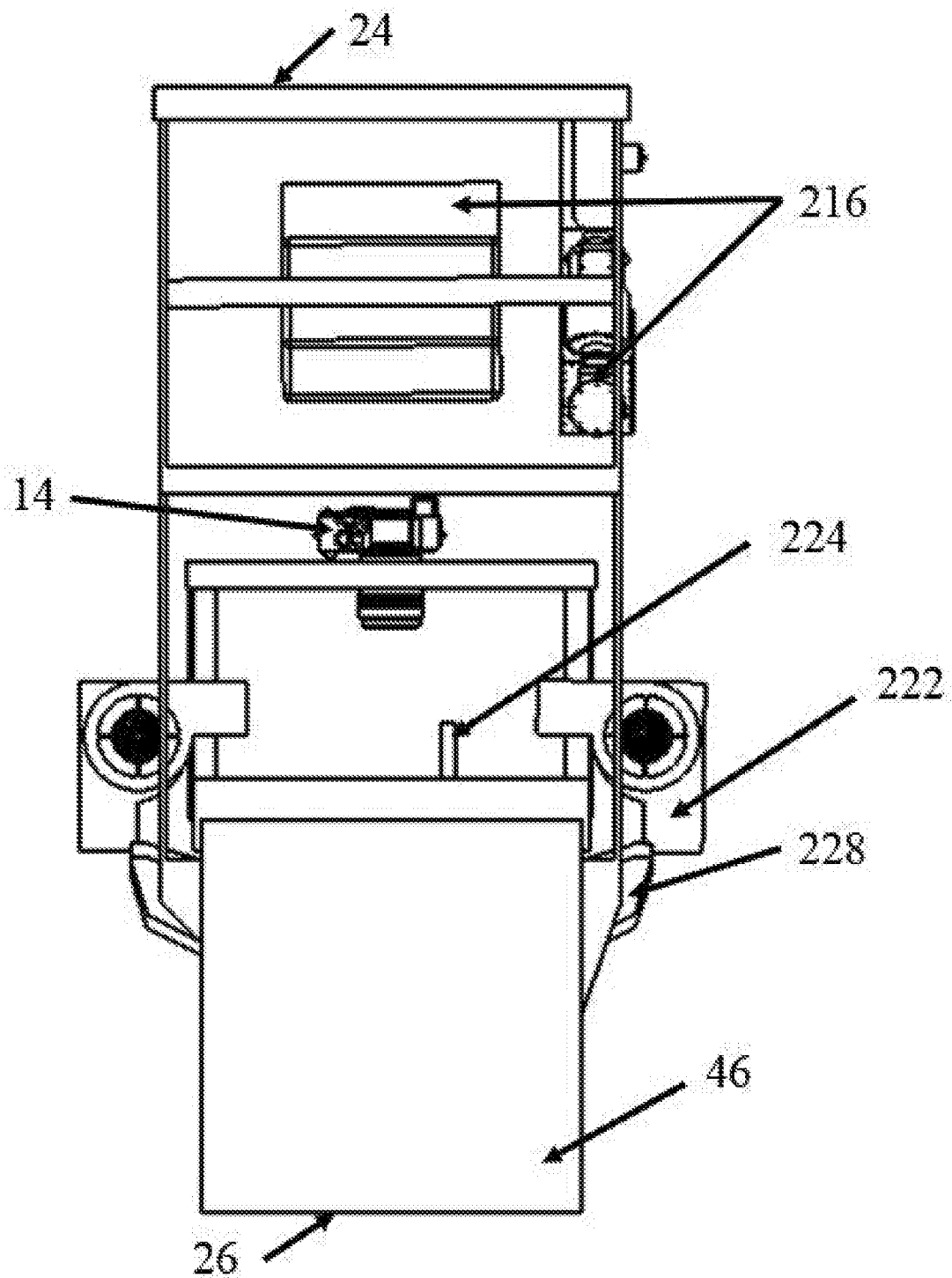
FIG. 26 illustrates a front plan view of the AM device shown in FIG. 20 having the lowered build platform in an embodiment.
Figure 27:
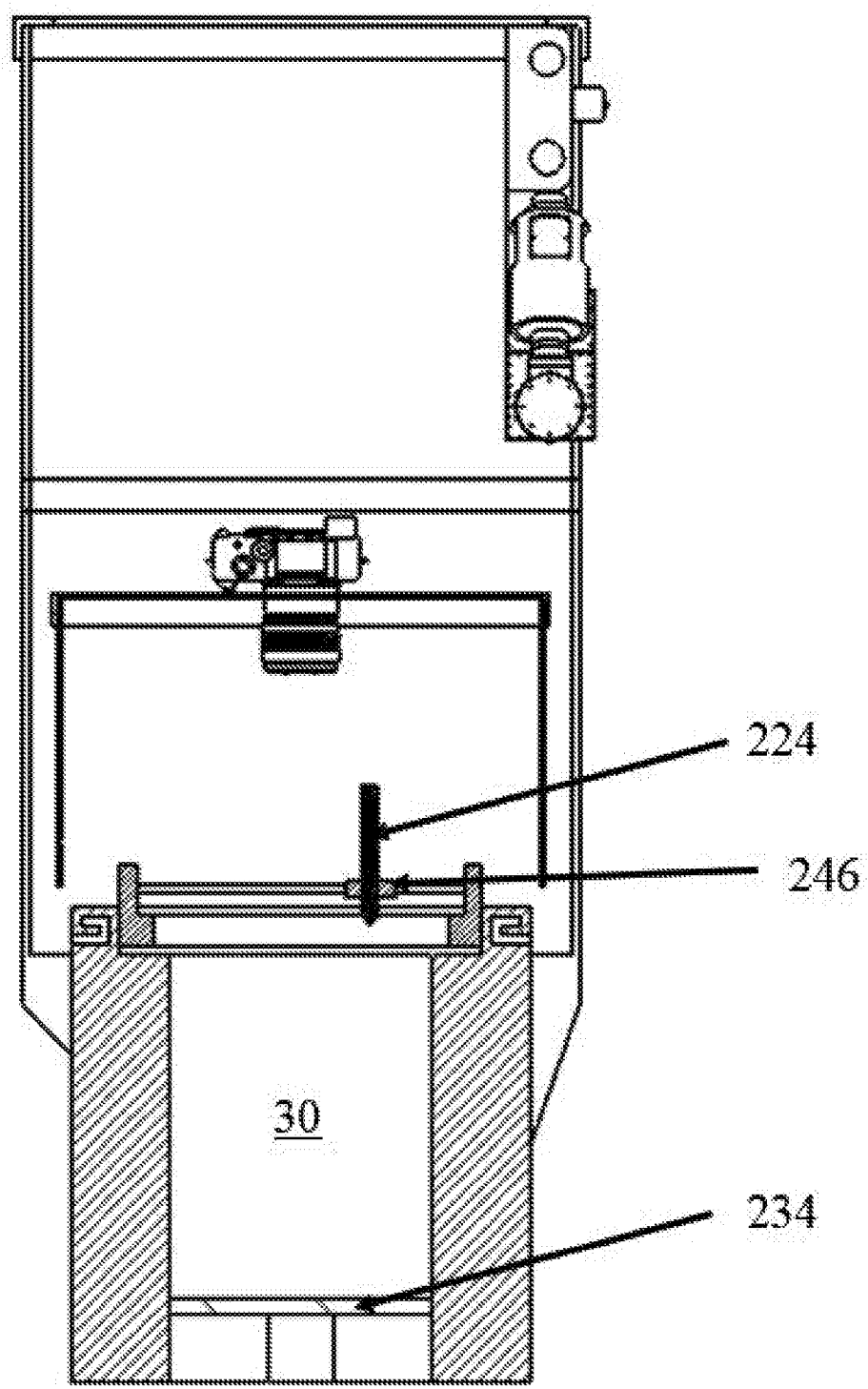
FIG. 27 illustrates a front cross-sectional view of the AM device shown in FIG. 20 having the lowered build platform in an embodiment.
Figure 28:
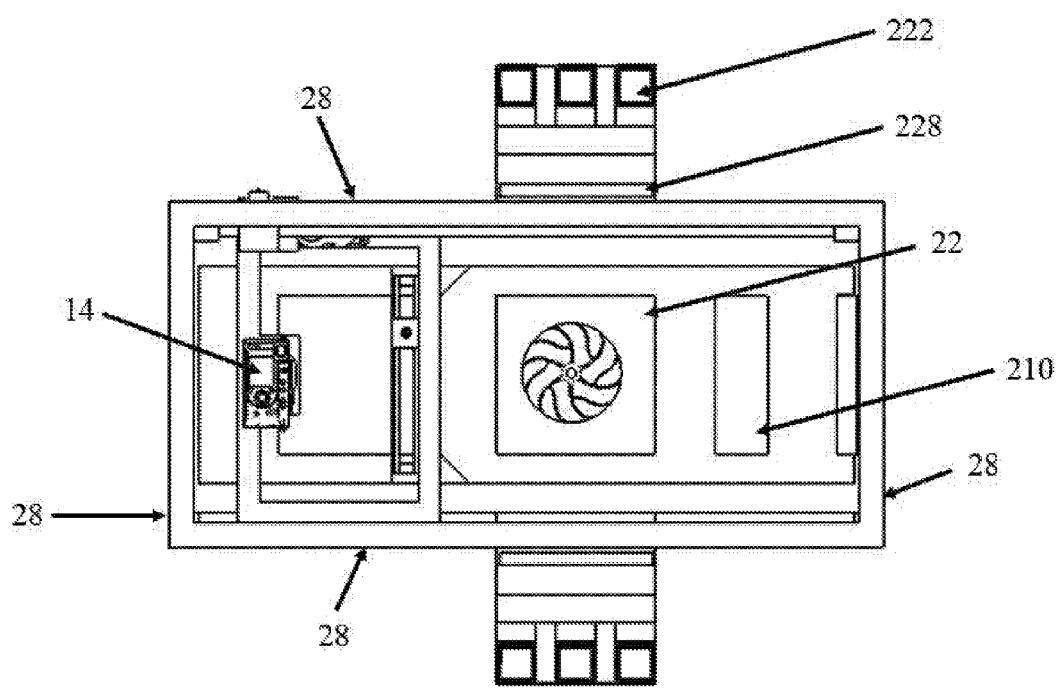
FIG. 28 illustrates a top plan view of the AM device shown in FIG. 20 in an embodiment.
Figure 29:
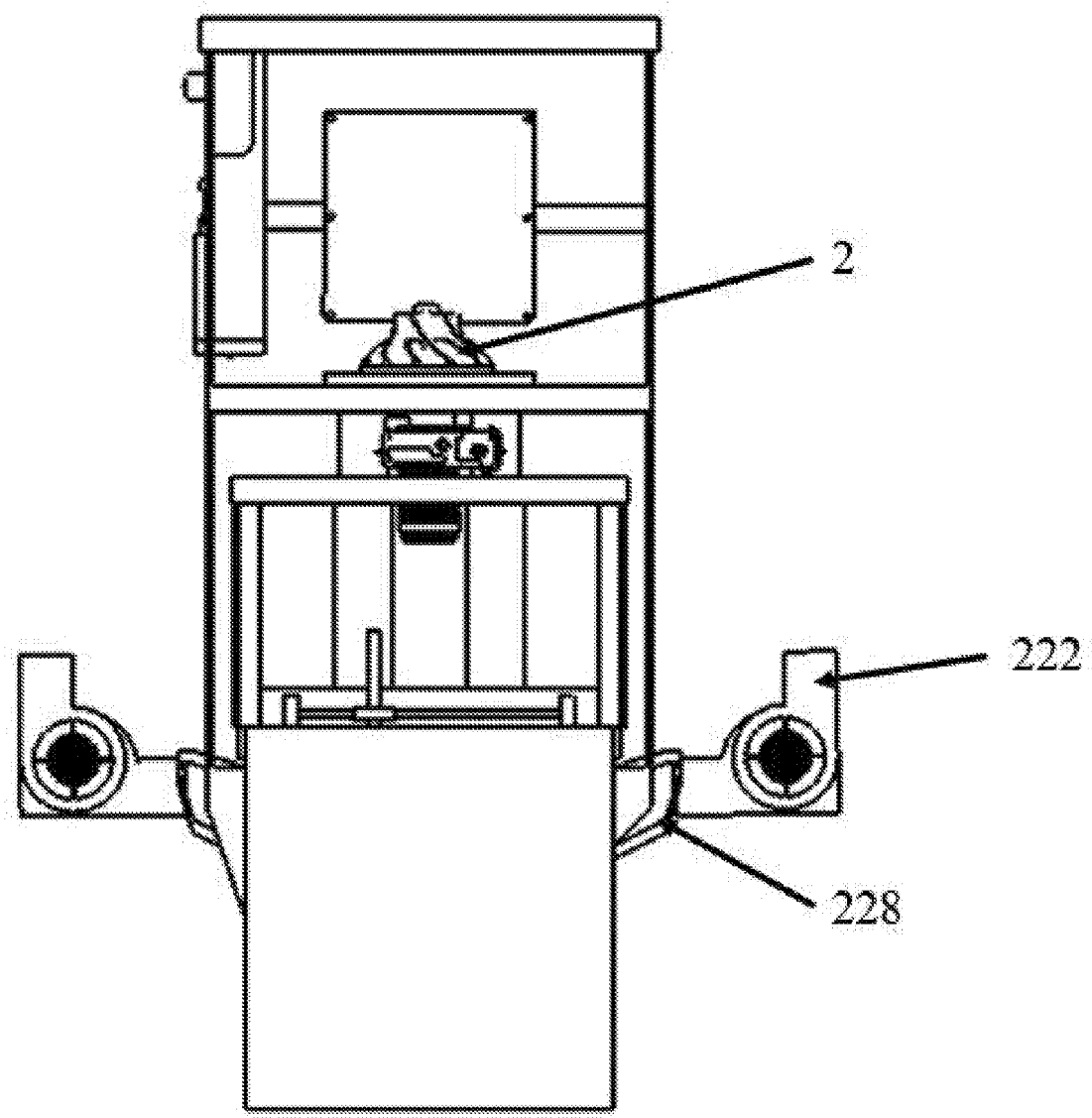
FIG. 29 illustrates a front plan view of the AM device shown in FIG. 20 having the raised build platform in an embodiment.
Figure 30:
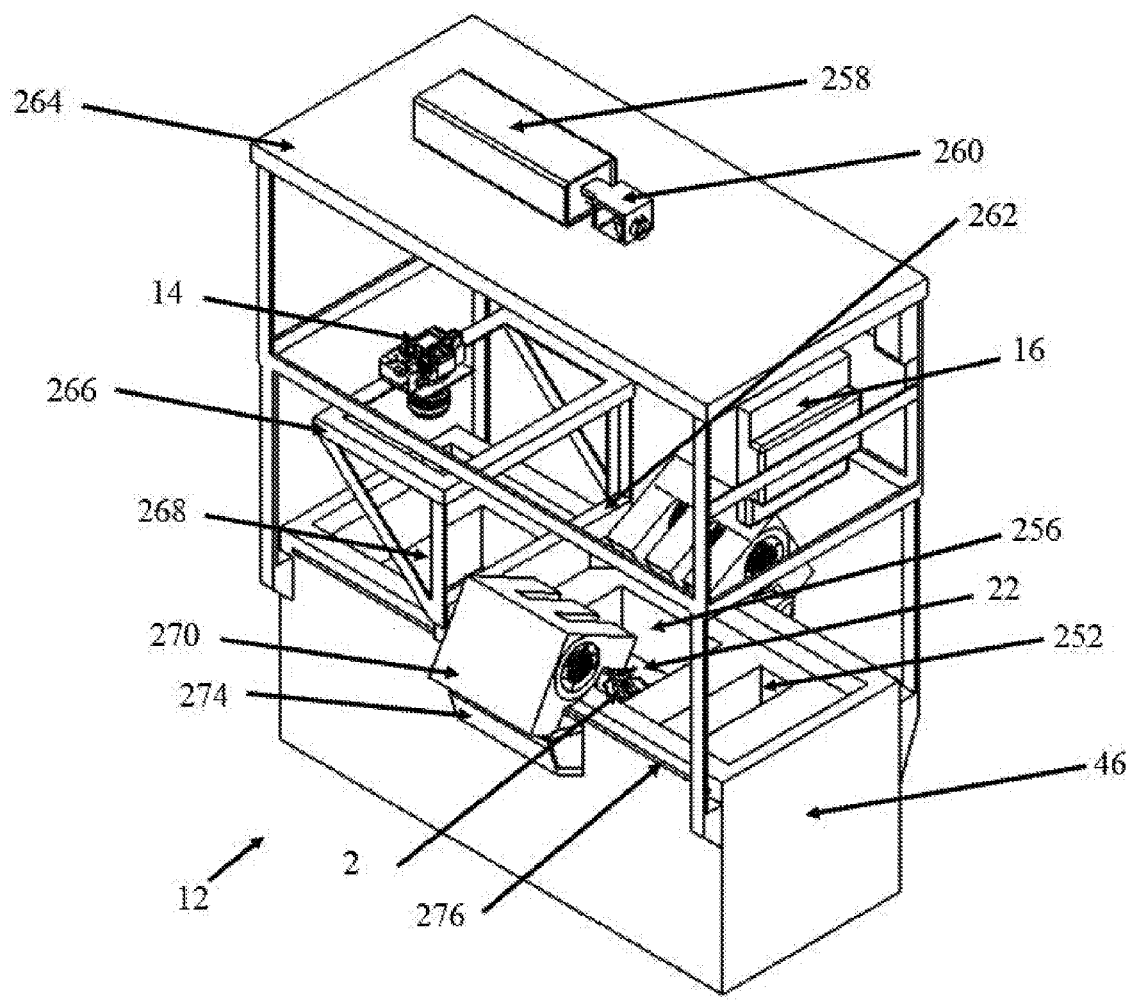
FIG. 30 illustrates a first perspective view of an AM device for building a component having a lowered build platform in still yet another embodiment.
Figure 31:
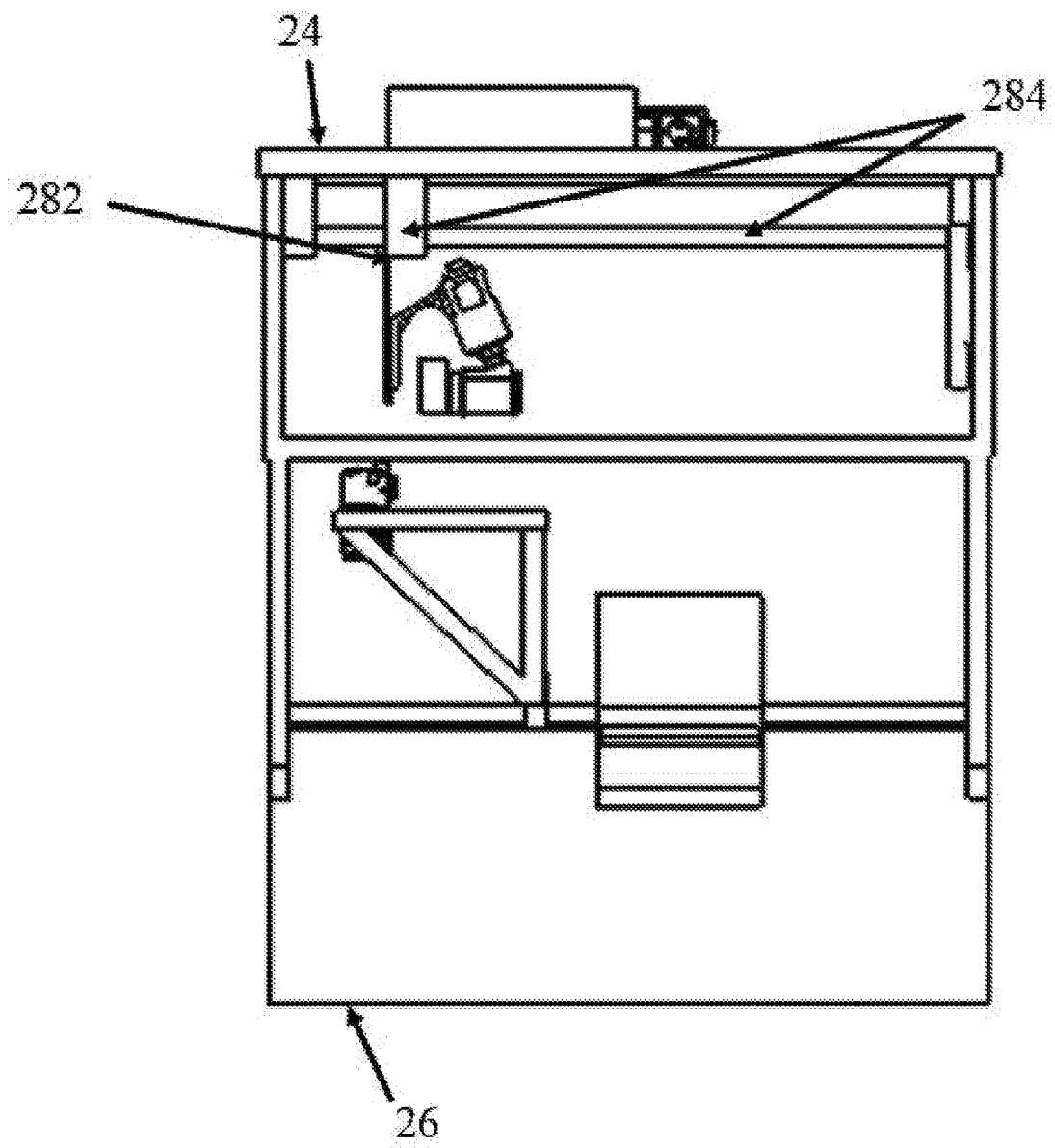
FIG. 31 illustrates a side plan view of the AM device shown in FIG. 30 having the lowered build platform in an embodiment.
Figure 32:
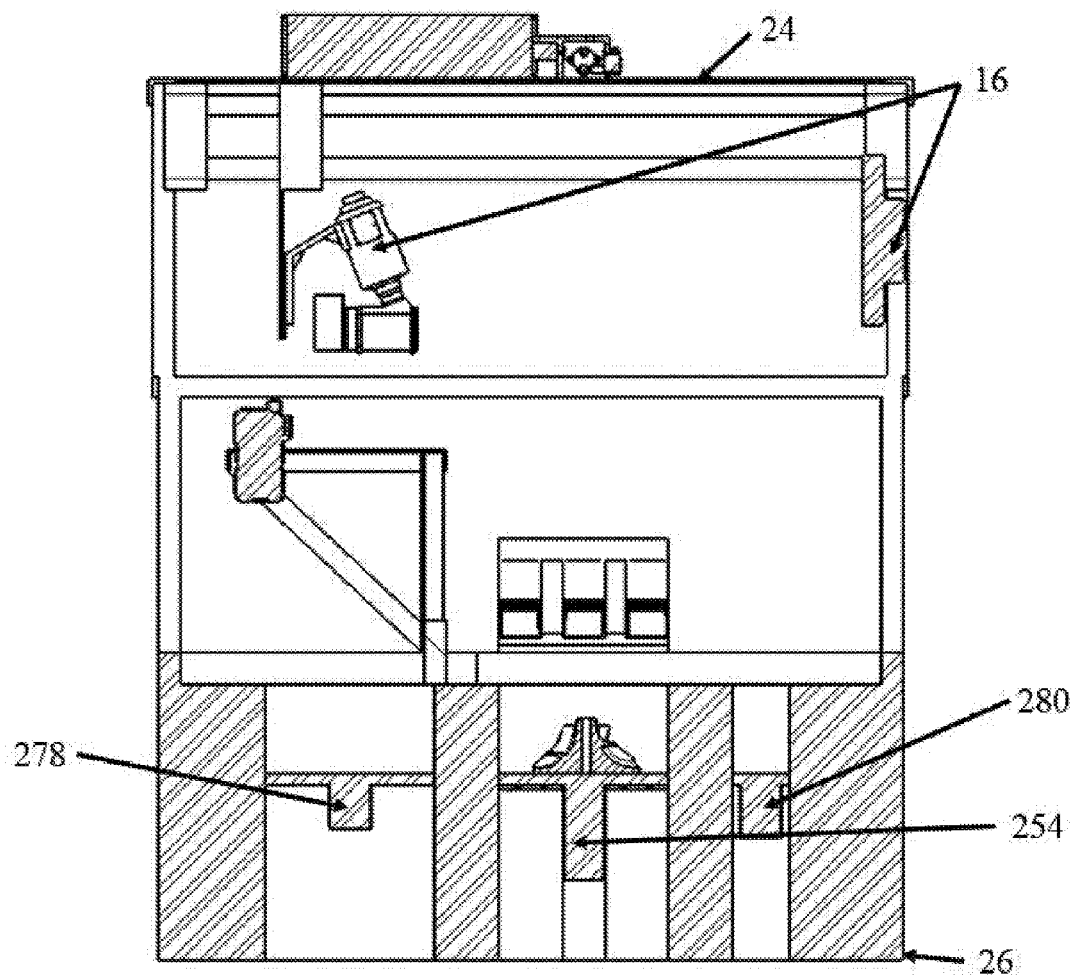
FIG. 32 illustrates a side cross-sectional view of the AM device shown in FIG. 30 having the lowered build platform in an embodiment.
Figure 33:
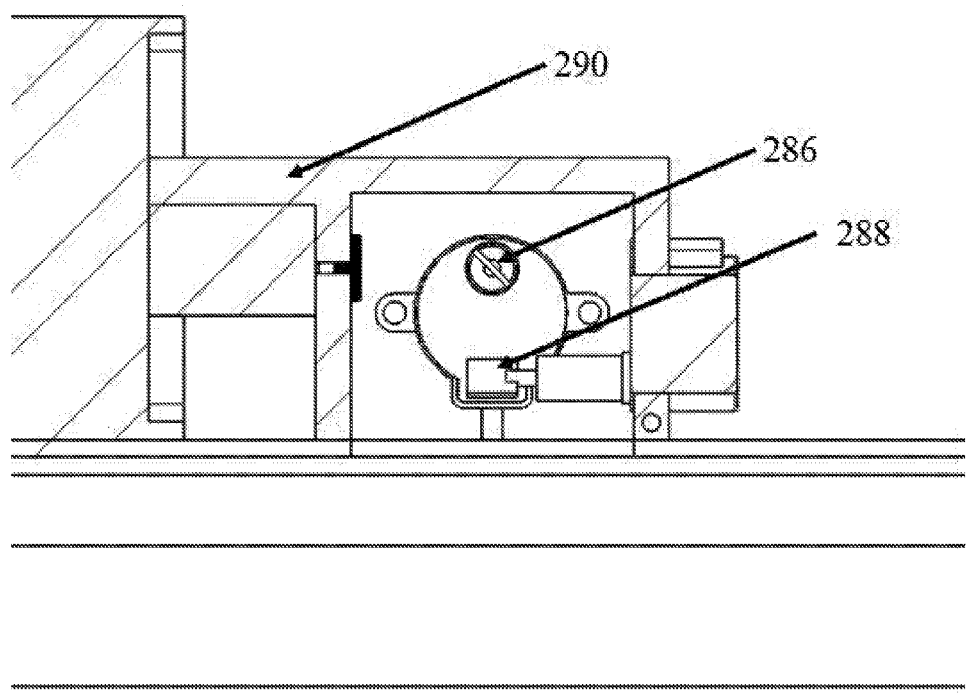
FIG. 33 illustrates a partial cross-sectional view of the AM device shown in FIG. 30 and/or a galvanometer housing in an embodiment.
Figure 34:
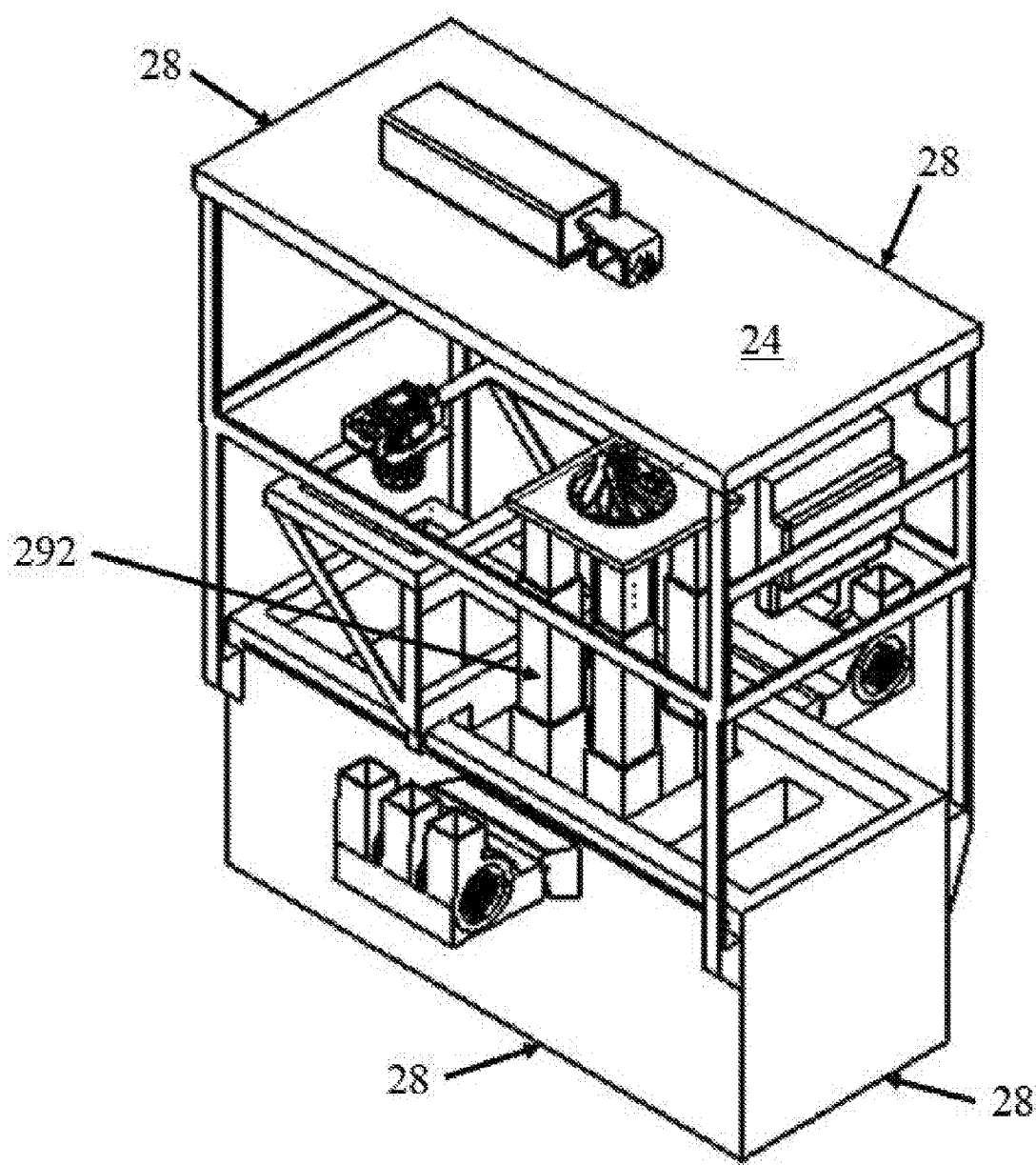
FIG. 34 illustrates a perspective view of the AM device shown in FIG. 30 having the raised build platform in an embodiment.
Figure 35:
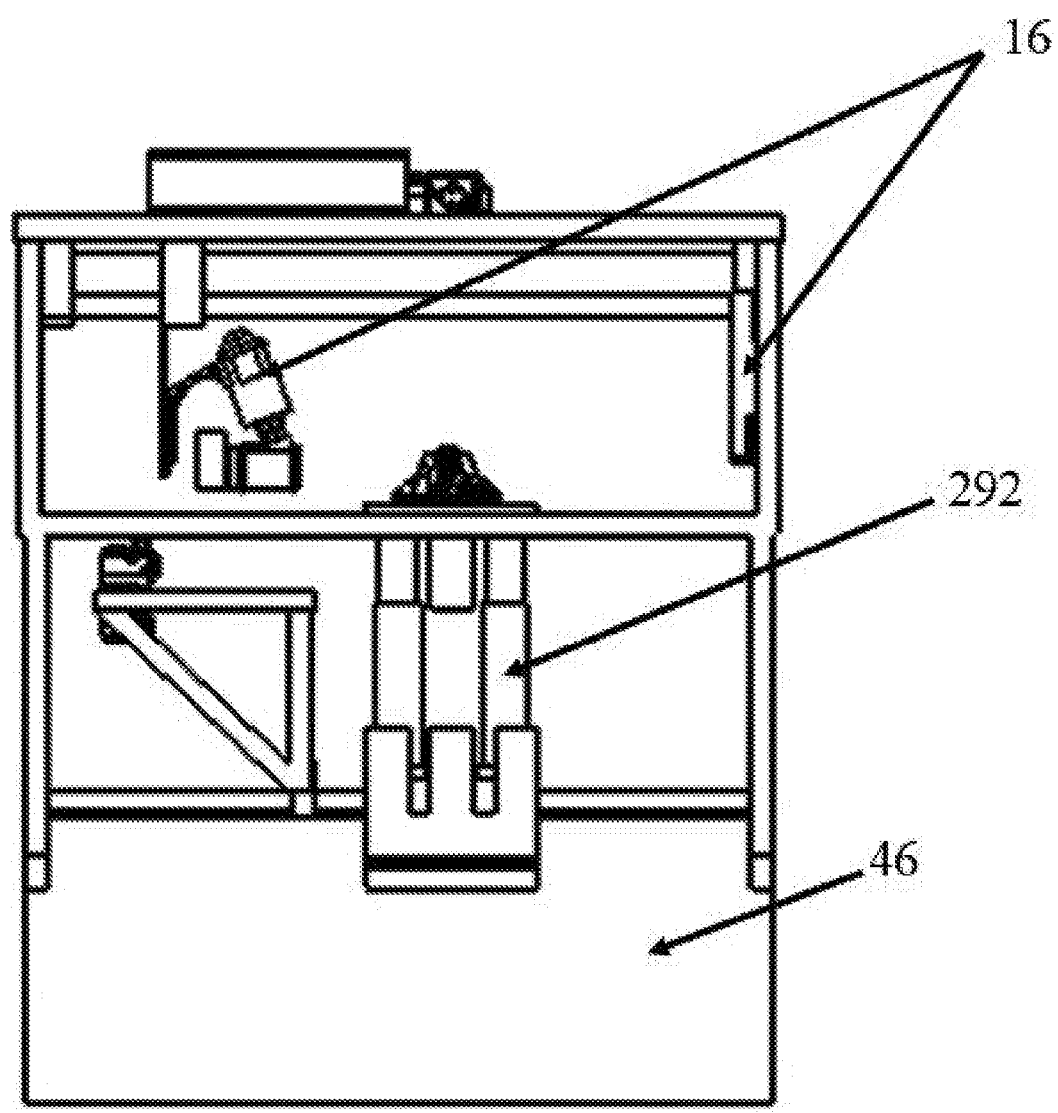
FIG. 35 illustrates a side plan view of the AM device shown in FIG. 30 having the raised build platform in an embodiment.
Figure 36:
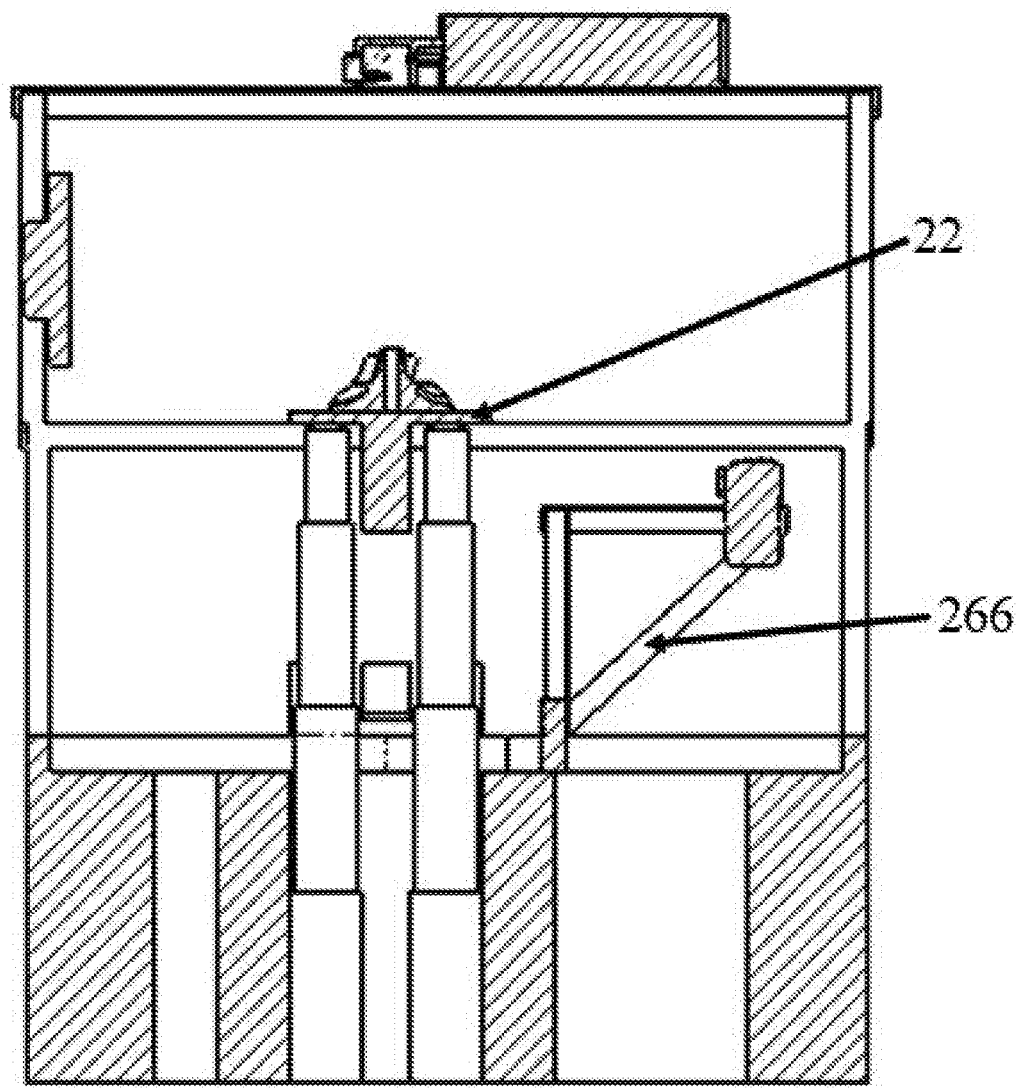
FIG. 36 illustrates a side cross-sectional view of the AM device shown in FIG. 30 having the raised build platform in an embodiment.
Figure 37:
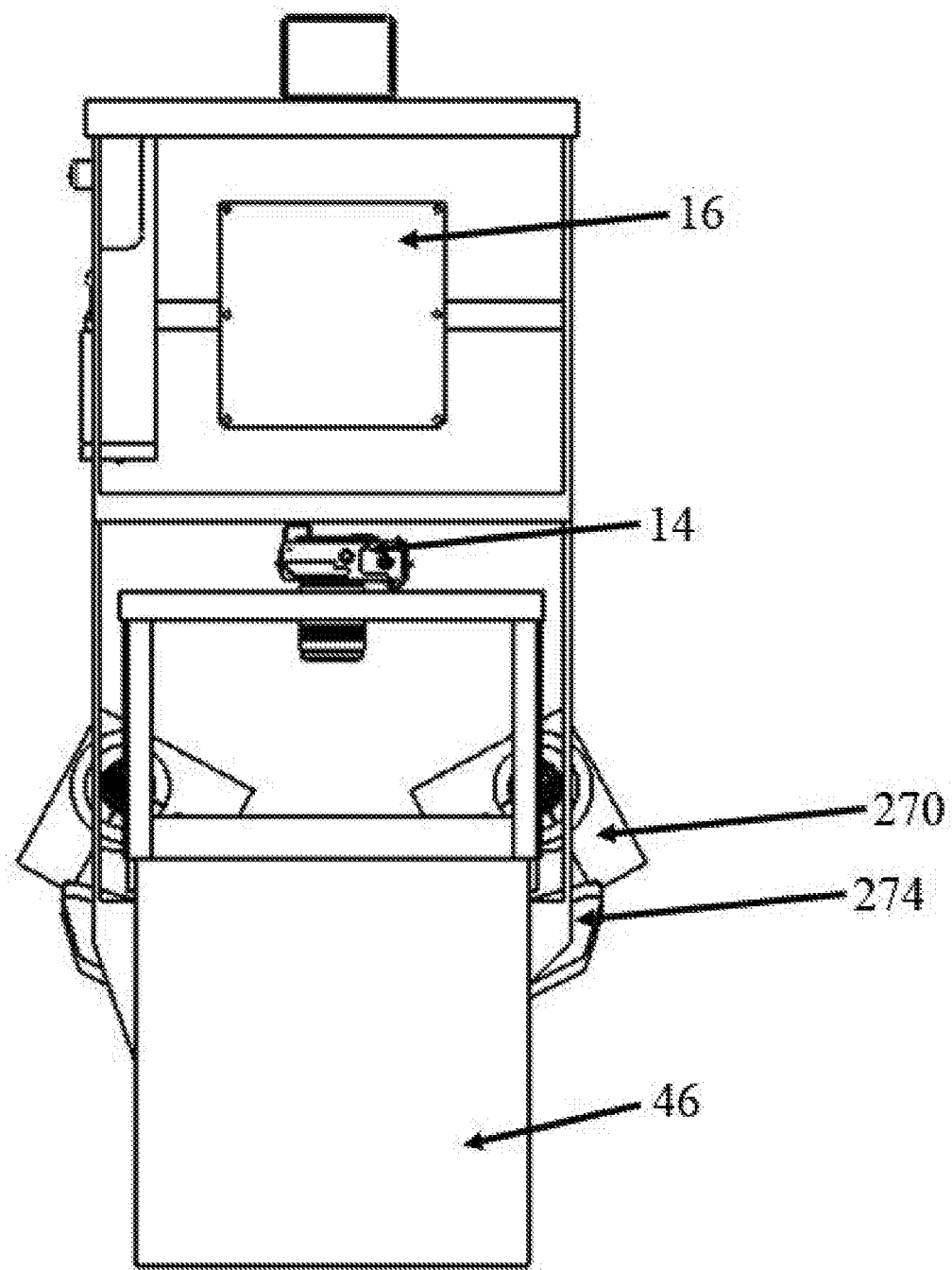
FIG. 37 illustrates a front plan view of the AM device shown in FIG. 30 having the lowered build platform in an embodiment.
Figure 38:
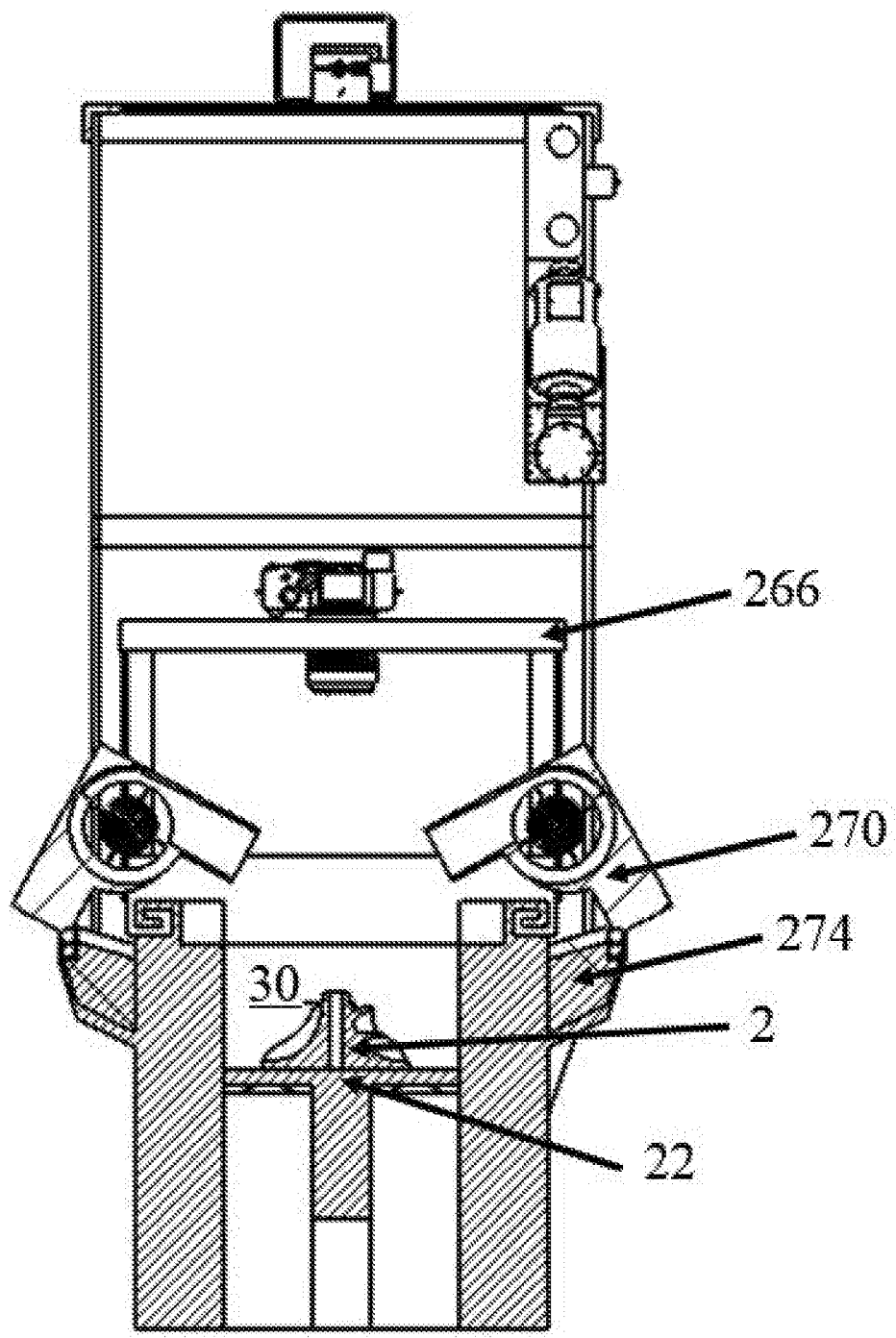
FIG. 38 illustrates a front cross-sectional view of the AM device shown in FIG. 30 having the lowered build platform in an embodiment.
Figure 39:
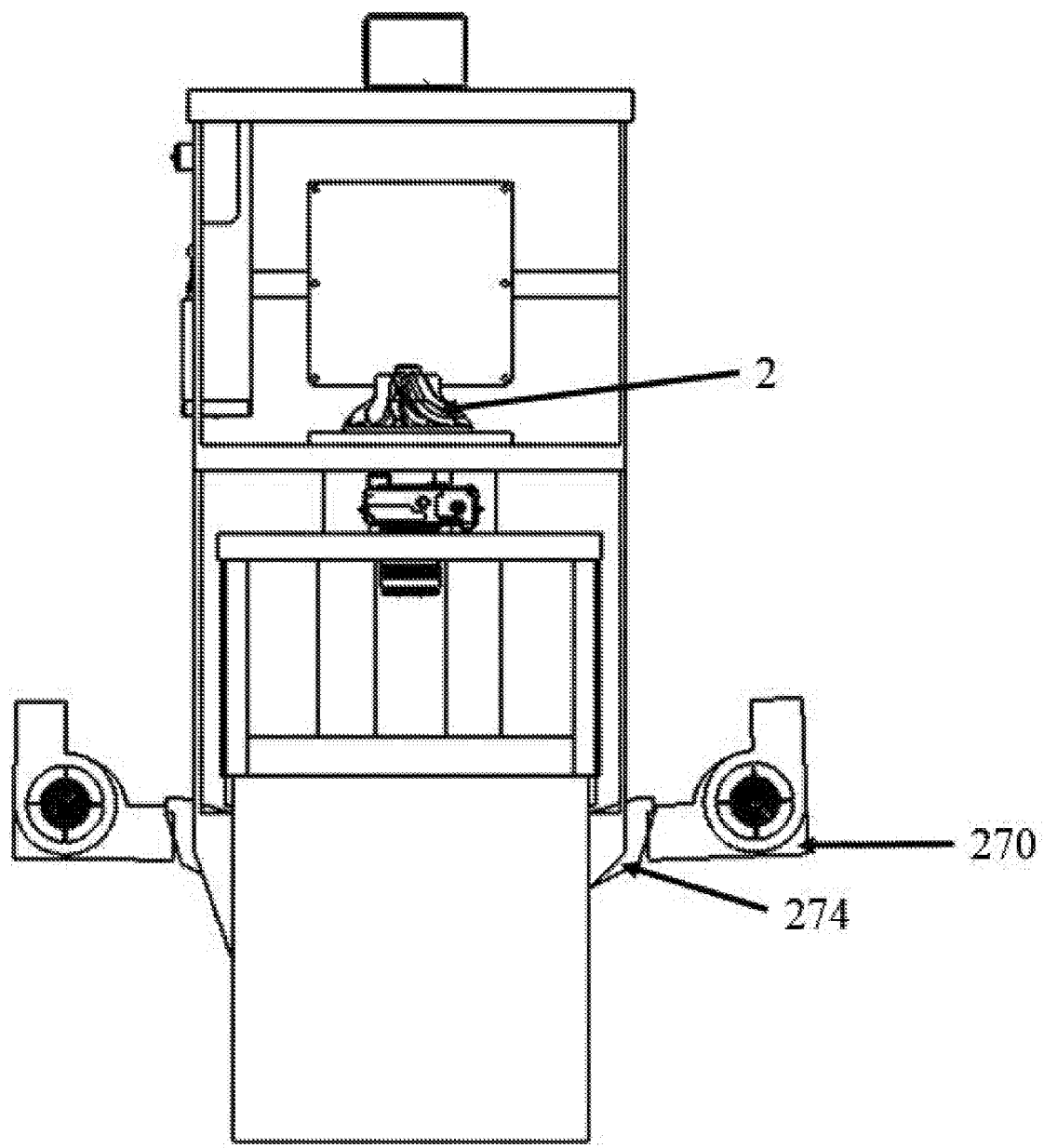
FIG. 39 illustrates a front plan view of the AM device shown in FIG. 20 having the raised build platform in an embodiment.

FIG. 23 illustrates a flowchart of the method 100 for effectively calibrating the AM device 12. First, an idea for the component 2 may be determined, identified and/or proposed as shown at step 102, and the terminal 18 and/or the software executed by the terminal 18 may be utilized to create, generated and/or provide the CAD file that represents, or is indicative of, the 3D shape, size and/or configuration of the component 2 based on the determined, identified and/or proposed idea for the component 2 from step 102, as shown at step 104. The terminal 18 and/or the software may convert the CAD file of the component 2 into the 3D printable file having a 3D printable file format, such as, for example, a 3D printable file in the .STL file format (hereinafter ".STL file") as shown at step 106. The terminal 18 and/or the software executed by the terminal 18 may repair the .STL file as shown at step 108.

Figure 43:
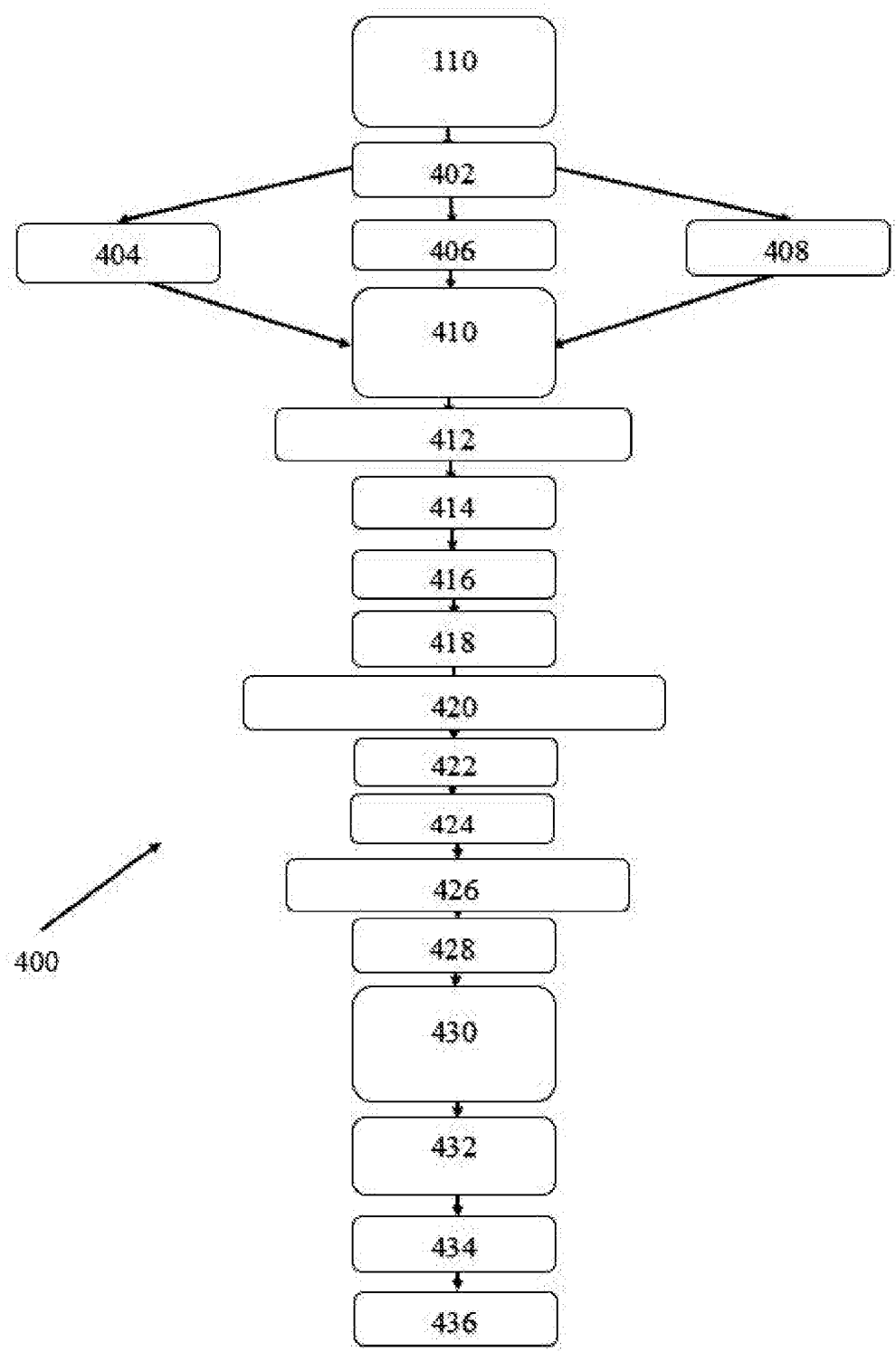
FIG. 43 illustrates a flowchart of a sub-method of one or more of the methods shown in FIGS. 40-42 in an embodiment.

Next, the method 100 may insert the .STL file into the software which may comprise printer control software as shown at step 110 which may be completed, performed and/or achieved according the sub-method 400 illustrated by FIG. 43. Thus, step 110 may comprise or include, but is not limited to, the sub-method 400 shown in FIG. 43. In the sub-method 400, the software may check for proper and/or working digital connections, as shown at step 402, between the terminal 18 and the first imaging device 14, the AM device 12 and/or the second imaging device 16 as shown at steps 404, 406, 408, respectively. If proper and/or working digital connections are established and/or identified by the software, the sub-method 400 may run, execute and/or perform at least one device program and/or at least one executable file, such as, for example, at least one .exe file as shown at step 410. As a result, host software, such as, for example, repetier-host software may be open and/or executed by method 100 and/or other required software(s) and/or a screenshot program, such as, for example, greenshot may be turned on, initiated and/or activated as shown at step 412.

Next, the terminal 18 and/or the software may connected to the AM device 12 as shown at step 414, the adding device, such as, for example, the extruder of the AM device 12 may be heated as shown at step 416 and the bed or top surface of the platform 22 may be heated as shown at step 418. The sub-method 400 may set one or more profiles of a digital software tool, such as, for example, Slic3r (which converts a digital 3D model into printing instructions for your 3D printer) with respect to material and resolution for building the component 4 as shown at step 420. Next, the 3D printable file or the .STL file may be inserted as shown at step 422 and/or may be centered as shown at step 424, and/or the functionality of the adding device, such as, for example, the extruder of the AM device 12 may be verified and/or confirm as shown at step 426. Further, the sub-method 400 may start the initial build of the component 2 as shown at step 428, may verify digital image or data and/or picture capture features of the imaging device 14, 16 are functional as shown at step 430, and/or may await build completion of the component 2 as shown at step 432. Moreover, the sub-method 400 may activate the second imaging device 16 as shown at step 434 and/or may clean the substrate of the component 2 as shown at step 436.

Figure 44:
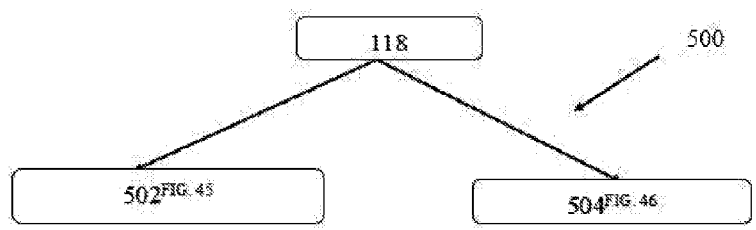
FIG. 44 illustrates a flowchart of a sub-method of one or more of the methods shown in FIGS. 40-42 in an embodiment.
Figure 47:
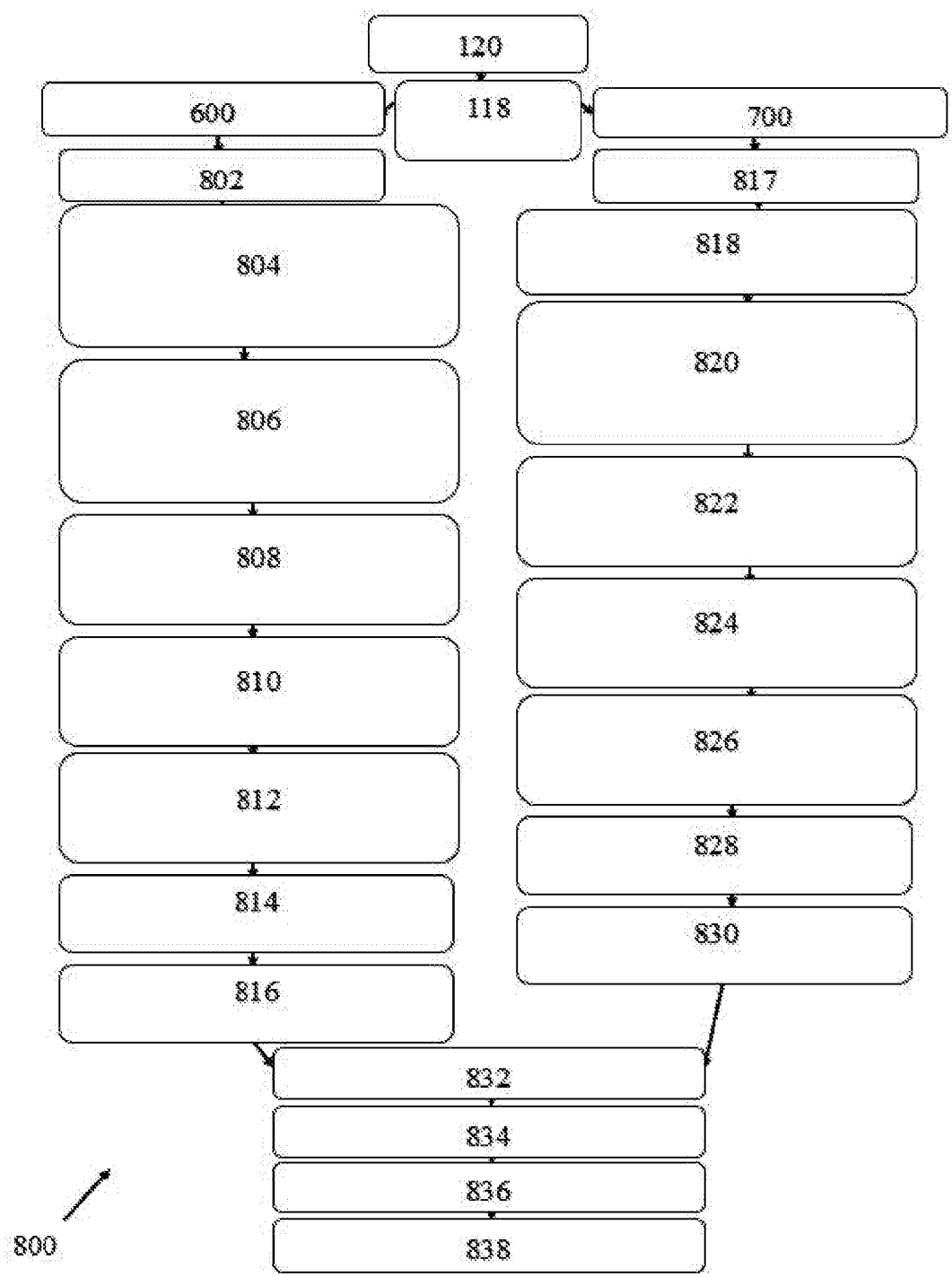
FIG. 47 illustrates a flowchart of a sub-method of one or more of the methods shown in FIGS. 40-42 in an embodiment.

The terminal 18 may utilize the software and/or the printer control software to create a machine code file and/or a numerical control programming language file, such as, for example, a g-code file as shown at step 112 of method 100. Next, the method 100 may start, begin or unitize the AM process to be performed by the AM device 12 which may, in an embodiment, be a 3D printing process as shown at step 114. After the AM process has started and the AM device 12 is building the component 2, the method 100 may begin, start and/or unitize data collection of the digital images or digital imaging data from the imaging device 14, 16 as shown at step 116. The first imaging device 14 may collect digital 2D images and/or data as shown at step 118 in according with one or more of sub-method 500 as illustrated in FIG. 44. After the digital 2D images and/or data are collected, the method 100 may analyze the collected digital 2D images and/or data as shown at step 120 in accordance with sub-method 800 as illustrated in FIG. 47. Thus, step 118 may comprise and/or include, but is not limited to, sub-method 500 and step 120 may comprise and/or include, but is not limited to, sub-method 800.

Figure 45:
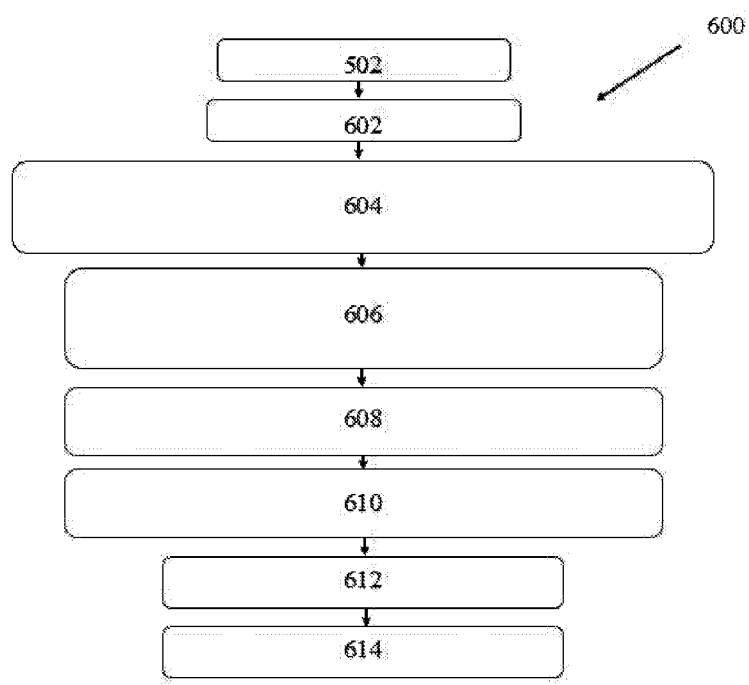
FIG. 45 illustrates a flowchart of a sub-method of the sub-method shown in FIG. 44 in an embodiment.
Figure 46:
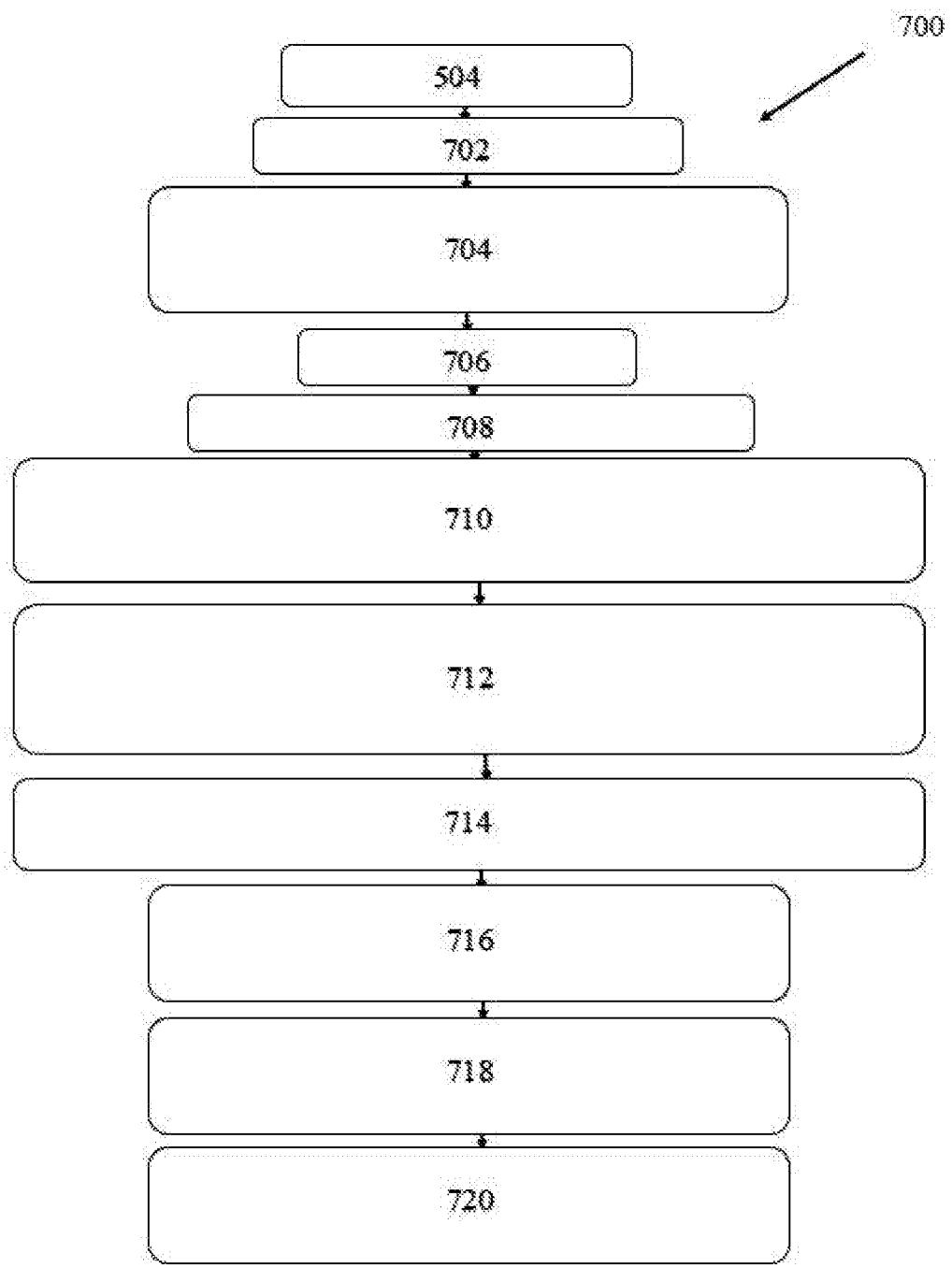
FIG. 46 illustrates a flowchart of a sub-method of the sub-method shown in FIG. 44 in an embodiment.

In embodiments, the sub-method 500 may collect the digital 2D images and/or data by collecting experimental digital 2D images and/or data as shown at step 502 in accordance sub-method 600 illustrated in FIG. 45 and/or by collecting theoretical digital 2D images and/or data at step 504 in accordance with sub-method 700 illustrated in FIG. 46. Thus, step 502 may comprise and/or include, but is not limited to sub-method 600 and step 504 may comprise and/or include, but is not limited to sub-method 700.

For collecting the experimental digital 2D images and/or data, the sub-method 600 may, in embodiments, slice the 3D printable file or the .STL file with a regular slicer as shown at step 602. For each and every build layer, the slicer profile may include, for example, movement of an extruder carrier, such as, platform carrier 44 to a home position and/or activation of the first imaging device 12 as shown at step 604. The software may initiate a system pause for a set or predetermined amount of time to allow for the extruder carrier and/or adding device to move from a first position to a second position that is not between the first imaging device 14 and the component 2 and/or may trigger one metadata file by another computer file, such as, for example, a batch file as shown at step 606. As a result, the extruder carrier and/or adding device may not interfere with and/or conceal images and/or imaging data collected and/or gathered by the first imaging device 12. The metadata file may open an executable file which may in turn activate an executable file associated with the first imaging device 14 and/or may run one or more commands associated with the first imaging device 14 as shown at step 608. As a result, the first imaging device 14 may capture one or more digital 2D images and/or data and/or send or transmit the captured one or more digital 2D images and/or data to a default digital folder associated with the terminal 18 and/or to an internal memory device associated with the first imaging device 14 as shown at step 610. Next, the AM device 12 may move or return the extruder carrier to the first position and/or the AM device 12 may begin or start to add the next build layer to the component 2 as shown at steps 612 and 614, respectively.

For collecting the theoretical digital 2D images and/or data, the sub-method 700 may, in embodiments, slice the 3D printable profile with a virtual slicer profile, such as, for example, slice the .STL file with virtual slice profile as shown at step 702. For each and every build layer, the slicer profile may include movement of a virtual extruder carrier to a first or home position and/or may include activation of device 12 as shown at step 704. At step 706, an operator of the system 10 and/or the method 100, may open host software, such as, for example, a repetier-host program of the software and/or the operator may go to digital control tab and/or select an operational mode as shown at step 708. Thus, the sub-method 700 may open a tool path depiction at step 706, and a dry run may be verified to be enabled as shown at step 708.

Next, the operator may open a digital editor tab, select to view a single build layer with a parallel projection from a top view and/or adjust the display zoom and/or display resolution as shown at step 710. Thus, the sub-method 700 and/or the software may utilize parallel projection to simulate correct virtual imager view and/or verify correctiveness of zoom and/or resolution at step 710. At step 712, the operator may verify and/or confirm that the screenshot program is activated and running, confirm that software and/or the first imaging device 14 is capturing full screen and that captured digital 2D images and/or data is being properly stored at a known or desired digital storage location associated with the terminal 18 and/or the first imaging device 14. Thus, image storage location may be verified at step 712. The operator may return to the repetier-host program, continue job run and return to digital editor tab select arrows associated with the layer selection area as shown at step 714. Thus, virtual fabrication process and/or image capture process may be initiated at step 714. For each build layer, the software may activate a batch file as shown at step 716, and the activated batch file may pause the system 10 and/or AM device 12 for a set or predetermined amount of time and/or may activate a VBScript file which may move to the next build layer as shown at step 718. Thus, the software and/or sub-method 700 may activate the virtual imager for each built layer at step 716 and/or image activation may be pause the system 10 for a set amount of time before moving to the next build layer at step 718. At step 720, the batch file may activate the VBScript file which may take or collect a screenshot picture which may be subsequently stored at the known or desired digital storage location. Thus, the captured images may be stored in the specific location at step 720.

The sub-method 800 of step 120 may be utilized to analyze the collected digital 2D images and/or data which comprises the experimental digital 2D images and/or data collected according to sub-method 600 and the theoretical digital 2D images and/or data collected according to sub-method 700. The collected experimental digital 2D images and/or data, according to sub-method 600, may be opened as shown at step 802, may be imported as shown at step 804, may be converted to 8-bit grayscale and numerically name sorted as shown at step 806, may be cropped as shown at step 808, may be processed and/or made binary as shown at step 810 and/or may be analyzed as shown at step 812. Further, sub-method 800 may open image manipulator software at step 802, import an image sequence (i.e., collected digital 2D images and/or data) at step 804, verify a number of images matches layer count and/or convert the images to 8-bit grayscale at step 806, crop images, if necessary to reduce computational operations at step 808, convert images to binary with a black background at step 810 and/or utilize the image manipulator software to determine an amount of material (dM) per amount of area (dA). Next, the collected experimental digital 2D images and/or data may be processed and/or the processing results may be stored in the desired storage location and/or the memory storage unit associated with the terminal 18 as shown in step 814. In an embodiment, the processing results for the collected experimental digital 2D images and/or data may be imported into a mutual text document that by be savable by the terminal 18 as shown at step 816.

The collected theoretical digital 2D images and/or data may be opened as shown at step 817, may be imported as shown at step 818, may be converted to 8-bit grayscale and numerically name sorted as shown at step 820, may be cropped as shown at step 822, may be processed and/or made binary as shown at step 824 and/or may be analyzed as shown at step 826. Further, the sub-method 800 may open image manipulator software at step 817, import an image sequence (i.e., collected theoretical digital 2D images and/or data) from a specified location at step 818, verify a number of images matches layer count and/or convert images to 8-bit greyscale at step 820, crop images, if necessary, to reduce computational operations at step 822, convert images to binary with a black background at step 824 and/or utilize the image manipulator software to determine the amount of material (dM) per amount of area (dA) at step 826. Next, the collected theoretical digital 2D images and/or data may be processed and/or the processing results may be stored in the desired storage location and/or the memory storage unit associated with the terminal 18 as shown in step 828. In an embodiment, the processing results for the collected theoretical digital 2D images and/or data may be imported into a mutual text document that by be savable by the terminal 18 as shown at step 830.

At step 832, the differences between the processing results of the collected experimental and theoretical digital 2D images and/or data may be calculated by the software and/or sub-method 800, wherein the differences are calculated in areas per matched pair. Plus/minus offsets may be determined by the software based on the calculated differences between the processing results of the collected experimental and theoretical digital 2D images and/or data as shown at step 834. Based on the determined plus/minus offsets, the software and/or sub-method 800 may create, produce and/or generate a general 2D offset for the component 2 as shown at step 836, and/or a 2D solution, based on the general 2D offset, which may be applied by the software and/or sub-method 800 as shown at step 838.

Figure 48:
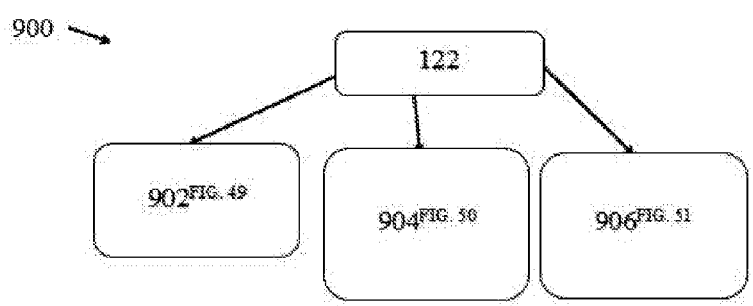
FIG. 48 illustrates a flowchart of a sub-method of one or more of the methods shown in FIGS. 40-42 in an embodiment.
Figure 49:
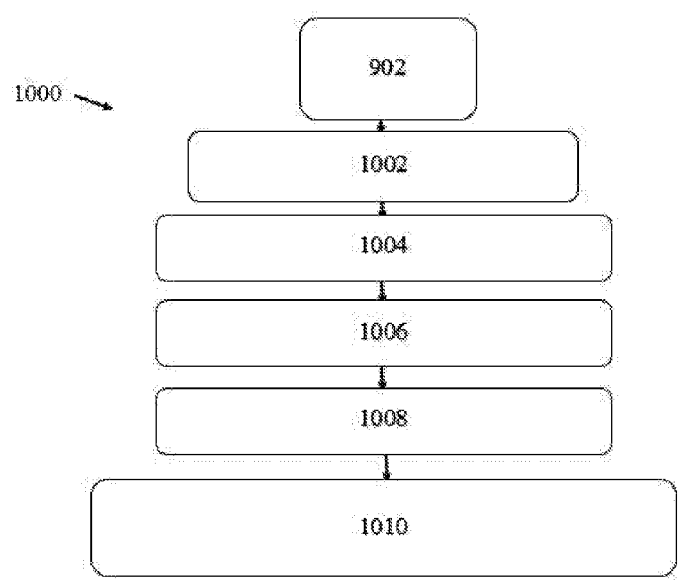
FIG. 49 illustrates a flowchart of sub-steps of the sub-method shown in FIG. 48 in an embodiment.
Figure 50:
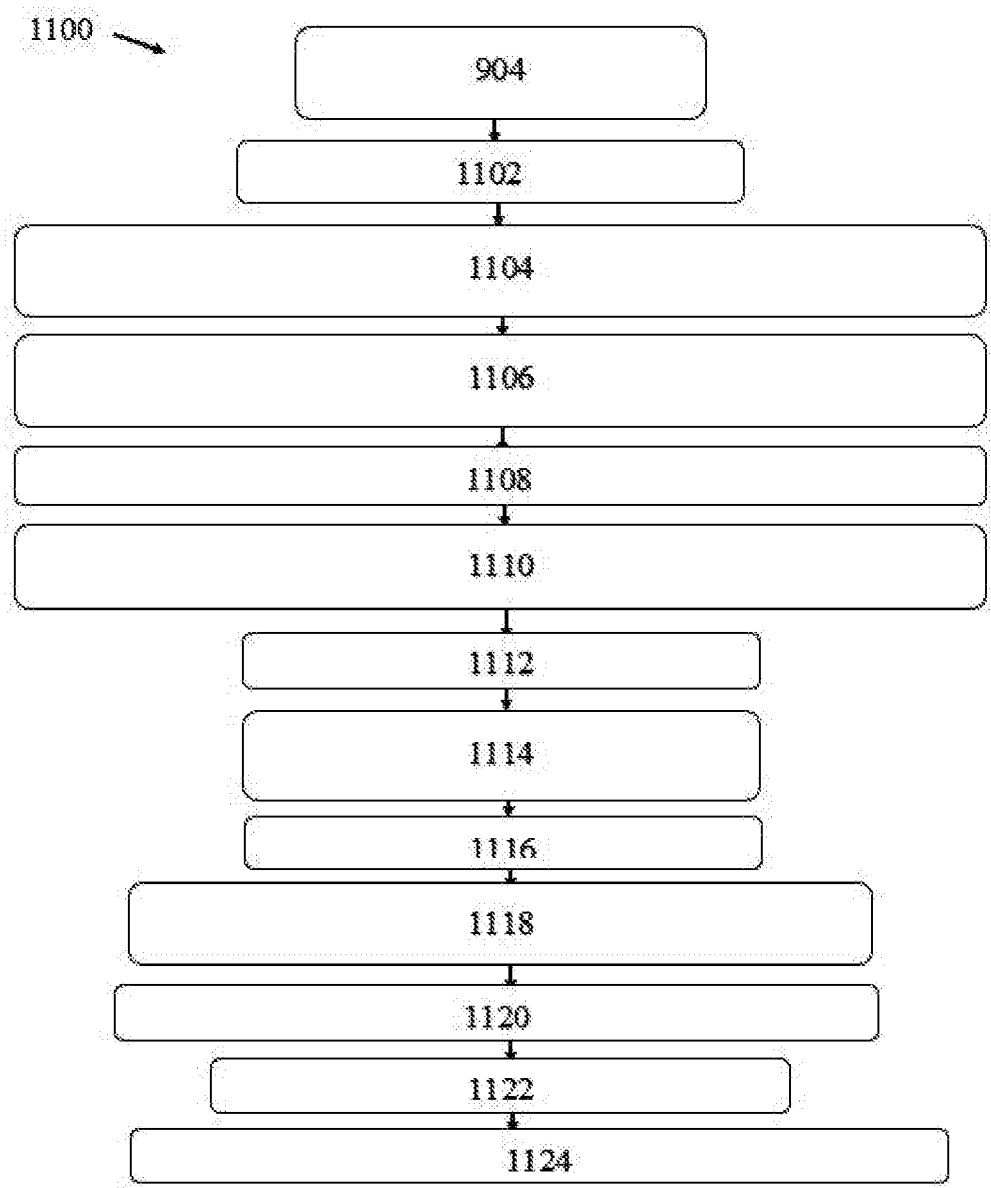
FIG. 50 illustrates a flowchart of sub-steps of the sub-method shown in FIG. 48 in an embodiment.
Figure 51:
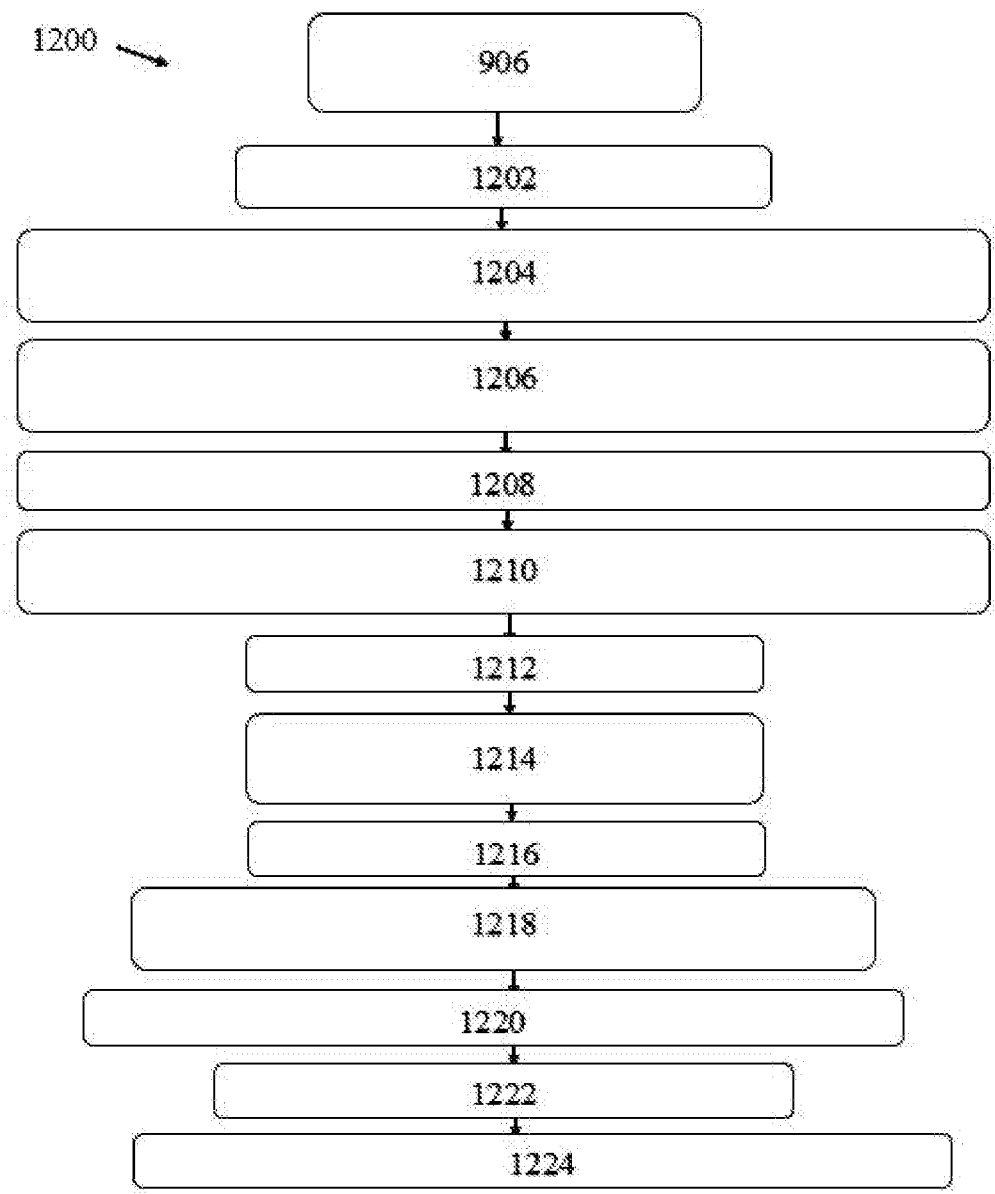
FIG. 51 illustrates a flowchart of sub-steps of the sub-method shown in FIG. 48 in an embodiment.

As shown in FIG. 48, sub-method 900 of step 122 for collecting digital 3D images and/or data may collect: experimental digital 3D images and/or data via the second imaging device 16 as shown at step 902 in accordance with sub-method 1000 shown in FIG. 49; experimental digital 3D images and/or data via experimental images as shown at step 904 in accordance with sub-method 1100 shown in FIG. 50; and/or experimental digital 3D images and/or data via theoretical images as shown at step 906 in accordance with sub-method 1200 shown in FIG. 51

The sub-method 1000, shown in FIG. 49, may activate the second imaging device 16 for each and every build layer and/or at build completion of the component 2 as shown at step 1002 and/or may add a batch file after build completion as shown at step 1004. Next, the batch file may activate another computer file which in turn activates an executable file and/or opens software associated with the second imaging device 16 as shown at step 1006. The operator may activate and/or calibrate the second imaging device 16 manually as shown at step 1008. Next, the operator may wait for the complete collection of the 3D image or data collected by the second imaging device 16, may use clean and/or crop tools of the software associated with the second imaging device 16 to remove any unwanted or undesirable noise from the 3D image or data collected by the second imaging device 16, and/or may save the collected 3D image or data in a desired location and/or within the digital storage unit associated with the terminal 18 as a 3D printable file format, such as, for example, a STL file format as shown at step 1010. Moreover, sub-method 1000 may activate the second imaging device 16 at every built layer and/or at build completion of the component 2 at step 1002, activate the second imaging device 16 after build completion at step 1004, opening software associated with the second imaging device 16 at step 1006, calibrate the second imaging device 16 and/or start imaging and/or image or data collection by the second imaging device 16 at step 1008 and/or wait of completion of imaging, utilize clean and/or crop tools within the opened software to remove any unwanted noise from the collected images or data and/or save the collected images or data as a 3D printable file in a 3D printable file format, such as, for example, a .STL file at step 1010.

In sub-method 1100 shown in FIG. 50, an experimental image may be open as shown at step 1102, may be imported as shown at step 1104, may be converted to 8-bit grayscale and/or numerically name sorted as shown at step 1106, may be cropped as shown at step 1108 and/or may be processed and/or made binary as shown at step 1110. A 3D viewer plugin may be selected or activated as shown at step 1112, unwanted or undesirable noise may be removed by adjusting a threshold as shown at step 1114, a surface display may be selected as shown at step 1116 and/or a file containing the experimental image in binary form may be exported and/or saved to a desired location and/or the digital storage unit associated with the terminal 18 as shown at step 1118. The previously saved file may be imported into additive manufacturing software which have been opened as shown at step 1120, the z-axis may be proportionally scaled as shown at step 1122 and/or a new 3D printable file based on the proportionally scaled z-axis may be exported and/or save to a desired location and/or the digital storage unit associated with the terminal 18 as shown at step 1124. Additionally, the sub-method 1100 may open image manipulator software at step 1102, import the image sequence from a specified location at step 1104, verify a number of images matches layer count and/or convert the images to 8-bit grayscale at step 1106, crop the images, if necessary, to reduce computational operations at step 1108, convert the images to binary with a black background at step 1110 and/or convert the image sequence into a 3D image at step 1112. Moreover, the sub-method 1100 may remove noise by may remove noise by adjusting the threshold accordingly or as necessary at step 1114, display the 3D image as a surface at step 1116, export the surface as a binary 3D printable file, such as, a .STL file at step 1118, open .STL file manipulator software and/or import a saved file or the binary .STL file at step 1120, scale the z-axis of the file proportionally and/or correctly at step 1122 and/or save the new or scaled. STL file to a, or the, desired location at step 1124.

In sub-method 1200 shown in FIG. 51, an experimental image may be open as shown at step 1202, may be imported as shown at step 1204, may be converted to 8-bit grayscale and/or numerically name sorted as shown at step 1206, may be cropped as shown at step 1208 and/or may be processed and/or made binary as shown at step 1210. A 3D viewer plugin may be selected as shown at step 1212, unwanted or undesirable noise may be removed by adjusting a threshold as shown at step 1214, a surface display may be selected as shown at step 1216 and/or a file containing the experimental image in binary form may be exported and/or saved to a desired location and/or the digital storage unit associated with the terminal 18 as shown at step 1218. The previously saved file may be imported into additive manufacturing software which have been opened as shown at step 1220, the z-axis may be proportionally scaled as shown at step 1222 and/or a new 3D printable file based on the proportionally scaled z-axis may be exported and/or save to a desired location and/or the digital storage unit associated with the terminal 18 as shown at step 1224. Additionally, the sub-method 1200 may open image manipulator software at step 1202, import an image sequence from a specified location at step 1204, verify a number of images matches layer count and/or convert the images to 8-bit grayscale at step 1206, crop the images, if necessary, to reduce computational operations at step 1208 and/or convert the images to binary with a black background at step 1210. Further, the sub-method 1200 may convert the image sequence into a 3D image at step 1212, remove noise by adjusting the threshold accordingly and/or necessary at step 1214, display the 3D image as a surface at step 1216 and/or export the surface a binary 3D printable file, such as, a .STL file at step 1218. Moreover, the sub-method 1200 may open .STL file manipulator software and/or import the previously saved file or the .STL file at step 1220, scale the z-axis of the file proportionally and/or correctly at step 1222 and/or save the new scaled .STL file to a, or the, desired location at step 1224.

Figure 40:
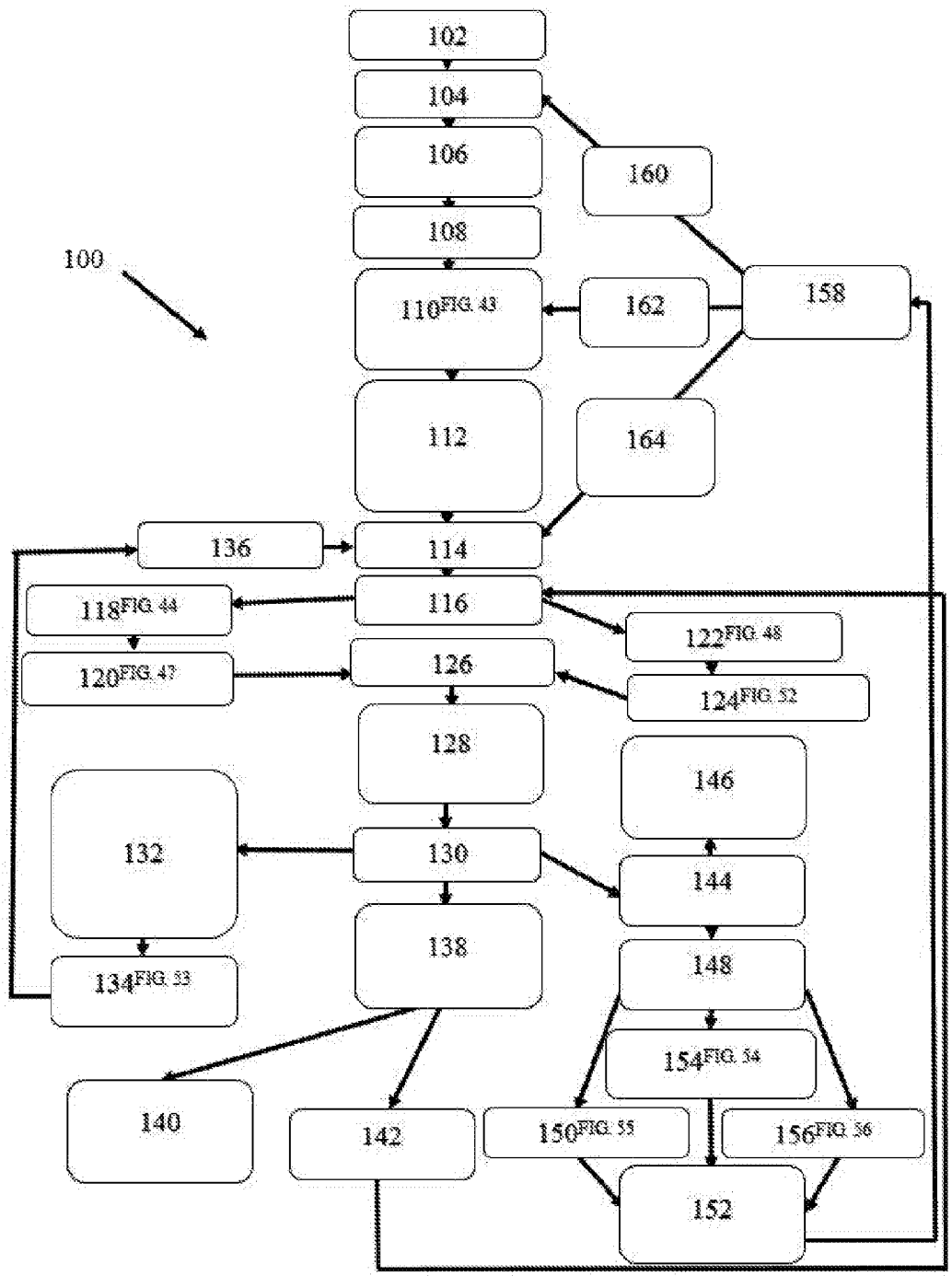
FIG. 40 illustrates a flowchart of a verification and adjustment method (hereinafter "method") for effectively calibrating an AM device and/or building at least one component in an embodiment.
Figure 52:
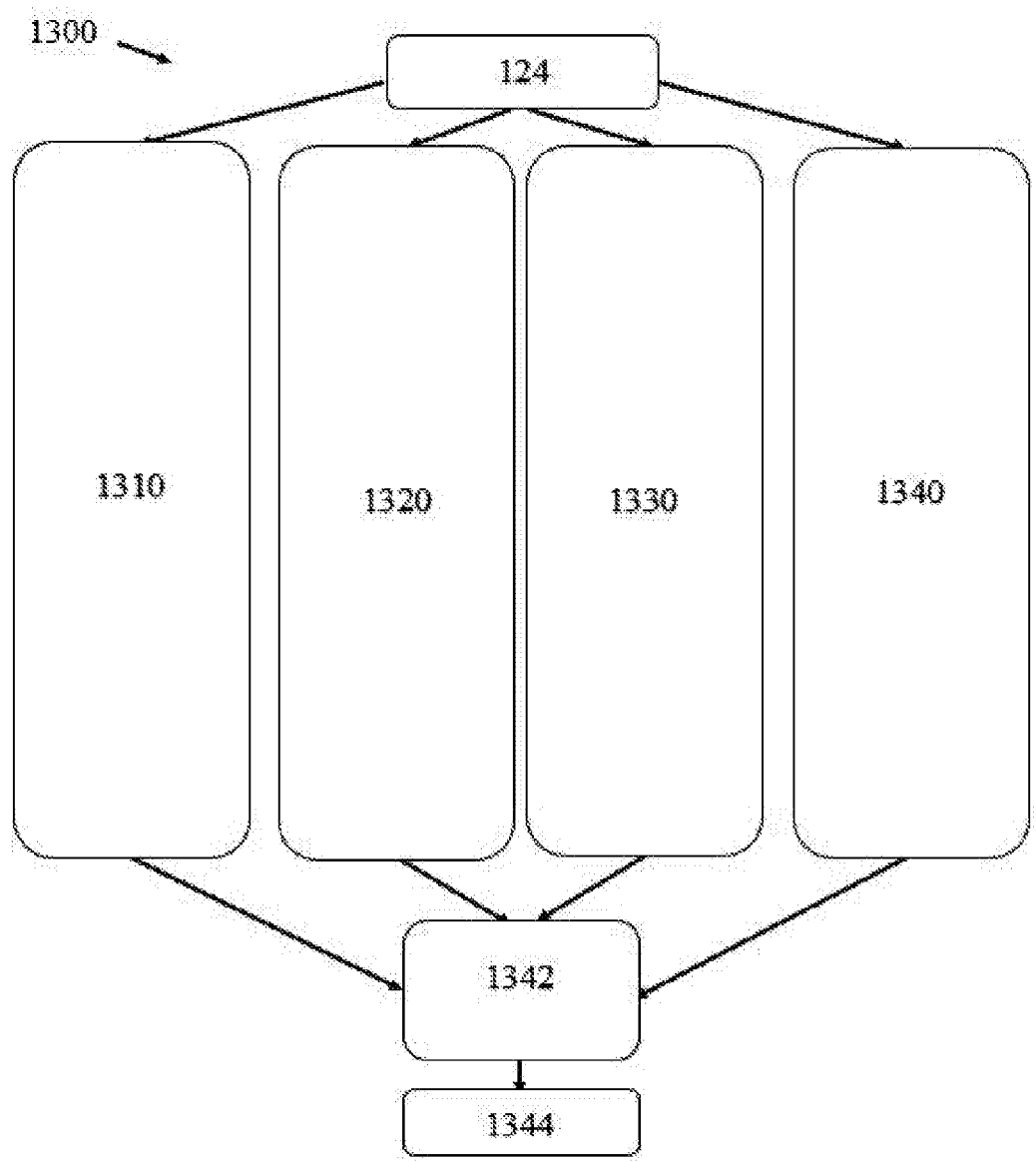
FIG. 52 illustrates a flowchart of a sub-method of one or more of the methods shown in FIGS. 40-42 in an embodiment.
Figure 53:
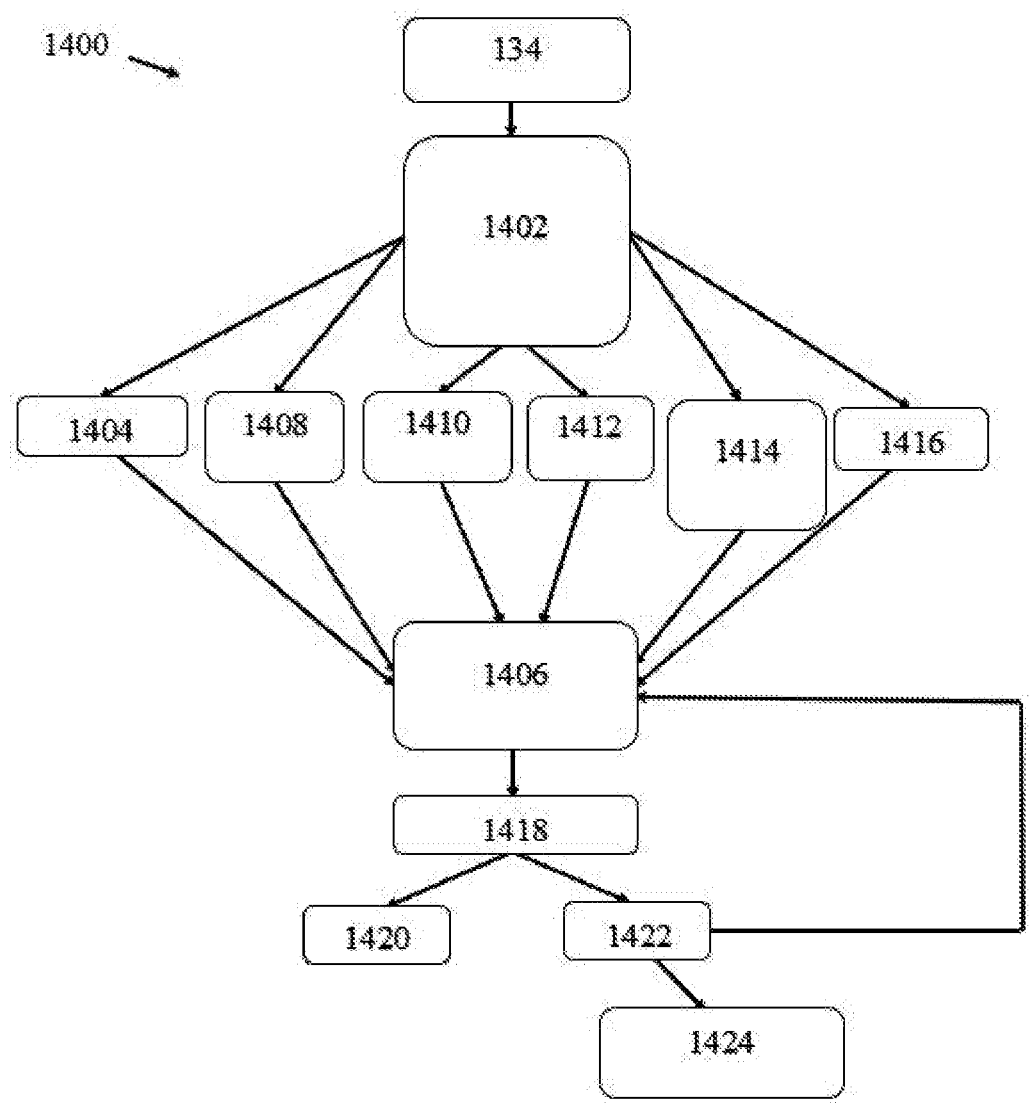
FIG. 53 illustrates a flowchart of a sub-method of one or more of the methods shown in FIGS. 40-42 in an embodiment.

Step 124 of method 100 shown in FIG. 40 may analyze the collected digital 3D images and/or data from step 122 in accordance with sub-method 1300 shown in FIG. 52. The sub-method 1300 may comprise, but is not limited to, a first plurality of sub-steps 1310, a second plurality of sub-steps 1320, a third plurality of sub-steps 1330 and/or a fourth plurality of sub-steps 1340.

The software, step 124 of method 100 and/or sub-method 1300 may execute and/or perform the first plurality of sub-steps 1310 which may output the saved .STL file from step 1010 of FIG. 49, input the outputted .STL file into the .STL manipulator software or program and/or determine and/or calculate surface area and/or volume based on the outputted .STL file and/or the saved .STL file from step 1010 of FIG. 49. Additionally, software, step 124 of method 100 and/or sub-method 1300 may execute and/or perform the second plurality of sub-steps 1320 which may output the saved .STL file from step 1124 of FIG. 50, input the outputted .STL file into the .STL manipulator software or program and/or determine surface area and/or volume based on the outputted .STL file and/or the saved .STL file from step 1124 of FIG. 50. Further, the software, step 124 of method 100 and/or sub-method 1300 may execute and/or perform the third plurality of sub-steps 1330 which may output the saved .STL file from step 1224 of FIG. 51, input the outputted .STL file into the .STL manipulator software or program and/or determine surface area and/or volume based on the outputted .STL file and/or the saved .STL file from step 1224 of FIG. 51. Moreover, the software, step 124 of method 100 and/or sub-method 1300 may execute and/or perform the fourth plurality of sub-steps 1340 which may output a CAD-based .STL file based on, associated with and/or indicative of the original CAD model of, or associated with the component 2, input the outputted CAD-based .STL file into the .STL manipulator software or program and/or determine surface area and/or volume based on the outputted CAD-based .STL file and/or the original CAD model.

The software, the step 12 of method 100 and/or the sub-method 1300 may compare the surface area and/or volume determinations from sub-steps 1310, 1320, 1330, 1340 and/or determine and/or calculate one or more 3D offsets between the outputted .STL files of sub-steps 1310, 1320, 1330, 1340 at step 1342 of FIG. 52. Finally, the software, step 124 of method 100 and/or sub-method 1300 may apply at least one 3D solution based on the determined and/or calculated one or more 3D offsets between the outputted .STL files as shown at step 1344 of sub-method 1300.

After the collected 2D images and/or data have been analyzed at step 120 and the collected 3D images and/or data have been analyzed at step 124, the software and/or the method 100 may executed, perform and/or facilitate an in process analysis of the analyzed 2D images and/or data and the analyzed 3D images and/or data during the AM process being executed by the AM device 12 as shown at step 126 in FIG. 40. Next, the software and/or the method 100 may determine and/or detect if any inconsistencies and/or build errors are present and/or exist based on the executed in process analysis as shown at step 128. Further, the software and/or the method 100 may execute and/or perform an analysis decision at step 130 based on whether any inconsistences and/or build errors were determined and/or detected at step 128.

If the executed and/or performed analysis decision at step 130 determines or detects one or more major or substantial mechanical inconsistencies or build errors, the software and/or the method 100 may stop or terminal any subsequent building of the component 2 by the AM device 12 as shown at step 132. Next, the software and/or the method 100 may alert an operator of the AM device 12 and/or system 10 that one or more major or substantial mechanical inconsistences or build errors were determined or detected and/or may provide the operator with at least one solution via the displays 20 as shown at step 134. The step 134 of alerting the operator with at least one solution may comprise and/or include, but is not limited to the sub-method 1400 shown in FIG. 53.

The sub-method 1400 may determine that the system 10 and/or the AM device 12 may be experiences at least one error that is not resolvable without assistance by, or aid from, the operator of the system 10 and/or the AM device 12 as shown at step 1402. The sub-method 1400 may determine that the system 10 and/or the AM device is experience a motor failure at step 1404, has a clogged extruder at step 1408, is out of build material at step 1410, has lost power at step 1412, is experience a heating element failure at step 1414 and/or is experiencing another type of error or failure at step 1416. Once the software and/or sub-method 1400 has determined that at least one of the errors set forth in steps 1404, 1408, 1410, 1412, 1414, 1416 is present and/or being experienced by the system 10 and/or the AM device 12, the software and/or sub-method 1400 may provide a step-by-step solution or operation to the at least one error to be executed by the operator as shown at step 1406. Next, the operator may execute the step-by-step solution or operation as shown at step 1418. The executed step-by-step solution or operation may correct the at least one build error as shown at step 1420 or may not correct the build error as shown at step 1422. If the executed step-by-step solution or operation does not correct the at least one error, the sub-method 1400 may return to step 1406 and/or provide the operator with one or more subsequent, additional and/or alternative step-by-step solutions or operations to correct the at least one error being experienced by the system 10 and/or the AM device 12. If none of executed step-by-step solutions or operations provided at step 1406 corrects the at least one error, the software and/or the sub-method 1400 may instruct the operator to contact customer support via one or more communications as shown at step 1424.

If the at least one error was corrected via sub-method 1400 at step 134 of FIG. 40, the software and/or method 100 may restart the AM process and continue building the component 2 as shown at step 136 of FIG. 40.

The executed and/or performed analysis decision at step 130 may determine that no inconsistencies or build errors exist as shown at step 138 of FIG. 40. Next, the software and/or method 100 may complete the build of the component 2 by finishing or applying the last build layer to the component 2 as shown at step 140. Moreover, the software and/or method 100 may proceed with the collection of the 2D images and/or data by the first imaging device 14 and/or the 3D images and/or data by the second imaging device 16 as shown at step 142.

The executed and/or performed analysis decision at step 130 may determine and/or detect that at least one recoverable and/or continuable inconsistency or build error exist as shown at step 144 of FIG. 40. Next, the software and/or method 100 may complete the build of the component 2 by finishing or applying the last build layer to the component 2 as shown at step 146. Alternatively, the software and/or method 100 may determine one or more solutions to correct the determined and/or detected at least one recoverable and/or continuable inconsistency or build error as shown at step 148. The determined one or more solutions for correcting at least one recoverable and/or continuable inconsistency or build error(s) may comprise and/or include, but are not limited to, adjusting the .STL associated with, or indicative of, the component 2 as shown at step 150, adjusting printer firmware as shown at step 154 and/or adjusting the CAD file associated with, or indicative of, the component 2 as shown at step 156. After correcting the at least one recoverable and/or continuable inconsistency or build error, the software and/or method 100 may implement one or more adjustments and/or corrections as shown at step 152.

Figure 54:
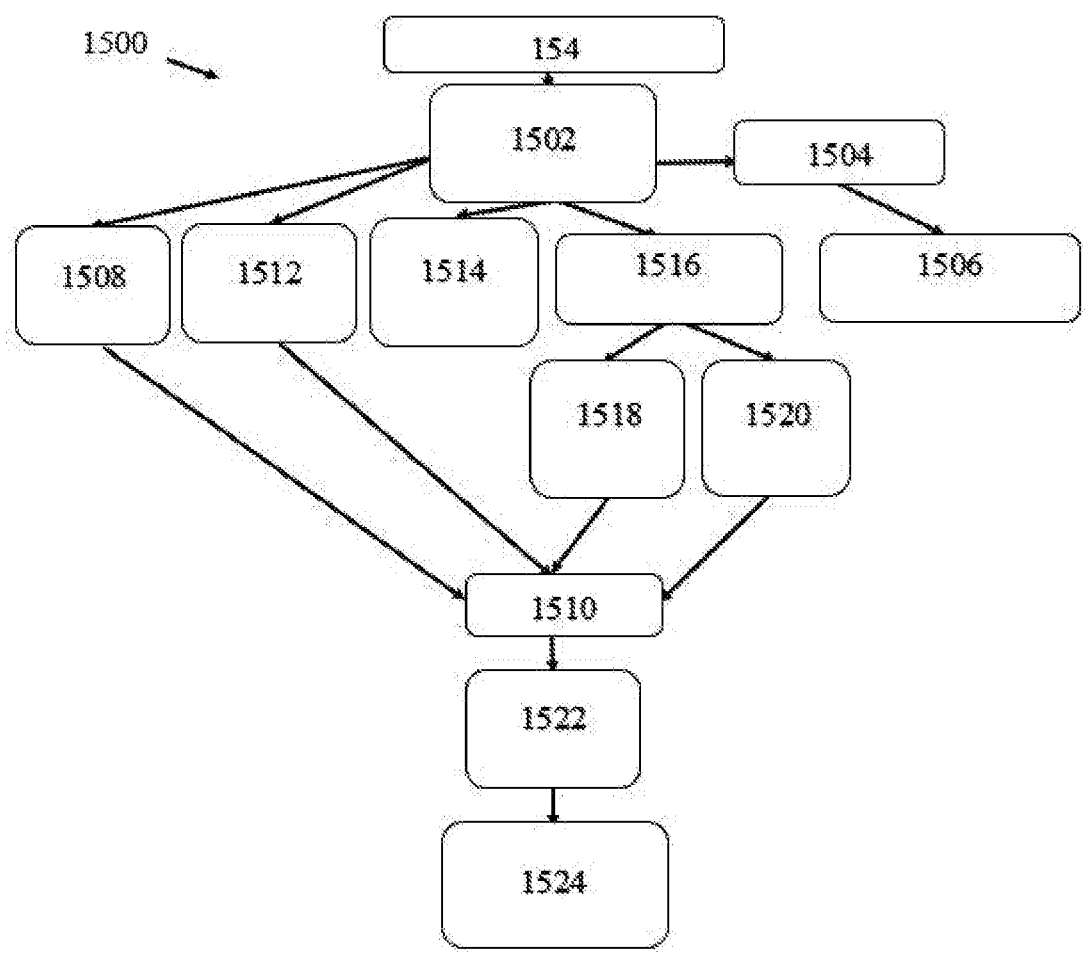
FIG. 54 illustrates a flowchart of a sub-method of one or more of the methods shown in FIGS. 40-42 in an embodiment.

The step 154 of adjusting the printer firmware may comprise and/or include, but is not limited to, the sub-method 1500 as shown in FIG. 54. The software and/or sub-method 1500 may open microcontroller software as shown at step 1502 and/or may subsequently scale the component 2 and/or subsequently built components via firmware associated with the AM device 12 as shown at step 1514. In embodiment, the software and/or sub-method 1500 may subsequently re-arrange the print bed of the AM device 12 and/or the .STL file of the component 2 as shown at step 1508 and/or subsequently adjust one or more temperature sensors of the AM device 12 as shown at step 1512. After step 1508 and/or step 1512, the software and/or sub-method 1500 may proceed to step 1510 whereby the software and/or sub-method 1500 may clear an electrically erasable programmable read-only memory (hereinafter "EEPROM") associated with, and/or contain within, the system 10 and/or the AM device 12. In an embodiment, the software and/or sub-method 1500 may clear the EEPROM as shown at step 1504 and/or may subsequently reload one or more correct defaults associated with the system 10 and/or the AM device 12 as shown at step 1506. In another embodiment, the software and/or sub-method 1500 may adjust one or more printer speeds associated with the AM device 12 as shown at step 1516 and/or may subsequently increase one or more printer speeds of the AM device 12 at step 1518 or may subsequently decrease one or more printer speeds of the AM device 12 as step 1520. After step 1518 or step 1510, the software and/or sub-method 1500 may clear the EEPROM associated with the system 10 and/or the AM device 12 as shown at step 1510. After the step 1510 of clearing the EEPROM, the software and/or sub-method 1500 may save and/or upload new firmware at step 1522 and may subsequently close the microcontroller software 1524 as step 1524.

Figure 55:
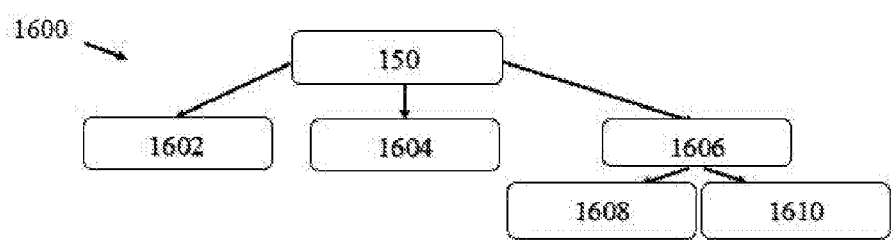
FIG. 55 illustrates a flowchart of a sub-method of one or more of the methods shown in FIGS. 40-42 in an embodiment.

The step 150 of adjust the .STL file shown in FIG. 40 may comprise and/or include, but is not limited to, the sub-method 1600 as shown in FIG. 55. The sub-method 1600 may comprise and/or include, but is not limited to, repairing the .STL file at step 1602, scaling the .STL file at step 1604 and/or altering geometry associated with the .STL file at step 1606. After the step 1606 of altering the geometry, the software and/or sub-method 1600 may cut the .STL file at step 1608 and/or extrude the .STL file at step 1610.

Figure 56:
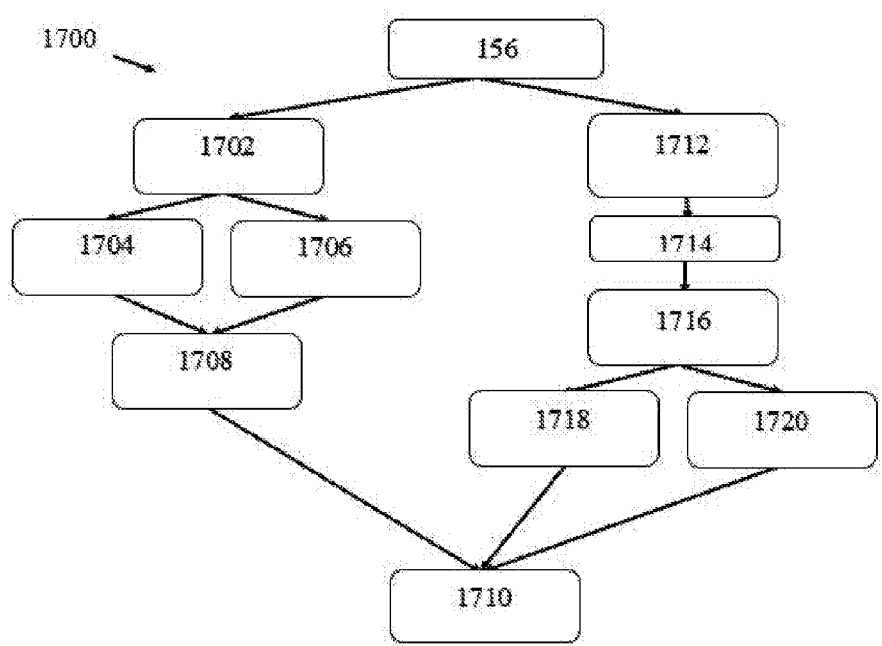
FIG. 56 illustrates a flowchart of a sub-method of one or more of the methods shown in FIGS. 23-25 in an embodiment.

The step 156 of adjusting the CAD file shown in FIG. 40 may comprise and/or include, but is not limited to, the sub-method 1700 as shown in FIG. 56 which may adjust .STL file triangulation associated with the component 2 at step 1702 or adjust geometry of the original CAD file of the component 2 at step 1712. After step 1702 of adjust the .STL file triangulation, the software and/or sub-method 1700 may adjust at least one deviation tolerance of the .STL file at step 1704 or adjust at least one angle tolerance of the .STL file at step 1706 and/or may subsequently export the new. STL file containing the adjusted deviation or angle tolerance as shown at step 1708. After the step 1712 of adjusting the geometry of the CAD file, the software and/or sub-method 1700 may save the new CAD file containing the adjusted geometry at step 1714, adjust the .STL file triangulation at step 1716 and/or adjust at least one deviation tolerance of the .STL file at step 1718 or adjust at least one angle tolerance at step 1720. After step 1708, step 1718 or step 1720, the software and/or sub-method 1700 may save the new .STL file comprising the at least one adjusted deviation or angle tolerance as shown at step 1710.

The step 142 of proceeding with the data collection and/or the step 152 of implementing one or more adjustments and/or corrections may proceed to step 158 as shown in FIG. 40. At the step 158, dependent upon the adjustment step executed by method 100, the software and/or method 100 may, but is not limited to, changing to a CAD file at step 160, changing to a .STL file at step 162 or changing to printer firmware at step 164. For example, if method 100 executed the step 154 of adjusting the printer firmware, then the software and/or method 100 may proceed to the step 164 of changing to the printer firmware. After step 164, the software and/or method 100 may proceed to step 114 as shown in FIG. 40. Alternatively, if method 100 executed the step 150 of adjusting the .STL file, then the software and/or method 100 may proceed to the step 162 of changing to the .STL file. After step 162, the software and/or method 100 may proceed to the step 110. In yet another alternative, if method 100 executed the step 156 of adjusting the CAD, then the software and/or method 100 may proceed to the step 160 of changing to the CAD file. After step 160, the software and/or method 100 may proceed to step 104.

Figure 41:
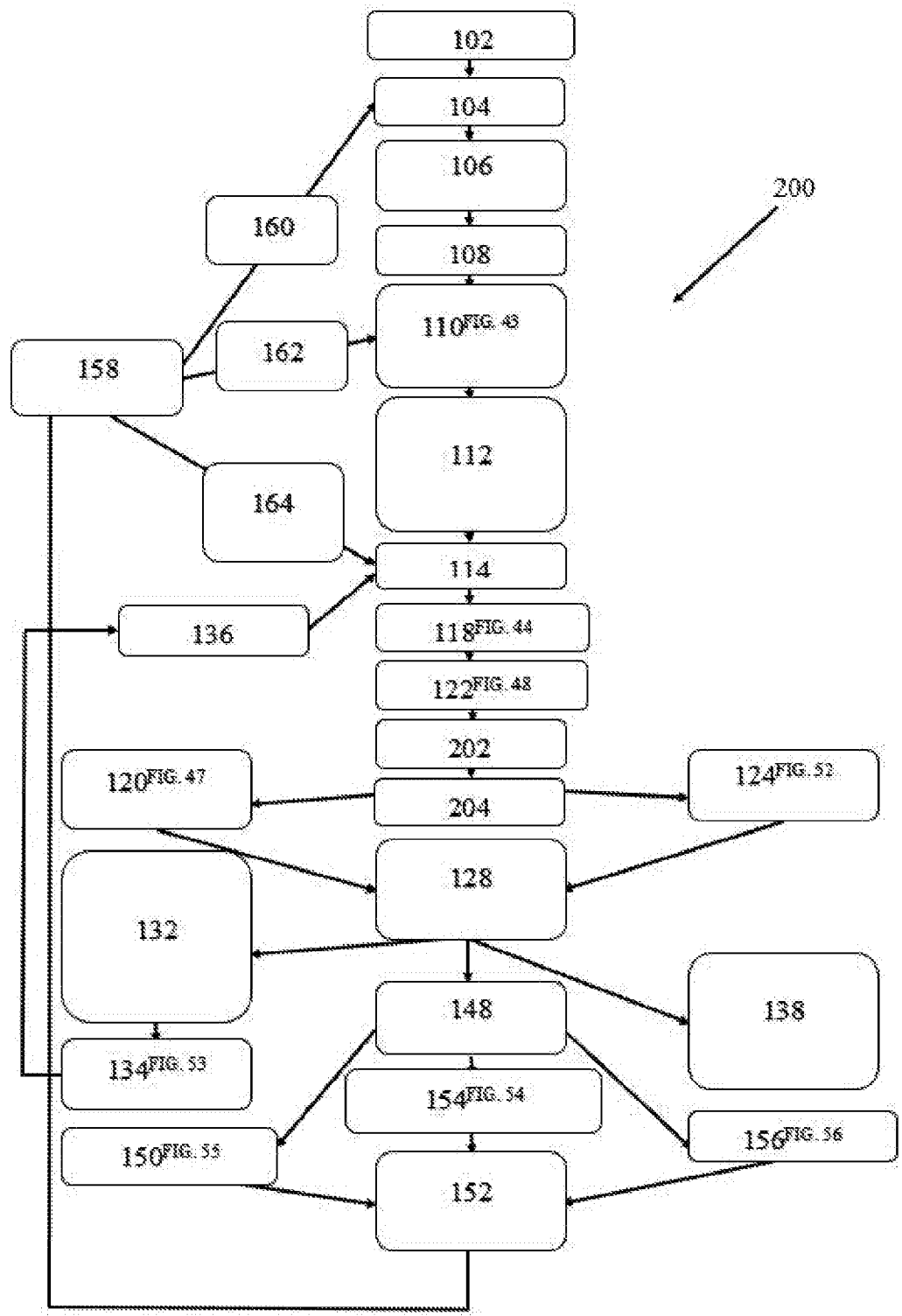
FIG. 41 illustrates a flowchart of another method for effectively calibrating an AM device and/or building at least one component in another embodiment.

In embodiments, the software may utilize method 200 shown in FIG. 41 instead of method 100. Method 200 may comprise a plurality of the steps and sub-methods utilized during, or by, method 100. For example, method 200 may comprise or include, but is not limited to, steps 102, 104, 106, 108, 110, 112, 114, 118, 12, 122, 124, 128, 132, 134, 136, 138, 148, 150, 152, 154, 156, 158, 160, 162, 164. In embodiment, method 200 may exclude steps 126, 130, 140, 142, 144, 146 of method 100. Moreover, method 200 may finish building the component 2 at step 202 before the software and/or method 200 analyzes the collected 2D and 3D images and/or data at step 204. One difference from method 100 is that method 200 completely builds the component 2 before proceeding to analyze any images or data collected by the imaging device 14, 16 at step 204. As a result, the step 128 of determining any consistencies and/or build errors present or exhibited by the component 2 is executed or performed by the software and/or method 200 until after the built component is completed by the AM process executed by the AM device 12. The subsequent steps after step 128 of method 200 proceed in the same, or substantially the same, order as the steps subsequent to step 128 of method 100.

Figure 42:
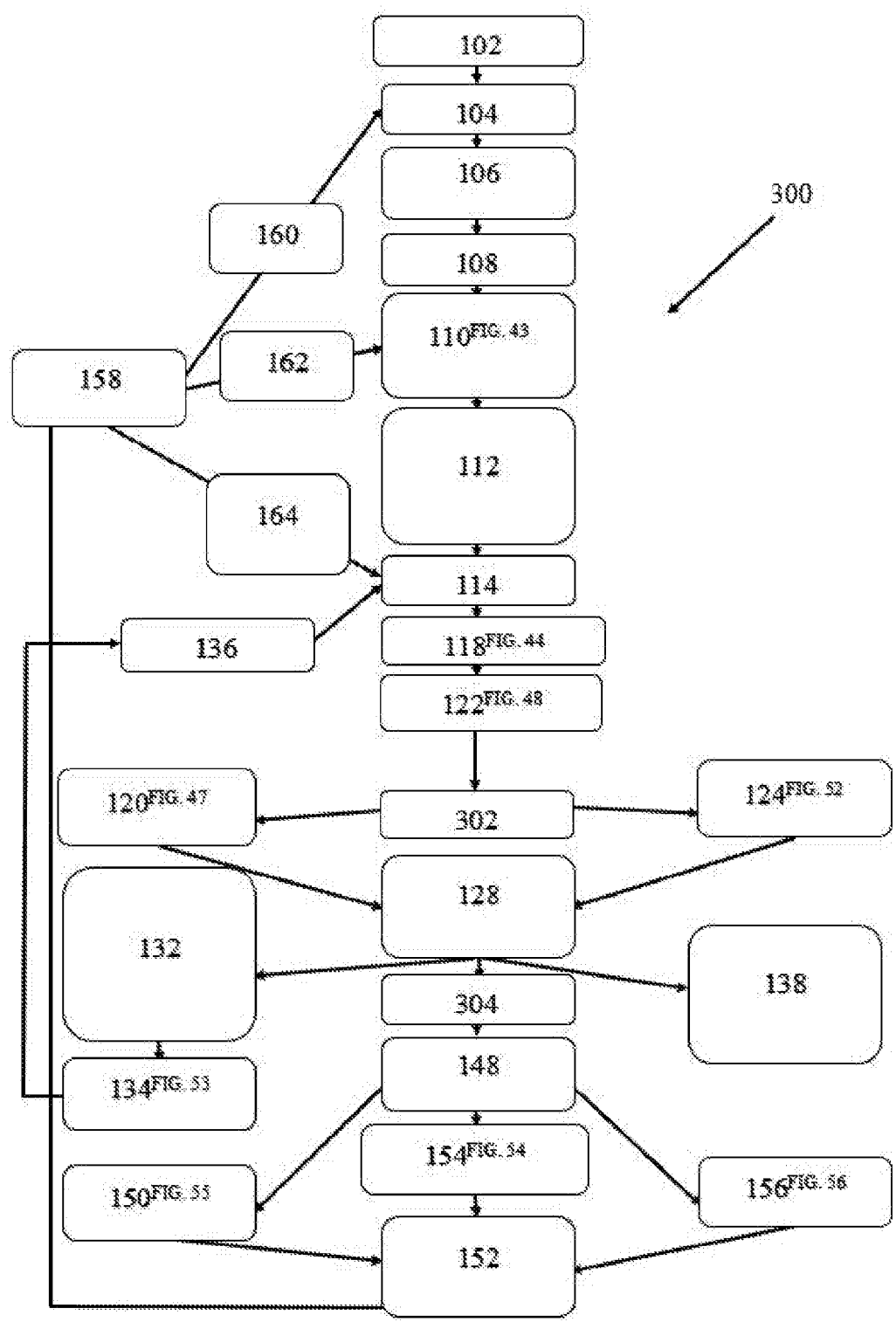
FIG. 42 illustrates a flowchart of another method for effectively calibrating an AM device and/or building at least one component in yet another embodiment.

In embodiments, the software may utilize method 300 shown in FIG. 42 instead of method 100, 200. Method 200 may comprise a plurality of the steps and sub-methods utilized during, or by methods 100, 200. For example, method 300 may comprise or include, but is not limited to, steps 102, 104, 106, 108, 110, 112, 114, 118, 120, 124, 128, 132, 132, 136, 138, 148, 150, 152, 154, 156, 158, 160, 162, 164. Method 300 may exclude the step 126 of executing an in process analysis of the collected 2D and 3D images or data. Instead, method 300 may analysis the collected 2D and 3D images or data at step 302 and may subsequently finish building the component 2 at step 304 before the step 148 of determining one or more solutions for correcting the determined and/or detected at least one inconsistency and/or build errors. In method 300, step 148 is executed after the build of component 2 is completed; therefore, the adjusting steps 150, 154 and 156 and/or changing steps 160, 162, 164 may be executed and/or performed by the software and/or method 300 subsequent to completing the build of component 2 during the AM process executed by the AM device 12.

EXAMPLE

A working example was conducted whereby the following set of rules or principles governed the conduct within the experiment. First, the resulting test component was not allowed to be removed from platform 22 until a geometric analysis of the test component was concluded. Additionally, hand measurements of the test component were allowed after completion of the build of the test component to verify calculations were correct. Further, an operator of system 10 was only allowed: to start the build of the test component; to perform scanner operations after build completion of the test component; and to perform a geometric analysis of the test component. Still further, the operator was allowed to manually adjust for build errors or corrections as to derive a procedural path for future automated software. Yet still further, only two data sets from the same component were presented wherein Data Set 1 was collected before any build adjustment(s) and Data Set 2 was collected after the build adjustments were applied to produce a second scaled component (hereinafter "scaled component"). Moreover, any build or operational decisions made by the operator were logged while been shown alongside the data collection and adjustments.

In the experiment, the test component was a one inch cube (i.e., 1 inch×1 inch×1 inch) because a one inch cube may be a simple object but also has the ability to exhibit fabrication inconsistencies, errors and/or malfunctions. Further, the test component was made solid for ease of calculations throughout the experiment. The CAD file of the test component was created and measurements were performed whereby each of the three dimensions of the CAD model of the test component were 1.00±0.02 inches for the x-axis, y-axis, and z-axis. Next, the .STL file of the CAD model was created and repaired whereby the each of the three dimensions were measured virtually to be 1.00 inch for the x, y, and z-axis. Further, the layers of the theoretical build of the sliced repaired .STL of the CAD model were created. These layers were then virtually stacked creating a 3D view of what the slicer settings generated. However, the 3D image appeared squashed because no thickness for each layer was transferred through the 2D images. In order to solve this, we employed a scaling method, assuming the theoretical lengths of the squares (since the example component is a cube) were 1 inch in length for both the x and y-axis, it was then possible to determine a ratio of pixels per inch for the 2D layers exported by the slicer settings. This ratio was determined to be 636 pixels/inch and was determined using an image analysis software. When manipulating the squashed 3D view of these 2D layers during the stacking process, we called the previously determined ratio the Z-axis scale factor. This factor was then utilized for calculating the theoretical 3D height of the generated stacked 3D model with the image software. The measurements of the theoretical 2D data which had been converted to a 3D model were 1 inch for the x and y-axis and for the third dimension was 1.00 inch. This same process was utilized during the analysis of what was actually being fabricated by the AM device.

The experimental build consisted of the same .gcode file that was created by the previous sliced .STL which was used as the theoretical build. The AM device captured the necessary 2D and 3D data required to perform the following analysis. The original experimental 2D in 3D was generated by preparing the 3D model with the image software.

The Z-axis scale factor for the experimental data was calculated from the 2D data collected from the experimental build and was based on the following:

Note:

$Z_{pix}$ was the height of the stacked experimental images in pixels, this was due to the fact that the slice heights to not carry with the collected 2D data.

Scale was the ration of pixels per unit length that could be found by measuring an object in an experimental 2D image with a known length such as a feature on the build volume. Using this information while measuring said feature in pixels, it was possible to determine the amount of pixels per unit length.

$Z_{exp}$ was the current height of the experimental object in inches when converting from pixels to inches using the previously determined scale.

$Z_{theo}$ was the supposed height of the experimental object if it was assumed that the height is that of the initial CAD model and not what was actually being fabricated. The reason for this was so that the scaling of the x and y-axis would remain proportional with respect to the correct height. Later, the experimentally obtained height from the second optical imaging device could be used to determine a correction for the z-axis.

$\lambda_{exp}$ was the multiplication factor necessary to make the height of the experimental object in 3D virtual space the same height given in the initial CAD model.

$Z_{pix} = 85.4980$ pixels

Scale: $29.3452 \frac{\text{pixels}}{\text{mm}} = 745.36808 \frac{\text{pixels}}{\text{inch}}$ $Z_{exp} = \frac{Z_{pix}}{745.36808 \frac{\text{pixels}}{\text{inch}}} = .1147029691$ inches $Z_{theo} = 1$ inch $\approx Z_{corrected}$ (assumption based off initial CAD model)

$\lambda_{exp} = $ scale factor for $Z_{corrected}$ $\lambda_{exp} = \frac{Z_{theo}}{Z_{exp}} = \frac{1 \text{ inch}}{Z_{exp}} = 8.717959248$ Next, the Z-axis scale factor was applied and the X-axis and Y-axis were scaled by the system 10 accordingly. Further, a 3D model of the scaled experimental 2D data was prepared via the image software. After applying this method and measuring to the newly created 3D model of the experimental build, we found the first dimension of the test component, the x-axis, was 1.01 inches, the second dimension, the y-axis, was 1.04 inch and the third dimension, the z-axis, was 1.00 inch. Next, a 3D scan point cloud with key features was prepared by calibrating and activating the second imaging device 16 whereby the platform 22 was automatically lowered to a correct height and software for the second imaging device 16 was automatically opened and/or activated to collect 3D data. Further, a STL conversion of the point cloud in 3D was prepared and dimensional measures were performed whereby the first dimension, the x-axis, was 1.04 inches, the second dimension, the y-axis, was 1.05 inch and the third dimension, the z-axis, was 1.13 inch. For this example, we ignored the x and y-axis data found from the second optical imaging device; however, it should be noted that discrepancies could exist between the 2D and 3D collected data. These discrepancies could be from various origins including lighting, vibration, build geometry, and etc.

In order to perform the calculation, the color images were converted to grey scale and then converted to binary for ease of analyses. Performing this calculation for each image allowed the area of the white particles in pixels to be determined. By knowing the pixel/unit conversion factor, the area in a specified unit system could then be determined or calculated. To determine or detect discrepancies between theoretical and experimental, the particle areas per image were compared. Moreover, the images could have been analyzed on a $$\frac{dx}{dy}$$

bases to verify the correct amount of material was in the correct amount of area. Extrapolation of this method would have also allowed for volume comparisons to be conducted or performed.

For the theoretical data, the Z-axis scale factor was 636 pixels/inch, and, for the experimental data, the Z-axis scale factor was 745.36808 pixels/inch.

For the binary data analyses, the output data was in pixel$^2$ and was converted to in$^2$. To perform this calculation, the previously derived scales from the images were converted to areas as follows:
Note: this was an example for layer 10 of the cube build. This same procedure was carried out for every layer.

Theoretical Area Scale: $636 \frac{\text{pixels}}{\text{inch}} \rightarrow \left(636 \frac{\text{pixels}}{\text{inch}}\right)^2 \rightarrow 404496 \frac{\text{pixels}^2}{\text{inch}^2}$ Experimental Area Scale: $745.36808 \frac{\text{pixels}}{\text{inch}} \rightarrow$ $\left(745.36808 \frac{\text{pixels}}{\text{inch}}\right)^2 \rightarrow 555573.575 \frac{\text{pixels}^2}{\text{inch}^2}$ Next it was assumed that the x-axis and y-axis were equal which allowed the square root of the area data to be taken to obtain the length of any given side of the x-axis and y-axis. From this data, offset calculations based on the original CAD model were determined.

For the offset calculation, the experimental length was 1.053256388 inch, the CAD length value was 1 inch, the offset length equaled CAD length value—Experimental length, and the offset length was −0.053256388 inch. Further, the corrected offset length, which accounted for the first optical imaging device being un-level, was −0.028256388 inch whereby the negative value implied that the length was over the CAD length value. Further, the corrected length equaled "experimental length −0.025 inch" which again accounted for the first optical imaging device being un-level, the corrected length was then 1.02825639 inch, the scale percentage equaled $$\frac{CAD \text{ Model Length}}{\text{Corrected Length}} * 100\%,$$

whereby the scale percentage equaled $$\frac{1 \text{ inch}}{1.02825639 \text{ inch}} * 100\% \text{ or } 97.2520093\%.$$

This then notified the system that the length of this dimension for this specific layer had a correction factor of 97.25% of its current value. The system could then use this information to correct the next build for this specific layer. As previously stated, this same procedure was carried out for every layer to ensure every layer meets its appropriate dimensions.

For the 2D data application, the CAD model scale, .STL scale, or the firmware settings were adjusted to account for the specified offsets that were previously determined by the offset calculation(s). It was noted that an overall scale percentage, determined by averaging the offsets of every layer, was created to simply the build correction for this example. It was also noted that the first layer was neglected in the average in order to account for initial filament flow, a positive offset length meant too small and a negative offset length meant too large and, due to the first optical imaging device being slightly un-level, the 0.025 inch was subtracted from the experimental length values because the images appeared to be 0.025 inch too large. Based on these calculations, it was found that the average scale percentage was 98.23024472%. For ease of adjustment and build correction, the .STL was chosen to be scaled; however, other scaling methods would have been valid. Thus, the X-axis and Y-axis were scaled by 98.23024472%.

For the 3D data analyses and application, the 3D data was primarily used for detecting major mechanical errors, component volume, component surface area, and component height of the test component. Notice warping in the test component was detected by the 3D Scan. Based on the 3D scan, the height of the test component was 1.13 inch, and this height was utilized to make a Z-axis scale percentage calculation. The component volume and component surface area were valid means of comparison but were not utilized in this experiment. Thus, the Z-axis scale percentage calculation equal $$\frac{CAD \text{ Model Length}}{\text{Corrected Length}} * 100\% \text{ or}$$

$$\text{equaled } \frac{1 \text{ inch}}{1.13 \text{ inch}} * 100\% \text{ or } 88.49557522\%.$$

For the scaling of the subsequently built scaled component, the scaled component was based on the previous determined calculation and scaled by the following values:
X-axis=98.23024472%;
Y-axis=98.23024472%; and
Z-axis=88.49557522%.
The new theoretical values were as follows:
X-axis=1"*0.9823024472=0.9823024472 inch
Y-axis=1"*0.9823024472=0.9823024472 inch
Z-axis=1"*0.8849557522=0.8849557522 inch For the scaled component, the scaled .STL of the CAD model was created and repaired and measurements were performed to obtain dimensions of the scaled repaired .STL of the CAD model. Next, the scaled repaired .STL was sliced built and prepared with time-lapse via the image software system and 2D data was automatically collected for the theoretical build of the sliced scaled repaired .STL of the CAD model. For the scaled theoretical data of the second build, the Z-axis scale factor was determined to be 559 pixels/inch. Further, for the scaled theoretical 2D data in 3D, the 3D model was prepared via the image software. Since the previously determined correction offsets were used to scale the second repaired .STL, it was found that first dimension of the scaled theoretical 2D data in 3D was 0.98 inches, the second dimension was 0.98 inches, and the third dimension was 0.88 inches. Assuming the system remained consistent, this build would produce a cube much closer to the theorized 1×1×1 inch values described in the initial CAD model. For the experimental build of the sliced scaled repaired .STL of the CAD model, the scaled repaired .STL was sliced built and prepared time-lapse via the image software which automatically collected 2D data. Still further, the 3D model was prepared via the image software to generate the experimental 2D data in 3D.

For the Z-axis scale factor calculation for the experimental data with respect to the scaled component, the calculation was based on the following:

$$Z_{pix} = 77.9922 \text{ pixels}$$

$$\text{Scale: } 29.3452 \frac{\text{pixels}}{\text{mm}} = 745.36808 \frac{\text{pixels}}{\text{inch}}$$

$$Z_{exp} = \frac{Z_{pix}}{745.36808 \frac{\text{pixels}}{\text{inch}}} = .1046358197 \text{ inches}$$

$$Z_{theo} = .8849557522 \text{ inch} \approx$$

$Z_{corrected}$ (assumption based off scaled .STL of initial CAD model)

$\lambda_{exp}$ = scale factor for $Z_{corrected}$ $$\lambda_{exp} = \frac{Z_{theo}}{Z_{exp}} = \frac{1 \text{ inch}}{Z_{exp}} = 8.457483821$$

It was noted that the Z-axis was set to 0.8849557522 inch during X-axis and Y-axis scaling.

Next, the calculated Z-axis scale was applied, the X-axis and Y-axis were scaled by the previous offsets and the experimental 2D data in 3D was scaled by preparing the 3D model with the image software. For the dimensional measurements for the scaled experimental 2D data in 3D with respect to the scaled component, the first dimension was approximately 1.02 inches, the second dimension was 1.02 inches, and third dimension was 0.88 inches. Next, the 3D scan point cloud with key features was obtained by calibrating and activating the second imaging device 16 to collect 3D data. Moreover, platform 22 was automatically lowered to a correct height and the imaging software for the second imaging device 16 was automatically opened and/or activated to collect the 3D data. Furthermore, the 3D model was prepared via the image software for obtaining the STL conversion of the point cloud in 3D. For the dimensional measurement for the STL conversion of the point cloud with respect to the scaled component, the first dimension was 1.04 inch, the second dimension was 1.04 inch, and the third dimension was 1.00 inch. Note the x and y-axis (first and second dimension) information from the second optical imaging device was not utilized as previously stated.

For the calculation of the particles analysis of binary data with respect to the scaled component, the color images were converted to grey scale and then converted binary for ease of analyses. Performing said calculation for each image determined the area of the white particles in pixels. As the pixel/unit conversion factor was known, the area in a specified unit system was then determined. To determine discrepancies between theoretical and experimental, the particle areas per image were compared. Moreover, the images could have been analyzed on a $$\frac{dx}{dy}$$

bases to verify the correct amount of material was in the correct amount of area. Furthermore, extrapolating this method would have allowed for volume comparisons to be made as well. It was noted that the Z-axis scale factor was 559 pixels/inch.

For the binary data analyses, the output data is in pixel$^2$ and was converted to int. In order to perform this calculation, the previously derived scales from the images were taken and converted to the following areas:

Note: this was an example for layer 10 of the second cube build. This same procedure was carried out for every layer.

Theoretical Area Scale: $569 \frac{\text{pixels}}{\text{inch}} \rightarrow$ $$\left(569 \frac{\text{pixels}}{\text{inch}}\right)^2 \rightarrow 323761 \frac{\text{pixels}^2}{\text{inch}^2}; \text{ and}$$

Experimental Area Scale: $745.36808 \frac{\text{pixels}}{\text{inch}} \rightarrow$ $$\left(745.36808 \frac{\text{pixels}}{\text{inch}}\right)^2 \rightarrow 555573.575 \frac{\text{pixels}^2}{\text{inch}^2}.$$

Next, it was assumed the x-axis and y-axis were equal which allowed for the square root of the area data to be taken to obtain the length of any given side of the x-axis and y-axis. From this data, the offset calculations were determined based on the original CAD model.

For the offset calculation with respect to the scaled component, the experimental length was 1.030021839 inch, the value of CAD model length equaled 1 inch, the offset length equaled "CAD length value—experimental length", the offset length was −0.030021839 inch, and the corrected offset length equaled −0.005021839 inch which accounted for the first optical imaging device being un-level and the negative value implied that the length is over the CAD length value. Moreover, the corrected length equaled "experimental length −0.025 inch" (which accounted for the first optical imaging device being un-level), the corrected length equaled 1.005021839 inch, and the scale percentage equaled $$\frac{CAD \text{ Model Length}}{\text{Corrected Length}} * 100\% \text{ or}$$

$$\frac{1 \text{ inch}}{1.005021839 \text{ inch}} * 100\% \text{ or } 99.50032542\%.$$

This then notified the system that the length of this dimension for this specific layer had a correction factor of 99.5% of its current value. The system could then use this information to correct the next build for this specific layer. As previously stated, this same procedure was carried out for every layer to ensure every layer meets its appropriate dimensions.

For the 2D data application, the CAD model scale, the .STL scale, or the firmware settings were adjusted to account for the specified offsets previously calculated with respect to the scaled component. It was noted that the overall scale percentage was the average of all the layers, the first layer was neglected to account for initial filament flow, the positive offset length meant too small and the negative offset length meant too large, and, due to the first optical imaging device being slightly un-level, 0.025 inch was subtracted from the experimental length values since the images appear 0.025 inches too large. Based on these calculations, the average scale percentage was found to be 99.5131852%. That is to say, the system increased the percentage by which what was actually built matched what was supposed to be built from the first cube build to the second cube build.

For the 3D data analyses and application, the 3D data was primarily used for detecting major mechanical errors, component volume, component surface area, and component height. Notice warping was detected by the 3D scan. Based on the 3D scan, the height of the scaled component was 1.00 inch, which was utilized to make a Z-axis scale percentage calculation. The component volume and component surface area were valid means of comparison but were not utilized in this experiment. Moreover, the Z-axis scale percentage calculation equaled $$\frac{CAD \text{ Model Length}}{\text{Corrected Length}} * 100\% \text{ or } \frac{1 \text{ inch}}{1.00 \text{ inch}} * 100\% \text{ or } 100\%.$$

Meaning the experimental height for the second cube build matched the supposed height given in the initial CAD model.

With respect to a 2D data set comparison, Data Set 1 (first build) for the test component showed that the average scale percentage was 98.23024472% and Data Set 2 (second build) for the scaled component showed that the average scale percentage improved to be 99.5131852%. From the perspective of the instrumentation, Data Set 1 was analyzed, and an offset for the X-axis and Y-axis was determined and subsequently applied in such a manner as to produce a second scaled component that was smaller in the X-axis and Y-axis by 1.76975528%. Upon production of the second scaled component and analyzing Data Set 2, application of the above-identified changes unexpectedly decreased the component size in the X-axis and Y-axis by 1.28294048% (99.5131852%−98.23024472%) rather than the previously predicted value of 1.76975528%. Though the corrections were close to the value given by the initial CAD model, the system still yielded a discrepancy of approximately 0.49%. However, assuming the system was consistent, this value could be utilized in future calculations. When determining the scale difference which was 0.4868148% (1.76975528%−1.28294048%), the size of the second scaled component was adjusted to meet the correct dimensions within the acceptable tolerances (i.e., within a few hundred thousandths of an inch) by taking the average scale percent determined from Data Set 1 plus the 0.4868148% scale offset. Thus, the method of this experiment was surprisingly effective from the instrumentation perspective in the X-axis and Y-axis such that the system produced the second scaled component with dimensions that matched, or at least substantially matched, the original CAD model dimensions within 0.4868148%.

With respect to a 3D data set comparison, Data Set 1(first build) showed that the Z-axis scale percentage for the test component was (1 inch/1.13 inch)*100% or 88.49557522%, and Data Set 2(second build) showed that the Z-Axis Scale Percentage for the second scaled component was (1 inch/1.00 inch)*100% or 100%. From the perspective of the instrumentation, a measurement of the components Z-axis or height was taken from Data Set 1 and the Z-axis offset was determined. Then, said determined Z-axis offset was utilized in the fabrication of the second scaled component to fix any discrepancies or build errors between the original CAD model dimensions and the dimensions of the test component that were determined by the instrumentation. Thus, the method of this experiment was surprisingly effective from the instrumentation perspective in the Z-axis to produce the second scaled component that had dimensional measurements that matched, or at least substantially matched, the original CAD model dimensions.

It will be appreciated that various of the above-disclosed and other features and functions, or alternatives thereof, may be desirably combined into many other different systems, methods and/or applications. Also, various presently unforeseen or unanticipated alternatives, modifications, variations or improvements therein may be subsequently made by those skilled in the art, and are also intended to be encompassed by the following claims.

The invention claimed is:

1. A verification and adjustment system for correcting at least one build error present in a component built by additive manufacturing, the system comprising:
an additive manufacturing device having a top end and a bottom end connected by perimeter sides, wherein the additive manufacturing device has an interior space defined between the top end, the bottom end and the perimeter sides of the additive manufacturing device, wherein the interior space is configured to house a build platform for building the component thereon;

a first imaging device for collecting first digital images of, or data associated with, the component, wherein the first imaging device is located adjacent to a portion of the interior space of the additive manufacturing device, positioned at a first orientation with respect to the build platform and directed at the build platform; and a second imaging device for collecting second digital images of, or data associated with, the component, wherein the second imaging device is located adjacent to one perimeter side of the additive manufacturing device and at an elevation between the bottom end and the top end of the additive manufacturing device, positioned at a second orientation with respect to the build platform, and directed at the build platform.

2. The system according to claim 1, wherein the first digital images are collected by the first imaging device and comprise digital 2D images, and the second digital images are collected by the second imaging device and comprise digital 3D images.

3. The system according to claim 1, wherein the second imaging device is located outside, or inside, the interior space of the additive manufacturing device.

4. The system according to claim 1, wherein the second imaging device is stationary, or movable, with respect to the build platform of the additive manufacturing device.

5. The system according to claim 1, wherein the second imaging device is located adjacent to a portion of the interior space of the additive manufacturing device.

6. The system according to claim 1, wherein the first imaging device is located at a position with respect to a top surface of the build platform that forms a first angle, wherein the first angle is greater than about forty-five degrees and no more than ninety degrees.

7. The system according to claim 1, wherein the first orientation of the first imaging device is perpendicular with respect to the build platform.

8. The system according to claim 1, wherein the second imaging device is located at a position with respect to a top surface of the build platform that forms a second angle, wherein the second angle is about ±10°.

9. The system according to claim 1, wherein the second orientation of the second imaging device is parallel or nonparallel with respect to the build platform.

10. The system according to claim 1, wherein at least one imaging device, selected from the first imaging device and the second imaging device, is mounted on at least one print head of the additive manufacturing device.

11. A verification and adjustment method for correcting at least one build error present in a component built by additive manufacturing, the method comprising:

extracting digital 3D geometric data of the component from collected digital data, wherein the collected digital data is based on the component built on a build platform of an additive manufacturing device, wherein the collected digital data comprises digital 2D images collected from a first imaging device associated with the additive manufacturing device and digital 3D images collected from a second imaging device associated with the additive manufacturing device;

detecting at least one build error present in the component built on the build platform by comparing the extracted digital 3D geometric data with a first digital 3D model of the component, wherein a first digital 3D printable file of the component comprises the first digital 3D model of the component;

generating a second digital 3D model of the component based on the detected at least one build error present in the component, wherein the second digital 3D model accounts for, or corrects, the detected at least one build error present in the component; and providing a second digital 3D printable file that accounts for, or corrects, the detected at least one build error by changing the line-by-line code of the first digital 3D printable file to incorporate the generated second digital 3D model of the component.

12. The method according to claim 11, further comprising:

building one or more corrected components based on the second digital 3D printable file.

13. The method according to claim 11, wherein the first imaging device is located above the build platform and the second imaging device is located at a side of the additive manufacturing device.

14. The method according to claim 13, wherein the second imaging device is stationary, or movable, with respect to the build platform of the additive manufacturing device, and is parallel, or nonparallel, with respect to the build platform of the additive manufacturing device.

15. The method according to claim 11, wherein the collected digital 2D data comprises digital 2D images of a plurality of build layers of the component built on the build platform and the collected digital 3D data comprises digital 3D images of the plurality of build layers of the component built on the build platform.

16. The method according to claim 15, wherein the plurality of build layers comprises each build layer added by the additive manufacturing device to build the component on the build platform.

17. The method according to claim 11, wherein the first imaging device and the second imaging devices are both directed at a build layer immediately added to the component by the additive manufacturing device.

18. The method according to claim 11, wherein at least one imaging device, selected from the first imaging device and the second imaging device, is mounted on at least one print head of the additive manufacturing device.

19. The method according to claim 11, further comprising:

changing firmware associated with the additive manufacturing device based on the extracted digital 3D geometric data.

20. The method according to claim 11, further comprising:

introducing corrections into subsequent building of the component, when the component is only a partially built component, wherein the corrections are based on, or determined from, the extracted digital 3D geometric data.

21. The method according to claim 11, further comprising:

acquiring the collected digital data from (i) at least two different angle with respect to the build platform and (ii) inside or outside an interior space of the additive manufacturing device, wherein the interior space is configured to house the component and the build platform during the additive manufacturing.

* * * * *